United States Patent [19]
Hirata et al.

[11] Patent Number: 6,157,902
[45] Date of Patent: Dec. 5, 2000

[54] DISASSEMBLY ROUTE PRODUCING APPARATUS, ASSEMBLY ROUTE PRODUCING APPARATUS, AND SUPPORTING SYSTEM FOR MECHANICAL SYSTEM DESIGN

[75] Inventors: Mitsunori Hirata; Yuichi Sato; Tsugito Maruyama, all of Kawasaki, Japan

[73] Assignee: Fujitsu Limited, Kawasaki, Japan

[21] Appl. No.: 09/022,043

[22] Filed: Feb. 11, 1998

[30] Foreign Application Priority Data

Mar. 13, 1997 [JP] Japan .................................. 9-059297
Sep. 11, 1997 [JP] Japan .................................. 9-247324

[51] Int. Cl.$^7$ .............................. G06G 7/48; G06F 9/45
[52] U.S. Cl. ................................................. 703/7; 700/95
[58] Field of Search ........................ 395/500.28; 700/95; 716/7

[56] References Cited

U.S. PATENT DOCUMENTS

| | | | |
|---|---|---|---|
| 5,056,031 | 10/1991 | Nakano et al. | 364/461 |
| 5,058,026 | 10/1991 | Kunii et al. | 364/468 |
| 5,548,694 | 8/1996 | Frisken Gibson | 395/124 |
| 5,560,100 | 10/1996 | Englert | 29/833 |
| 5,675,720 | 10/1997 | Sato et al. | 395/119 |
| 5,943,056 | 8/1999 | Sato et al. | 345/419 |
| 5,980,084 | 11/1999 | Jones et al. | 364/468 |

FOREIGN PATENT DOCUMENTS

| | | |
|---|---|---|
| 7-134735 | 5/1995 | Japan . |
| 8-77210 | 3/1996 | Japan . |
| 9-27046 | 1/1997 | Japan . |

OTHER PUBLICATIONS

Dong–Jin Kim et al., Fast Collision Detection Among Multiple Moving Spheres, Computer Animation 1998, pp. 1–7, Jun. 1997.

T. Sawik, A two–level heuristic for machine loading and assembly routing in a flexible assembly system, Emerging Technologies and Factory Automation, pp. 143, 149, Nov. 1996.

Su Chuan–Jun et al., An Efficient Collision Detection Methodology for Virtual Assembly, IEEE Conference on Systems, Man and Cybernetics, pp. 360–365, Oct. 1998.

Y. Kitamura et al., Efficient Collision Detection Among Objects In Arbitrary Motion Using Multiple Shape Representations, pp. 390–396, Oct. 1994.

J.R. Perkins et al., Stable, Distributed, Real–Time Scheduling of Flexible Manufacturing/Assembly/Disassembly Systems, IEEE Transactions on Automatic Control, pp. 139–148, Feb. 1989.

R. Hoffman, Automated Assembly In A CSG Domain, IEEE International Conference on Robotics and Automation, pp. 210–215, May 1989.

R. Gadh et al., Virtual Disassembly—A Software Tool for Developing Product Dismantling and Maintenance Systems, pp. 120–125, Jan. 1998.

R. Wilson, et al., "Geometric Reasoning About Mechanical Assembly", *Artificial Intelligence*, 71(2), pp. 1–31, Dec. 1994.

B. Romney, et al., An Efficient System for Geometric Assembly Sequence Generation & Evaluation, *Proc. 1995 ASME Intl Computers in Engineering Conf.*, pp. 699–712.

*Primary Examiner*—Paul R. Lintz
*Assistant Examiner*—A. M. Thompson
*Attorney, Agent, or Firm*—Staas & Halsey LLP

[57] ABSTRACT

A disassembly route producing apparatus searches for a disassembly route for disassembling a product into its component parts. In one embodiment, the apparatus selects one of the parts to be disassembled, and determines the closest distance the selected part may approach the remaining parts as the selected part is being moved. The selected part is disassembled through a series of translations in predetermined directions and for predetermined distances. After each translation, the apparatus determines whether the selected part collided with any of the remaining parts. If a collision occurs, the apparatus changes the direction for the translations and resumes the search. A corresponding assembly route is determined by reversing the disassembly route.

27 Claims, 63 Drawing Sheets

BEFORE TRANSLATION    IN TRANSLATION

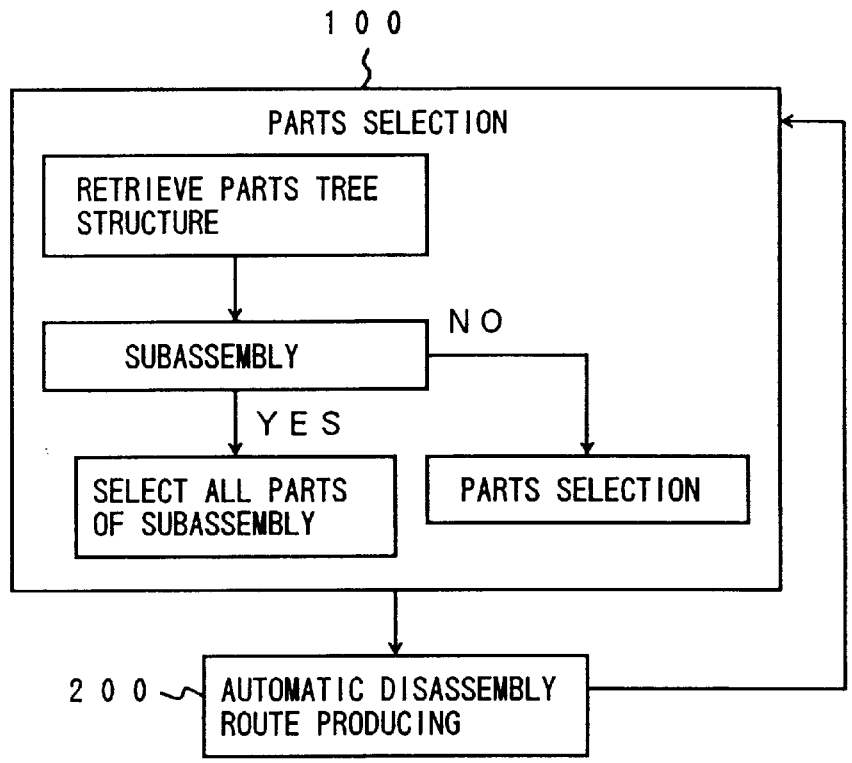
Fig. 30
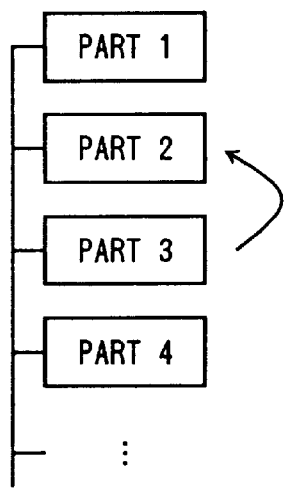
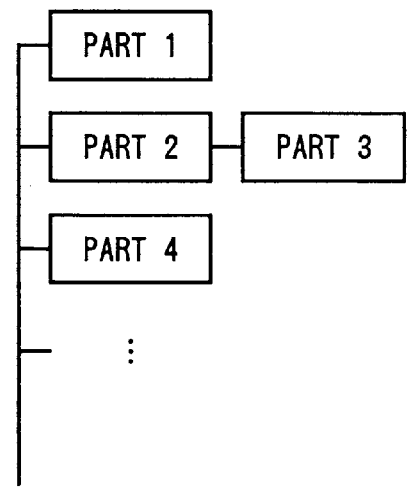
Fig. 31(a)   Fig. 31(b)

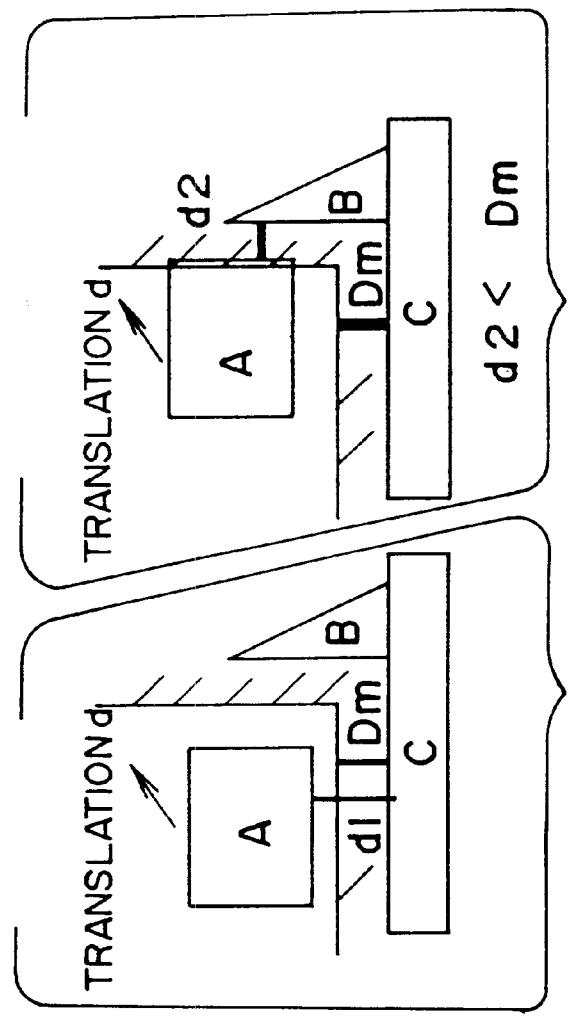
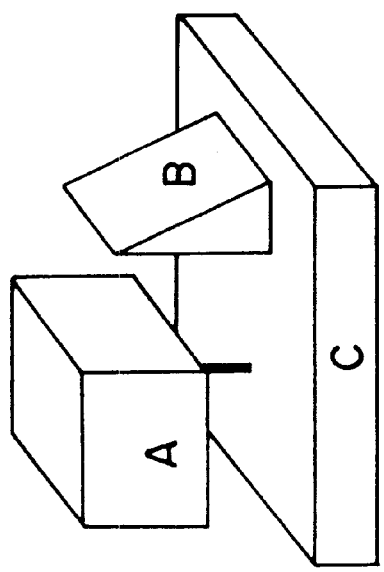
Fig. 38(a)    Fig. 38(b)    Fig. 38(c)

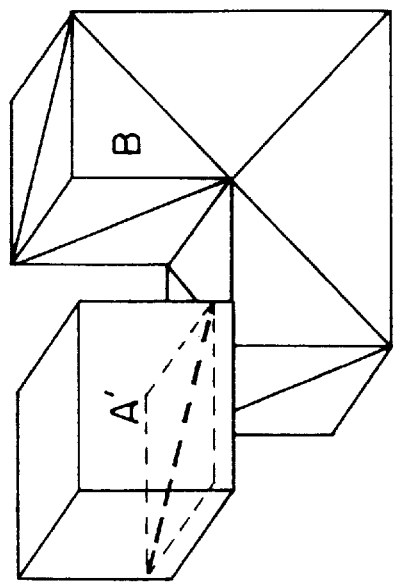
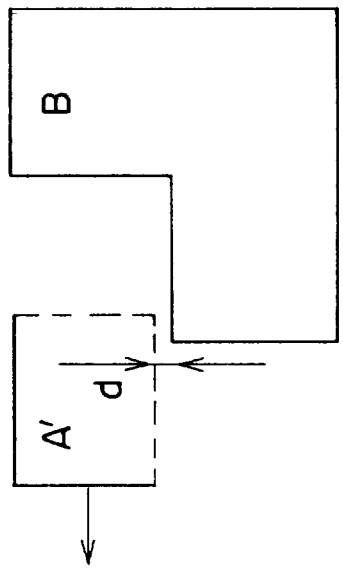
Fig. 47(b)
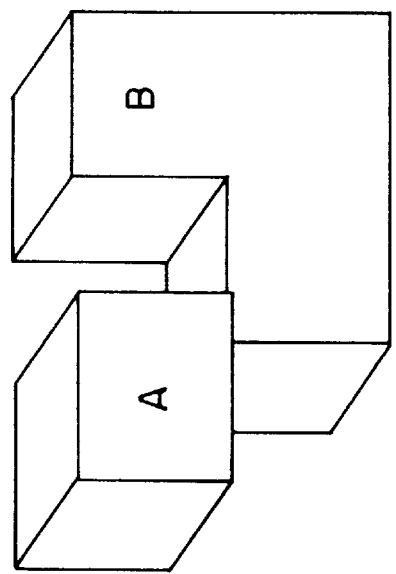
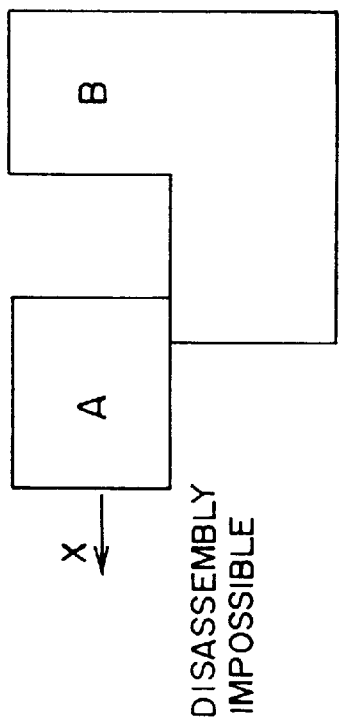
Fig. 47(a)

ENVELOPING SPHERE

|          | FIRST SELECTION | SECOND SELECTION | THIRD SELECTION |
|----------|-----------------|------------------|-----------------|
| PART 1   | ×               | MAX. TRANSLATION | ○               |
| PART 2   | ×               | MAX. TRANSLATION | ○               |
| PART 3   | ×               | ○                | —               |
| PART 4   | ○               | —                | —               |
| PART 5   | ○               | —                | —               |
| :        | :               | :                | :               |

○ : DISASSEMBLY OVER
× : DISASSEMBLY IMPOSIBLE

Fig.56

|          | FIRST SELECTION | SECOND SELECTION | THIRD SELECTION |
|----------|-----------------|------------------|-----------------|
| PART 1   | ×               | MAX. TRANSLATION | ×               |
| PART 2   | ×               | MAX. TRANSLATION | ×               |
| PART 3   | ×               | ○                | —               |
| PART 4   | ×               | ×                | ×               |
| PART 5   | ○               | —                | —               |
| :        | :               | :                | :               |

○ : DISASSEMBLY OVER
× : DISASSEMBLY IMPOSIBLE

Fig.57

DISASSEMBLY ROUTE PRODUCING APPARATUS, ASSEMBLY ROUTE PRODUCING APPARATUS, AND SUPPORTING SYSTEM FOR MECHANICAL SYSTEM DESIGN

BACKGROUND OF THE INVENTION

1. Field of the Invention

The present invention relates to a disassembly route producing apparatus for searching, using a simulation, for a disassembly route for disassembling a product, consisting of a plurality of components, into individual components; an assembly route producing apparatus for producing an assembly route, using the disassembly route producing apparatus, in which the disassembly route, obtained by the disassembly route producing apparatus, is reversely traced, and a supporting system for mechanical system design for supporting a design of a product consisting of components capable of being assembled without any collision of components, using the disassembly route producing apparatus.

2. Description of the Related Art

Recently, it is becoming frequent that a three-dimensional CAD system is used to perform a product design. In case of a complicated product consisting of a large number of components, however, assembly operations on the components of the product become complicated. Thus, there will happen such a situation that it is difficult even for a person of experience to assemble the components at the stage of a design owing to an occurrence of a collision with another component.

According to the conventional CAD system for a mechanism design, it is possible that the designed components are arranged at arbitrary positions and in arbitrary postures as if a product is apparently assembled. However, in order to avoid the situation as mentioned above, there is a need to actually manufacture components constituting the product or models of the components by way of trial and assembly of those fragments.

In view of the foregoing, it is desired to provide an automatic assembly route producing system capable of simulating whether a designed product can actually be assembled or disassembled, without actually manufacturing the product by way of trial.

A system for inspecting whether an assembly is feasible by a simulation is not yet in a practical stage, and is still in a stage of a study. With respect to such a system, in general, there is adopted a scheme in which a disassembly route starting from a state of a product after assembly, the disassembly route involving no occurrence of a collision (contact of components), is searched for on the basis of information as to components designed with using a three-dimensional CAD system and assembly arrangement of the components, and a route wherein the disassembly route involving no occurrence of a collision is reversely traced is given in the form of an assembly route (cf. "GEOMETRIC REASONING ABOUT MECHANICAL ASSEMBLY, Randall H. Wilson Jean-Claude Latombe, Stanford University, Artificial Intelligence 71 (2), December 1944", and "AN EFFICIENT SYSTEM FOR GEOMETRIC ASSEMBLY SEQUENCE GENERATION AND EVALUATION, Bruce Romney, Stanford University, Proc. 1995 ASEM. Intl Computers in Engineering Conf., pp. 699–712").

Further, methods of detecting the existence of a collision through a collision check, or evaluating the closest distance between components have been proposed by Japanese Patent Application Laid Open Gazettes Hei. 7-134735, Hei. 8-77210, Hei. 9-27046, etc.

In those manner, there have been performed a study of producing an assembly route by a simulation. In the event that an apparatus for producing such an assembly route is actually constructed, it becomes a problem that how a high speed simulation is carried out while entering an operator's will and how a result of the simulation is offered in a form which is easy for the operator to see.

SUMMARY OF THE INVENTION

In view of the foregoing, it is therefore an object of the present invention to provide a disassembly route producing apparatus, an assembly route producing apparatus, and a supporting system for mechanical system design, which are excellent in operability or operational efficiency.

FIG. 1 is a block diagram useful for understanding a principle of a disassembly route producing apparatus, an assembly route producing apparatus, and a supporting system for mechanical system design according to the present invention.

A disassembly route producing apparatus according to the present invention has such a basic structure that the disassembly route producing apparatus comprising: a collision arithmetic means 11 for performing an operation in accordance with information representative of a plurality of parts and a product consisting of the plurality of parts, said operation including arithmetic operations as to a closest approach distance between a part in a disassembly and remaining parts while the product is disassembled, and a decision of an occurrence of a collision; and a disassembly route search means 12 for searching a disassembly route involving no occurrence of a collision of parts while said collision arithmetic means 11 performs said operation, wherein a disassembly route involving no occurrence of a collision of parts is detected.

Of the disassembly route producing apparatus having the above-mentioned basic structure according to the present invention, a first disassembly route producing apparatus is characterized in that said disassembly route search means 12 translates the part in a disassembly by a distance corresponding to the closest approach distance at the present time in the middle of a disassembly, and causes said collision arithmetic means 11 to perform said operation on a state after a translation of the part.

A second disassembly route producing apparatus according to the present invention is characterized in that the second disassembly route producing apparatus has the above-mentioned basic structure, and said collision arithmetic means 11 performs an operation including a decision as to an occurrence of a dangerous state in which said closest approach distance is not more than a predetermined distance, and said disassembly route producing apparatus further comprises a first display means 13 for displaying a figure of a product in the dangerous state or figures of two parts approaching one another up to the dangerous state.

A third disassembly route producing apparatus according to the present invention is characterized in that the third disassembly route producing apparatus has the above-mentioned basic structure, and further comprises a second display means 14 for displaying a figure representative of a state in the middle of a disassembly of the product to conduct a search for the disassembly route by said disassembly route search means 12, said second display means 14 including means 14a for prohibiting a disassembled part encountered non occurrence of a collision from being displayed.

A fourth disassembly route producing apparatus according to the present invention is characterized in that the fourth disassembly route producing apparatus has the above-mentioned basic structure, and further comprises a third display means 15 for displaying a figure representative of a state in the middle of a disassembly of the product to conduct a search for the disassembly route by said disassembly route search means 12;

a search direction designating means 16 for designating a sequence of a disassembly route search direction by said disassembly route search means 12 with a direction on the figure displayed on said third display means 15; and a figure selection means 17 for selecting a single figure to be displayed on said third display means 15 from among a plurality of figures of the product observed from a plurality of viewpoints, wherein said disassembly route search means 12 conducts a search for a disassembly direction in accordance with a sequence determined by the figure selected by said figure selection means 17 and the sequence of the disassembly route search direction designated by said search direction designating means 16.

A fifth disassembly route producing apparatus according to the present invention is characterized in that the fifth disassembly route producing apparatus has the above-mentioned basic structure, and said disassembly route search means 12 conducts a search for a disassembly route for a predetermined part, when said disassembly route search means failed in detecting a disassembly route involving no occurrence of a collision for the predetermined part, in such a manner that a size of the predetermined part is reduced by a predetermined reduction factor.

A sixth disassembly route producing apparatus according to the present invention is characterized in that the sixth disassembly route producing apparatus has the above-mentioned basic structure, and said information is representative of a part tree structure including configuration information of a plurality of parts and assembly arrangement information of the plurality of parts, and said disassembly route search means 12 performs a search for a disassembly route for parts in earlier turn with closer part to a terminal end of the part tree structure.

A seventh disassembly route producing apparatus according to the present invention is characterized in that the seventh disassembly route producing apparatus has the above-mentioned basic structure, and said information includes information of a subassembly consisting of a combination of one or more parts, in which an assembly arrangement is performed in a unitary basis, and said disassembly route search means 12 includes means includes means 12a for performing a search for a disassembly route for the product in unit of the subassembly.

An eighth disassembly route producing apparatus according to the present invention is characterized in that the eighth disassembly route producing apparatus has the above-mentioned basic structure, and further comprises a fourth display means 18 for displaying a figure representative of a state in the middle of a disassembly the product to conduct a search of the disassembly route by said disassembly route search means 12, said fourth display means 18 including means 18a for simultaneously displaying figures of a plurality of parts constituting the product, said figures being representative of a stat of the plurality of parts in the middle of a disassembly.

A ninth disassembly route producing apparatus according to the present invention is characterized in that the ninth disassembly route producing apparatus has the above-mentioned basic structure, and further comprises a part designating means 19 for designating a plurality of parts so that said disassembly route search means 12 simultaneously performs a search for the disassembly route.

A tenth disassembly route producing apparatus according to the present invention is characterized in that the tenth disassembly route producing apparatus has the above-mentioned basic structure, and further comprises a fifth display means 20 for displaying a list of names of parts constituting the product, said fifth display means 20 including means 20a for displaying, as to at least a part of the parts, names of the parts and associated figures as well.

An eleventh disassembly route producing apparatus according to the present invention is characterized in that the eleventh disassembly route producing apparatus has the above-mentioned basic structure, and further comprises a first disassembly route designating means 21 for manually designating a disassembly route for parts, wherein said disassembly route search means 12 conducts a search for a disassembly route in such a manner that when said disassembly route search means 12 failed in detecting a disassembly route for a certain part, the search for the disassembly route is interrupted, and upon receipt of a designation of a disassembly route for the part by said first disassembly route designating means 21, said disassembly route search means 12 initiates a search for a disassembly route for a subsequent part.

A twelfth disassembly route producing apparatus according to the present invention is characterized in that the twelfth disassembly route producing apparatus has the above-mentioned basic structure, and wherein when said disassembly route search means 12 failed in detecting a disassembly route for a certain part, said disassembly route search means 12 proceeds with a search for a disassembly route for a subsequent part leaving the part in failure as it is, and said disassembly route producing apparatus further comprises a second disassembly route designating means 22 for manually designating a disassembly route for the part in failure.

A thirteenth disassembly route producing apparatus according to the present invention is characterized in that the thirteenth disassembly route producing apparatus has the above-mentioned basic structure, and further comprises a third disassembly route designating means 23 for manually designating a disassembly route for parts; and a re-approach prohibiting means 24 for prohibiting, when a predetermined part is once apart from remaining parts over a predetermined distance during a designation of a disassembly route for the predetermined part by said third disassembly route designating means 23, said predetermined part from entering back a region less than a predetermined distance from the remaining parts.

A fourteenth disassembly route producing apparatus according to the present invention is characterized in that the fourteenth disassembly route producing apparatus has the above-mentioned basic structure, and wherein when said disassembly route search means 12 failed in detecting a disassembly route for a certain part, said disassembly route search means 12 proceeds with a search for a disassembly route for a subsequent part leaving the part in failure as it is, and after completion of a search for a disassembly route for all the parts, said disassembly route search means 12 regards a plurality of parts of remaining parts after completion of a search for a disassembly route for all the parts as a subassembly capable of being assembled on a unitary basis, and conducts a search for a disassembly route for the subassembly.

In the fourteenth disassembly route producing apparatus, it is preferable that said disassembly route search means 12 regards a plurality of parts mutually in contact with one another of remaining parts after completion of a search for a disassembly route for all the parts as the subassembly.

A fifteenth disassembly route producing apparatus according to the present invention is characterized in that the fifteenth disassembly route producing apparatus has the above-mentioned basic structure, and further comprises a disassembly impossible direction detecting means 25 for detecting, prior to disassembling a part intended to be disassembled, a disassembly impossible direction of the part, wherein said disassembly route search means 12 conducts a search for a disassembly route in directions except the disassembly impossible direction detected by said disassembly impossible direction detecting means 25.

A sixteenth disassembly route producing apparatus according to the present invention is characterized in that the sixteenth disassembly route producing apparatus has the above-mentioned basic structure, and wherein when said disassembly route search means 12 failed in detecting a disassembly route involving no occurrence of a collision for a predetermined part, said disassembly route search means again conducts the search for the disassembly route for the predetermined part in such a manner that the predetermined part is disposed at a position involved in an occurrence of a collision, and said position is set up as a starting point whereby a direction of the disassembly route for the predetermined part is altered for a disassembly.

A seventeenth disassembly route producing apparatus according to the present invention is characterized in that the seventeenth disassembly route producing apparatus has the above-mentioned basic structure, and wherein when a collision between a predetermined part intended to be disassembled and another part occurs, said disassembly route search means 12 reduces a size of the predetermined part in a face encountered an occurrence of the collision and translates the face of the part inside of the predetermined part, and then investigates an existence of the collision between the predetermined part and said another part.

It is to be noted that while the "face" may be understood such that the overall region of a certain plane of a part is usually addressed as the face, the "face" referred to in the present invention is not restricted to such a meaning. For example, in the event that a single plane is defined in the form of an assembly of a plurality of polygons, each of the plurality of polygons may be considered as a single face.

An eighteenth disassembly route producing apparatus according to the present invention is characterized in that the eighteenth disassembly route producing apparatus has the above-mentioned basic structure, and wherein when a plurality of parts failed in detecting a disassembly route involving no occurrence of a collision exist, said disassembly route search means translates the plurality of parts within a translation possible limit, and again conducts a search for a disassembly route for the plurality of parts.

A nineteenth disassembly route producing apparatus according to the present invention is characterized in that the nineteenth disassembly route producing apparatus has the above-mentioned basic structure, and further comprises an auxiliary appending means 26 for appending to a part intended to be disassembled an auxiliary part for a disassembly prior to disassembling the part intended to be disassembled, and wherein said disassembly route search means 12 regards the part intended to be disassembled and the auxiliary part appended to the part intended to be disassembled as parts having a single unitary body, and conducts a search for a disassembly route for the parts having a single unitary body.

A twenty disassembly route producing apparatus according to the present invention is characterized in that the twenty disassembly route producing apparatus has the above-mentioned basic structure, and wherein in the event that the parts constituting the product include a movable part having a joint, when a collision between a predetermined part and the movable part occurs in the middle of a disassembly of the predetermined part, said disassembly route search means 12 further translates the predetermined part and moves the movable part by a movement associated with a translation amount of the predetermined part.

In the event that the movable part is moved, it is acceptable, when the above-mentioned predetermined part is translated and a collision with the movable part occurs, that th movable part is moved by a movement associated with a translation amount of the predetermined part while the predetermined part is kept on the position after the translation, alternatively, it is also acceptable that the predetermined part is once put back in its place, and the movable part is moved by a predetermined movement so that the closest approach distance between the predetermined part and the movable part is detected, and then the predetermined part is translated by the closest approach distance.

A twenty-first disassembly route producing apparatus according to the present invention is characterized in that the twenty-first disassembly route producing apparatus has the above-mentioned basic structure, and further comprises a sixth display means 27 for displaying a figure consisting of only a part in a disassembly and a part in the closest distance to the part in a disassembly of all the parts constituting the product.

A twenty-second disassembly route producing apparatus according to the present invention is characterized in that the twenty-second disassembly route producing apparatus has the above-mentioned basic structure, and further comprises a seventh display means 28 for displaying a figure representative of a state in the middle of a disassembly of the product, said seventh display means 28 including means 28a for plotting only a part in a disassembly all of the parts constituting the product.

In the twenty-second disassembly route producing apparatus, it is either acceptable that the plotting scheme for the part in a disassembly is identical with or different from that for the parts other than the part in a disassembly. For example, it is acceptable that both schemes are related to a three-dimensional computer graphics plotting in which the parts other than the part in a disassembly are maintained once they are plotted, and only the part in a disassembly is re-plotted in accordance with its translation. Alternatively, it is acceptable that while the parts other than the part in a disassembly are being displayed in the form of an image having data corresponding to two-dimensional pixels, only the part in a disassembly is re-plotted in accordance with its translation.

Regarding the re-plotting of the part in disassembly, it is acceptable that the re-plotting is conducted after erasing the figure of the part in disassembly, which is previously displayed, alternatively it is acceptable that the re-plotting is conducted on an overwrite basis without erasing.

A twenty-third disassembly route producing apparatus according to the present invention is characterized in that the twenty-third disassembly route producing apparatus has the above-mentioned basic structure, and further comprises an eighth display means 29 for displaying a figure representative of a state in the middle of a disassembly of the product, said eighth display means including means 29a for plotting a part in a disassembly of all of the parts constituting the product, and other parts but the part in a disassembly in mutually different formats.

As the different plotting formats, there may be provided, for example, such a distinction that a good quality of plotting type of scheme (e.g. Open GL, etc.) is applied for only the part in a disassembly, while a high speed, but worse in picture quality, of plotting type of scheme (e.g. Direct 3D, etc.) is applied for other parts, alternatively such a distinction that a shading plotting type of scheme is applied for only the part in a disassembly, while a line drawing plotting type of scheme is applied for other parts, or such a distinction that a three-dimensional computer graphics plotting type of scheme is applied for only the part in a disassembly, while an image plotting type of scheme is applied for other parts.

A twenty-fourth disassembly route producing apparatus according to the present invention is characterized in that the twenty-fourth disassembly route producing apparatus has the above-mentioned basic structure, and further comprises an animation producing means 30 for producing an animation representative of a state of the product in a disassembly to conduct a search for the disassembly route by said disassembly route search means; and a ninth display means 31 for displaying the animation displayed by said animation producing means.

It is noted that the first to ninth display means 13, 14, 15, 18, 20, 27, 28, 29 and 31 are classified. In the event that a single apparatus having the common aspect of a plurality of assembly route producing apparatuses of the first to twenty-fourth disassembly route producing apparatuses is constructed, there is no need to provide individually the first to ninth display means 13, 14, 15, 18, 20, 27, 28, 29 and 31, and it is acceptable on a hardware basis that a single display means (e.g. the CRT display unit 104 shown in FIG. 2) is used. In a similar fashion to that of those display means, also with respect to the first to third disassembly route designating means 21 to 23, the search direction designating means 16, the figure selection means 17, the part designating means 19 and the auxiliary part applying means 26, it is acceptable on a hardware basis that a single handler or the like (e.g. the keyboard 101 or the mouse 103 shown in FIG. 2) is used.

An assembly route producing apparatus according to the present invention has an assembly route producing means, having the same function as the disassembly route search means 12, for producing an assembly route reversely tracing the disassembly route, which is substituted for the disassembly route search means 12 in the disassembly route producing apparatus according to the present invention. Other structural elements of the assembly route producing apparatus are the same as those of the disassembly route producing apparatus according to the present invention. Hereinafter, assembly route producing apparatuses, which includes the structural elements of the first to twenty-fourth disassembly route producing apparatus mentioned above, but the disassembly route search means 12 being replaced with the assembly route producing means, are referred to as first to twenty-fourth assembly route producing apparatuses corresponding to the first to twenty-fourth disassembly route producing apparatus, respectively.

For example, the first assembly route producing apparatus corresponds to the first disassembly route producing apparatus. The first assembly route producing apparatus comprises:

a collision arithmetic means 11 for performing an operation in accordance with information representative of a plurality of parts and a product consisting of the plurality of parts, said operation including arithmetic operations as to a closest approach distance between a part in a disassembly and remaining parts while the product is disassembled, and a decision of an occurrence of a collision; and an assembly route producing means 12 for searching a disassembly route involving no occurrence of a collision of parts, while said collision arithmetic means performs said operation, to detect the disassembly route involving no occurrence of a collision, and for producing an assembly route reversely tracing the disassembly route, wherein said assembly route producing means 12 translates the part in a disassembly by a distance corresponding to the closest approach distance at the present time in the middle of a disassembly, and causes said collision arithmetic means to perform said operation on a state after a translation of the part.

This is similar as to the matter of the second to twenty-fourth assembly route producing apparatus.

A supporting system for mechanical system design according to the present invention includes the disassembly route producing apparatus according to the present invention as it is, and is for supporting a design of a product consisting of parts capable of being assembled without encountering an occurrence of a collision of parts by detecting a disassembly route in accordance with information representative of a plurality of parts and a product consisting of the plurality of parts. The supporting system is the same as that of the disassembly route producing apparatus according to the present invention in the structural elements. Hereinafter, supporting system for mechanical system design, which includes the structural elements of the first to twenty-fourth disassembly route producing apparatus mentioned above, are referred to as first to twenty-fourth supporting systems for mechanical system design corresponding to the first to twenty-fourth disassembly route producing apparatus, respectively.

For example, the first supporting system for mechanical system design corresponds to the first disassembly route producing apparatus. There is provided the first supporting system for mechanical system design for supporting a design of a product consisting of parts capable of being assembled without encountering an occurrence of a collision of parts by detecting a disassembly route in accordance with information representative of a plurality of parts and a product consisting of the plurality of parts, said supporting system comprising:

a collision arithmetic means 11 for performing an operation in accordance with said information, said operation including arithmetic operations as to a closest approach distance between a part in a disassembly and remaining parts while the product is disassembled, and a decision of an occurrence of a collision;

a disassembly route search means 12 for searching a disassembly route involving no occurrence of a collision of parts while said collision arithmetic means performs said operation, wherein said disassembly route search means 12 translates the part in a disassembly by a distance corresponding to the closest approach distance at the present time in the middle of a disassembly, and causes said collision arithmetic means 11 to perform said operation on a state after a translation of the part.

This is similar as to the matter of the second to the twenty-fourth supporting system for mechanical system design.

It is to be noted that a difference between the disassembly route producing apparatus and the assembly route producing apparatus resides in the point that a disassembly route is detected or an assembly route reversely tracing the detected disassembly route is produced. This is simply a difference on an expression. Further, the supporting system for mechanical system design according to the present invention is to support a mechanical system design through detecting a disassembly route. This is also simply a difference on an expression. Therefore, the disassembly route producing apparatus, the assembly route producing apparatus and the supporting system for mechanical system design will not be particularly distinguished from one another, and any name may be representative of other hereinafter.

BRIEF DESCRIPTION OF THE DRAWINGS

FIG. 30 is a flowchart of a part selection routine;

FIGS. 31(a) and 31(b) are views each showing a sequence of a part disassembly;

FIGS. 38(a), 38(b) and 38(c) are illustrations showing a state that one of parts on graphics screens is now being disassembled;

FIGS. 47(*a*) and 47(*b*) are an explanatory view useful for understanding characteristic portions of a seventeenth assembly route producing apparatus according to an embodiment of the present invention;

FIG. 56 is a view showing the manner in which a disassembly of parts is possible or impossible;

FIG. 57 is a view showing the manner in which a disassembly of parts is possible or impossible;

DESCRIPTION OF THE PREFERRED EMBODIMENTS

Hereinafter, there will be described embodiments of the present invention. First, a common structure of the first to twenty-fourth assembly route producing apparatuses according to embodiments of the present invention will be described, and then structural characteristic portions of the respective assembly route producing apparatuses will be described.

Figure 2:
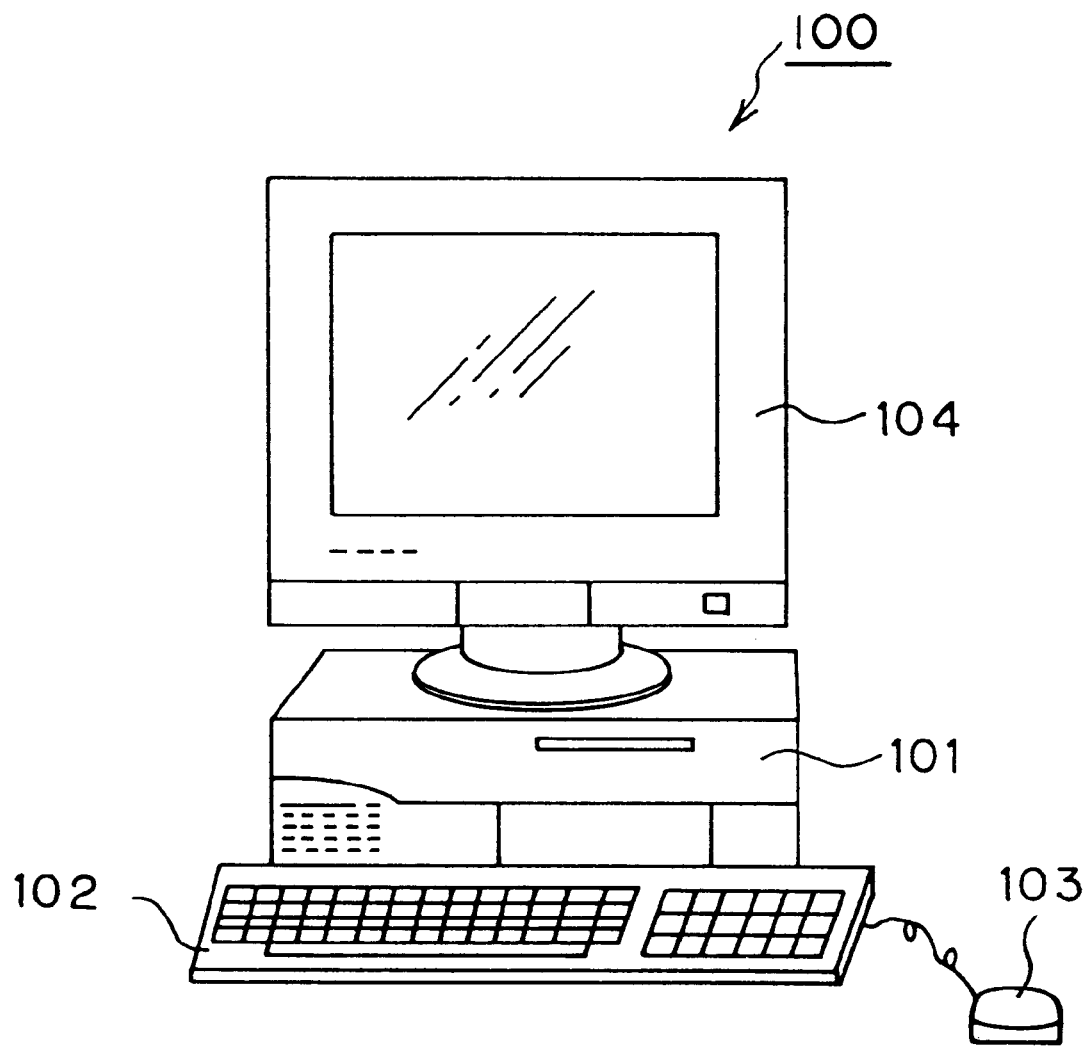
FIG. 2 is a perspective illustration of an assembly route producing apparatus including the respective embodiments of first to twenty-fourth assembly route producing apparatuses according to the present invention.

FIG. 2 is a perspective illustration of an assembly route producing apparatus including the respective embodiments of the first to twenty-fourth assembly route producing apparatuses according to the present invention.

As shown in FIG. 2, an assembly route producing apparatus 100 is implemented as a computer system, and comprises a main frame 101 into which a CPU is incorporated, a keyboard 102, a mouse 103 and a CRT display unit 104. The main frame 101 incorporates thereinto in addition to the CPU a floppy disk drive unit onto which a floppy disk is loaded to read data recorded on the floppy disk or to record data on the floppy disk, a magnetic disk unit for storing a large memory capacity of data, etc.

According to the present embodiment, data representative of a three-dimensional configuration of components or parts constituting an assembly route analyzing product designed using a three-dimensional CAD system (not illustrated), assembly arrangement data representative of positions of an assembly arrangement of the parts and their orientation or attitude, and if necessary, in addition, data representative of a subassembly comprising combinations of parts in which an assembly arrangement is performed on a unitary basis are downloaded onto a floppy disk at the three-dimensional CAD system end, and the floppy disk thus downloaded is loaded on the assembly route producing apparatus 100 shown in FIG. 2 to read necessary data through the floppy disk.

It is acceptable that the three-dimensional CAD system and the assembly route producing apparatus 100 are connected with each other via a communication line so that data entered from the three-dimensional CAD system through the communication line are stored in the magnetic disk unit incorporated into the assembly route producing apparatus 100. Alternatively, it is also acceptable that the three-dimensional CAD system is incorporated into the assembly route producing apparatus 100.

On the CRT display unit 104 shown in FIG. 2, various screens may be opened. As main ones of those screens, as will be shown in some figures referred to later, there exist a graphics screen representative of a three-dimensional configuration of products before a disassembly and in the middle of a disassembly, and a part tree structure screen representative of a disassembly/assembly system of a plurality of parts constituting various menu screens and products, the part tree structure screen being opened in the form that it is superimposed on the graphics screen.

Figure 1:
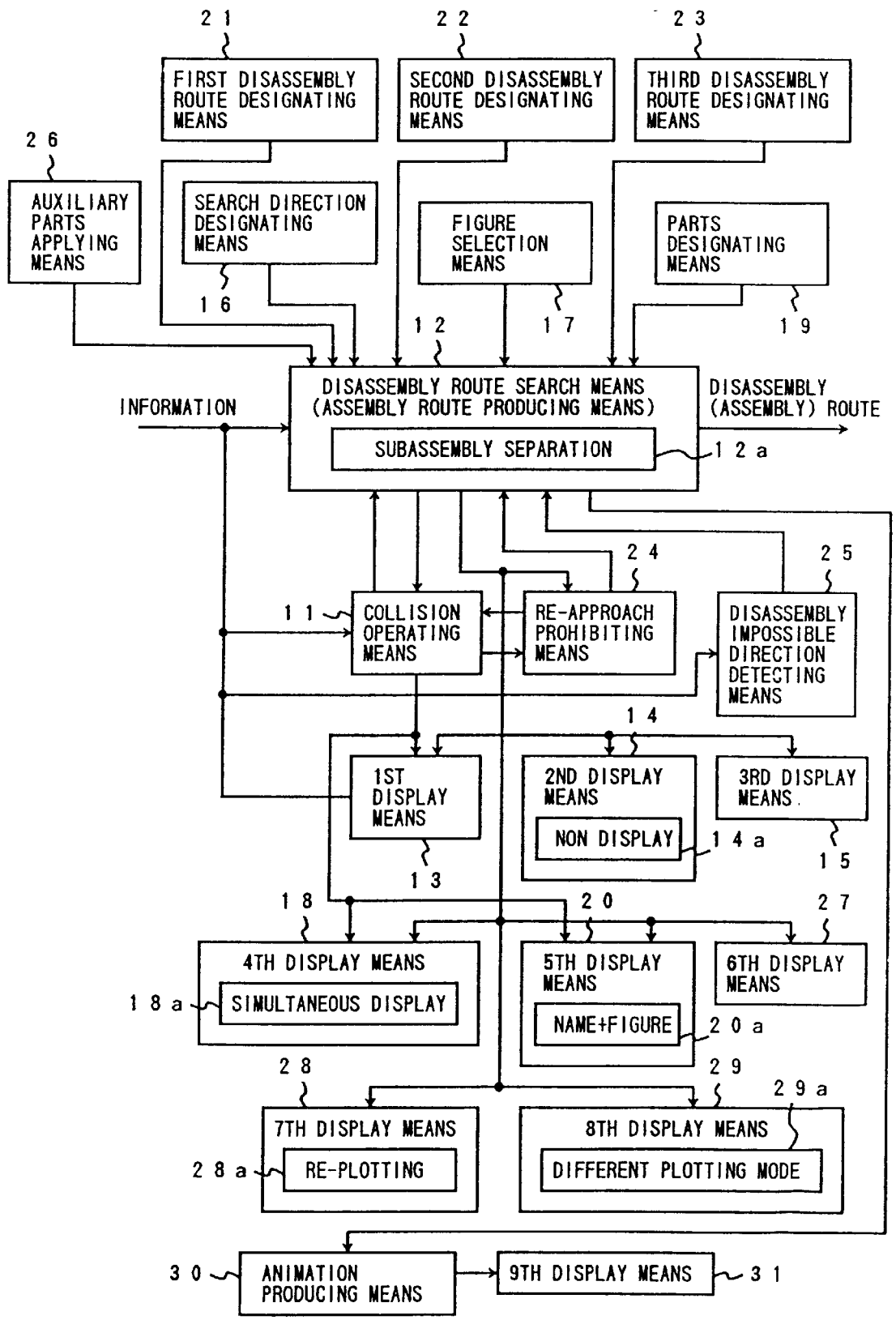
FIG. 1 is a block diagram useful for understanding a principle of a block diagram useful for understanding a principle of a disassembly route producing apparatus, an assembly route producing apparatus, and a supporting system for mechanical system design according to the present invention.
Figure 3:
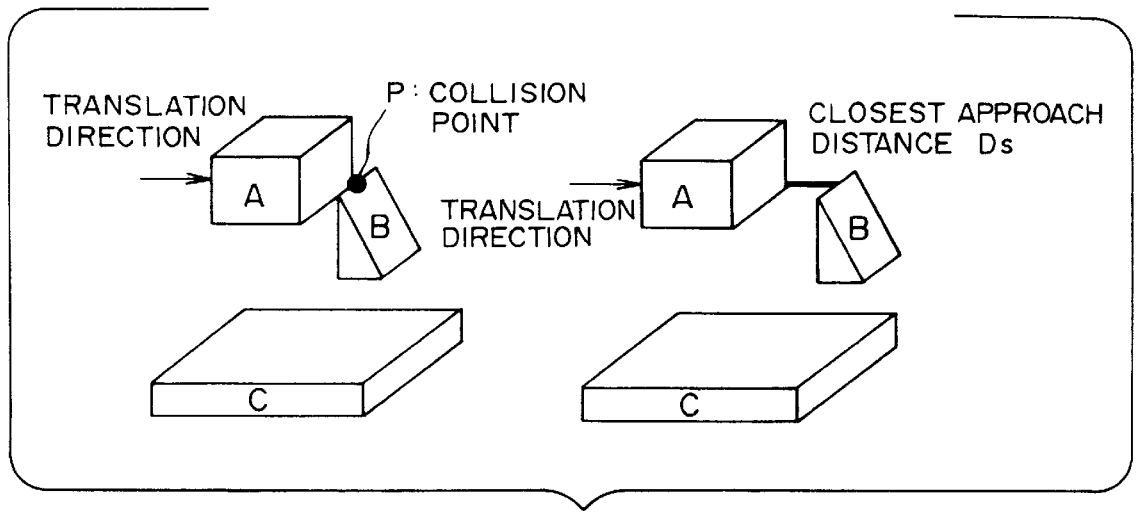
FIG. 3 is illustration showing a graphics screen by way of example useful for understanding an operational content of a collision arithmetic means.

FIG. 3 is an illustration showing a graphics screen by way of example useful for understanding an operational content of a collision arithmetic means 11 shown in FIG. 1. It is to be noted that in FIG. 3 and the following figures, not only figures constructing a screen, but also figures, sentences, symbols, etc. for the purpose of an explanation are simultaneously shown. For example, in FIG. 3, alphabetical letters "A", "B" and "C" representative of components or parts, characters "TRANSLATION DIRECTION", arrows indicative of directions of the translation direction, characters "P: COLLISION POINT", and characters "CLOSEST APPROACH DISTANCE" are shown in the figures for the purpose of an explanation, but indeed not shown in the CRT display unit 104 (cf. FIG. 2). This is the similar as to the matter of the following figures of this type. It is assumed that the product consists of three fragments or parts A, B and C as shown in FIG. 3, and the part A is translated in the translation direction as shown in FIG. 3. At that time, the collision arithmetic means 11 performs, as shown in FIG. 3, an operation for a decision of the presence of a collision (contact) of parts, and as shown in FIG. 3, an operation for a closest approach distance of parts. For these operations for a decision of the presence of a collision and a closest approach distance of parts, for example, an algorithm proposed by Japanese Patent Application serial No. Hei.8-127438 can be preferably adopted.

Figure 4:
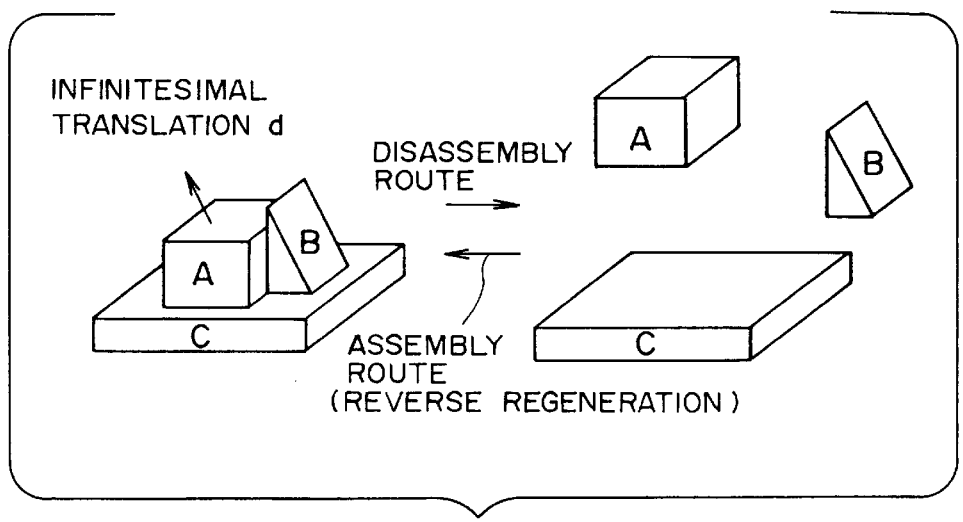
FIG. 4 is illustration showing a graphics screen by way of example useful for understanding a relationship between a disassembly route and an assembly route.

FIG. 4 is illustration showing a graphics screen by way of example useful for understanding a relationship between a disassembly route and an assembly route.

FIG. 4 shows by way of example a graphics screen showing a state in which a product consisting of three parts A, B and C is assembled. Starting from this condition, retaining the part C, first, the part A is translated by an infinitesimal distance $\underline{d}$ to perform a check of the presence of a collision. This is repeated. As a result, if no collision occurs, the part A is translated up to the state that the part A is located sufficiently far apart from the part C. Likely, the part B is translated up to the state that the part B is located sufficiently far apart from the part C. Thus, as shown in FIG. 4, it brings about the state that three parts A, B and C are separated from one another. An establishment of a disassembly route of parts A and B, where the parent part C is given as a reference, makes it possible to assemble the separated parts A, B and C into a product by means of reversely tracing the disassembly route of the parts A and B. In this manner, according to the present embodiment, it is recognized that a disassembly route free from the occurrence of a collision is searched, and a route, in which the disassembly route free from the occurrence of a collision is reversely traced, is an assembly route free from the occurrence of a collision.

According to the present embodiment, to search a disassembly route, there is adopted a so-called "Generate and Test" scheme in which a part is translated by a little in an arbitrary direction to perform a collision check, and if it is confirmed that no collision occurs, then the part is further translated by a little to perform a collision check.

Figure 5:
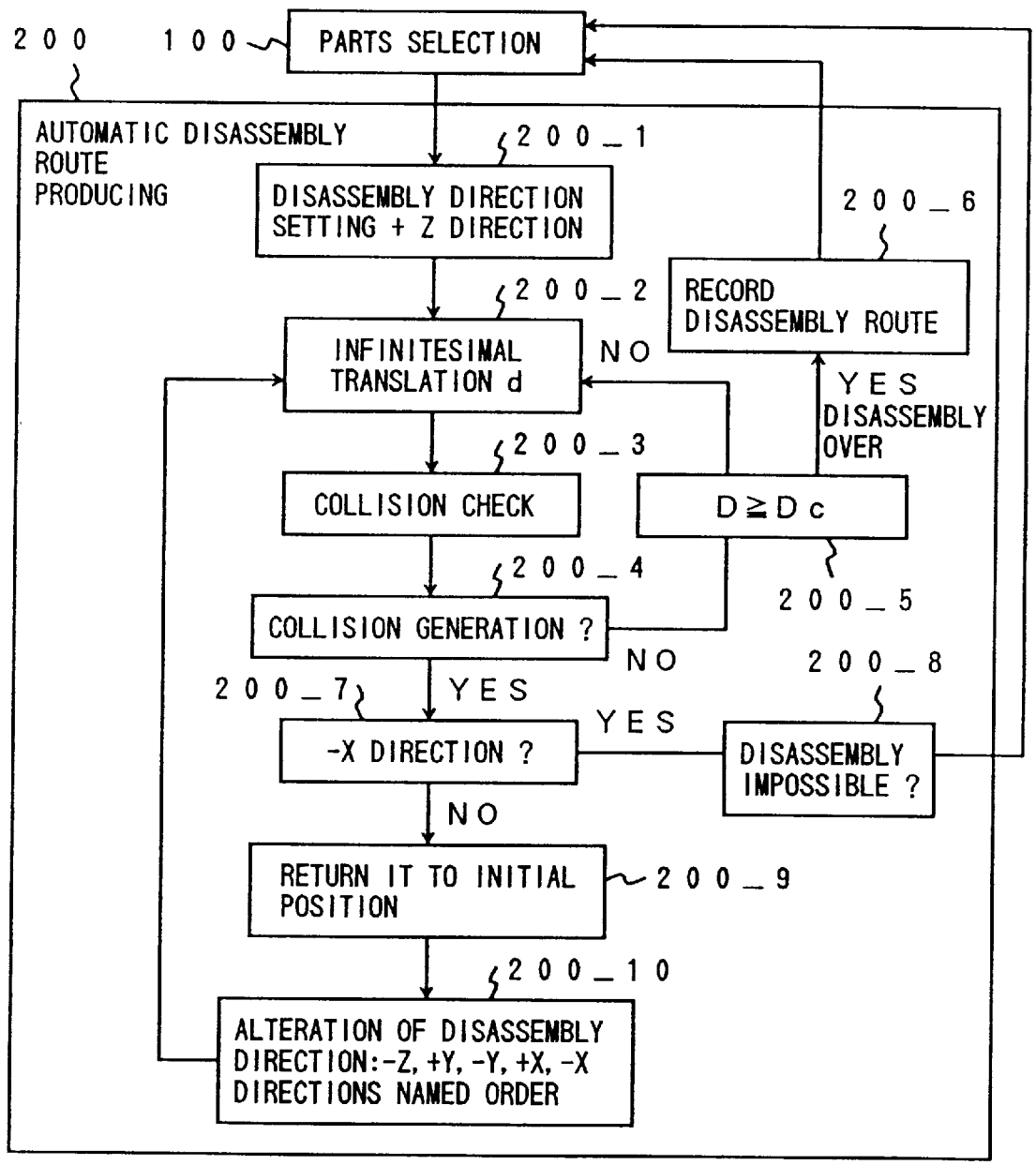
FIG. 5 is a flowchart useful for understanding a procedure for a search of a disassembly direction.

FIG. 5 is a flowchart useful for understanding a fundamental procedure for a search of a disassembly direction.

First, a parts selection routine 100 for selecting parts to be disassembled is executed, and then an automatic disassembly route producing routine 200 is executed on the selected part. In the automatic disassembly route producing routine 200, first, a disassembly direction of the selected part is set up (step 200_1). Here, it is assumed that a search of the disassembly direction is designated beforehand to be carried out in +Z direction, −Z direction, +Y direction, −Y direction, +X direction, and −X direction in the named order (step 200_10).

In a step 200_2, the selected part is translated by an infinitesimal movement d in the disassembly direction (here +Z direction) now designated, and the process goes to a step 200_3 in which a collision check (determination of the presence of a collision) is performed. If no collision is present (step 200_4), the process goes to a step 200_5 in which it is evaluated as to whether a translation distance D, which is accumulated in translation from the state that the part now on disassembly is assembled, is not less than a constant distance Dc. If D<Dc, the process returns to the step 200_2 in which the part is further translated by an infinitesimal movement $\underline{d}$. Those processes are repeated, and when D≧Dc is decided in the step 200_5, in other words, when it is decided that the part is disassembled up to a sufficiently great distance, the process goes to the step 200_6 in which a disassembly route free from an occurrence of a collision is recorded with respect to the part of interest, and then the process returns to the parts selection routine 100 in which if parts, which are not yet disassembled, exist, one of the non-disassembled parts is selected as a part of an object of the disassembly.

Figure 6A:
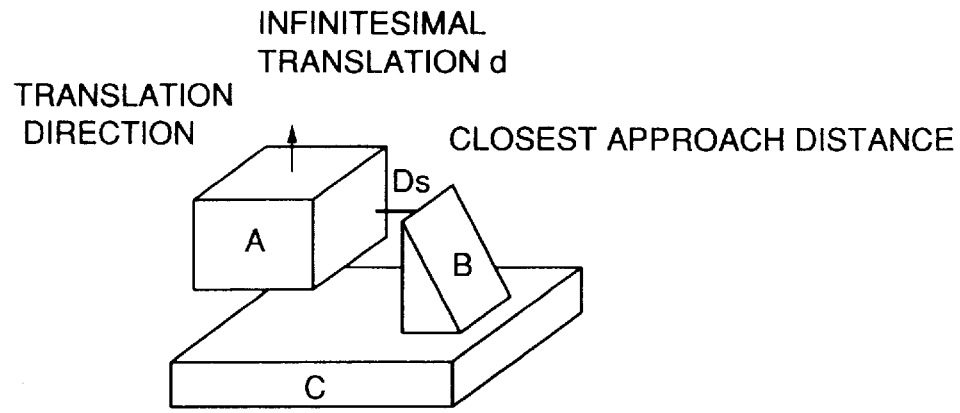
FIGS. 6(a), 6(b) and 6(c) are explanatory views useful for understanding an infinitesimal movement $\underline{d}$, a shift distance $\underline{D}$ and a closest approach distance $\underline{Ds}$.
Figures 6B, 6C:
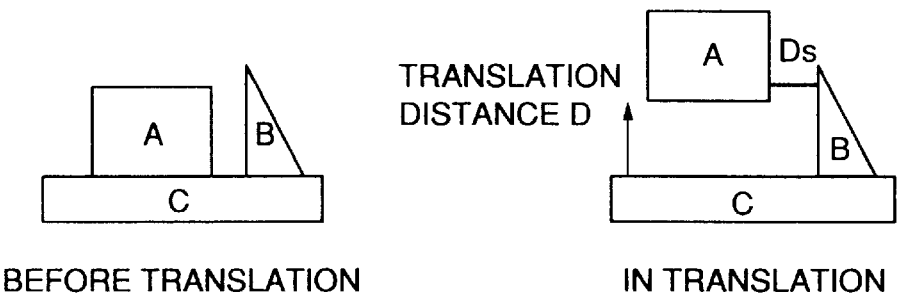

FIGS. 6(a), 6(b) and 6(c) are explanatory views useful for understanding an infinitesimal movement $\underline{d}$, a shift distance $\underline{D}$ and a closest approach distance $\underline{Ds}$. FIGS. 6(b) and 6(c) show each a two-dimensional figure for better understanding.

It is assumed that part A is translated starting from the stationary state shown in FIG. 6(b) upward little by little by an infinitesimal movement $\underline{d}$, and reaches the state of the middle of a translation as shown in FIG. 6(c). In this case, a cumulative value Σd of the infinitesimal movement $\underline{d}$ from the stationary state shown in FIG. 6(b) is addressed as a translation distance D. On the other hand, the closest approach distance $\underline{Ds}$ denotes a distance (e.g. a distance between the part A and the part B) of the closest approach points between a part (e.g. the part A) of the middle of a translation and remaining parts (e.g. the parts B and C).

Returning to FIG. 5, the explanation will be continued.

In the step 200_4, when it is decided that an occurrence of a collision is present, the process goes to a step 200_7 in which it is decided as to whether a disassembly of the part has been tried in the whole direction, in other words, it is decided as to whether the disassembly direction now on set up is involved in the final −X direction. If it is decided that the disassembly direction now on set up is involved in the final −X direction, the process goes to a step 200_8 in which it is informed the system that the disassembly is impossible, and then the process returns to the parts selection routine 100. An explanation for the system side which receives information that the disassembly is impossible will be made later.

In the step 200_7, if it is decided that the disassembly direction now on set up is not involved in the final −X direction, the process goes to a step 200_9 in which the part in the middle of a disassembly is put back in its assembly place, and then the process goes to a step 200_10 in which the disassembly direction is altered and returns to the step 200_2 in which the part of interest is translated by an infinitesimal movement $\underline{d}$ in the altered new disassembly direction. Likewise, hereinafter, a search of the disassembly route is carried out.

While a search of the disassembly route is carried out, there is displayed on the CRT display unit 104 shown in FIG. 2, for example, a graphics screen as shown in FIG. 6(a), which is representative of the state of the middle of a disassembly, of a product of interest to be disassembled.

Figure 7:
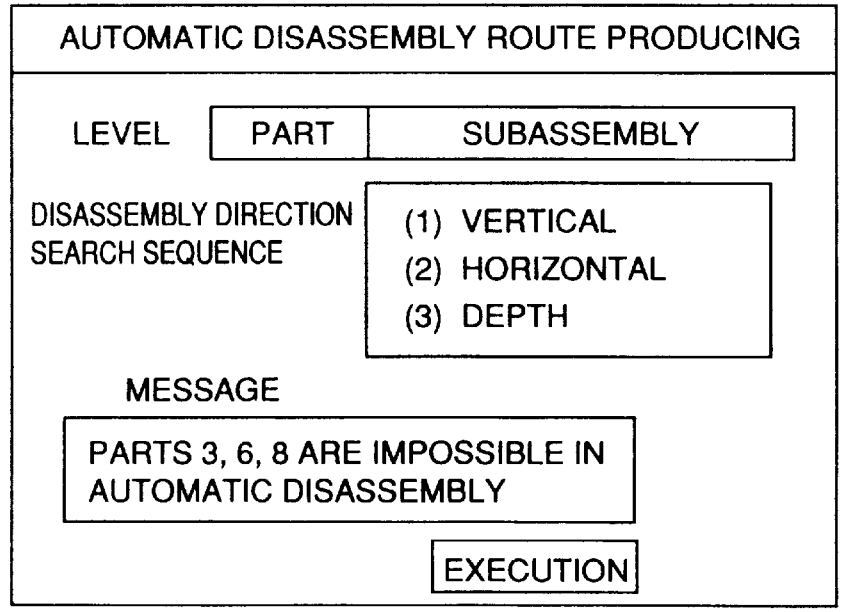
FIG. 7 is a view showing a screen of an automatic disassembly route producing set up menu by way of example.

FIG. 7 is a view showing a screen of an automatic disassembly route producing set up menu by way of example.

This menu screen is displayed on the CRT display unit 104 when the mouse 103 shown in FIG. 2 is operated and the associated icon of a main menu (not illustrated) is clicked.

On the screen of an automatic disassembly route producing set up menu, there are displayed "LEVEL", "DISASSEMBLY DIRECTION SEARCH SEQUENCE", "MESSAGE" and "EXECUTION BUTTON". The item "LEVEL" is a column for setting up as to whether a product of interest to be disassembled is completely disassembled into individual parts, or is disassembled into a stage of a subassembly in which at least two parts are assembled. The default value is set up onto a "PART" indicative of that the product is completely disassembled into individual parts. The item "DISASSEMBLY DIRECTION SEARCH SEQUENCE" is a column for designating the order of the search in a disassembly direction on a display screen of the CRT display unit 104 shown in FIG. 2. According to the example shown in FIG. 7, "VERTICAL", "HORIZONTAL" and "DEPTH" are designated in the named order.

The item "MESSAGE" is a column in which nothing is displayed before the search of a disassembly route, and a message associated with the situation after the search of a disassembly route. According to the example shown in FIG. 7, it is indicated that as a result of the search of a disassembly route, parts 3, 6 and 8 are not disassembled on an automatic basis.

The item "EXECUTION BUTTON" is an icon which is clicked when the items "LEVEL" or "DISASSEMBLY DIRECTION SEARCH SEQUENCE" is altered. Clicking the item "EXECUTION BUTTON" may determine an alteration of the items "LEVEL" or "DISASSEMBLY DIRECTION SEARCH SEQUENCE".

Figure 8:
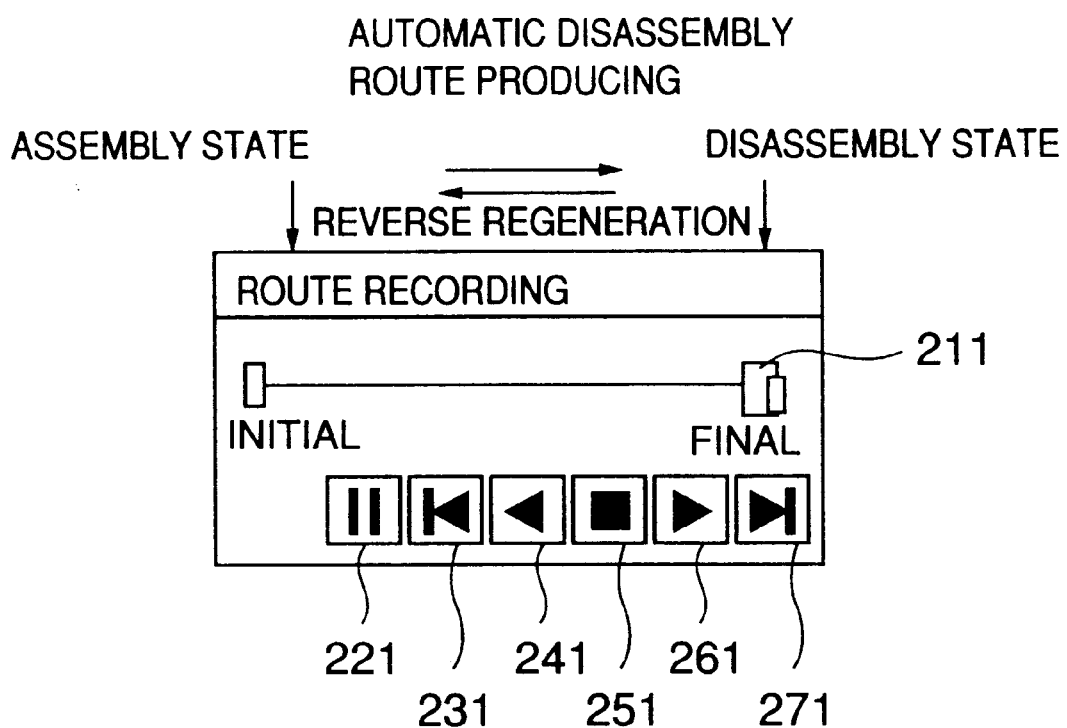
FIG. 8 is a view showing a screen of a route recording operation menu by way of example.

FIG. 8 is a view showing a screen of a route recording operation menu by way of example.

This menu screen is also displayed on the CRT display unit 104 when the mouse 103 shown in FIG. 2 is operated and the associated icon of a main menu (not illustrated) is clicked.

A cursor 211 is translated between an initial position representative of an assembly state in which parts are assembled in the form of a product and a final position representative of a disassembly state in which a disassembly has been completed. A translation of the cursor 211 is carried out by clicking a temporary stop button 221, a rewind button 231, a reverse regeneration button 241, a stop button 251, a regeneration button 261, and a rapid traverse button 271 through the mouse 103.

When the temporary stop button 221 is clicked, the cursor 211 in traveling is temporarily stopped, and when the temporary stop button 221 is again clicked, the cursor 211 resumes in translation immediately before the temporary stop button 221 is clicked for the first time. The rewind button 231 serves to translate at once the cursor 211 to an initial position. The reverse regeneration button 241 serves to translate slowly the cursor 211 at a predetermined speed from a final position side to an initial position side. The stop button 251 serves to stop a translation of the cursor 211 in traveling. When the stop button 251 is clicked, the cursor 211 is retained in the state that it is kept on stop even if the stop button 251 is clicked again. In this respect, the stop button 251 is different from the temporary stop button 221. The regeneration button 261 serves to translate slowly the cursor 211 at a predetermined speed from an initial position side to a final position side. The rapid traverse button 271 serves to translate at once the cursor 211 to a final position.

For example, when a part is designated by clicking a desired part on a graphics screen which is simultaneously displayed with the menu screen shown in FIG. 8, and then the cursor 211 is translated on the menu screen shown in FIG. 8 to a desired position, there is displayed a graphics screen in such a state that the designated part is disassembled to a position corresponding to the position to which the cursor 211 is translated. For example, with respect to the product composed of parts A, B and C shown in FIGS. 6(a), 6(b) and 6(c), when the part A is designated, and then the cursor 211 is translated to an optional position, there is displayed a graphics screen, as shown in FIG. 6(a), in which the part A is translated to a position corresponding to the translated position of the cursor 211. In this manner, designating a part and translating the cursor 211 make it possible to reproduce an arbitrary halfway state in a process of disassembly or assembly of a product.

Figure 9:
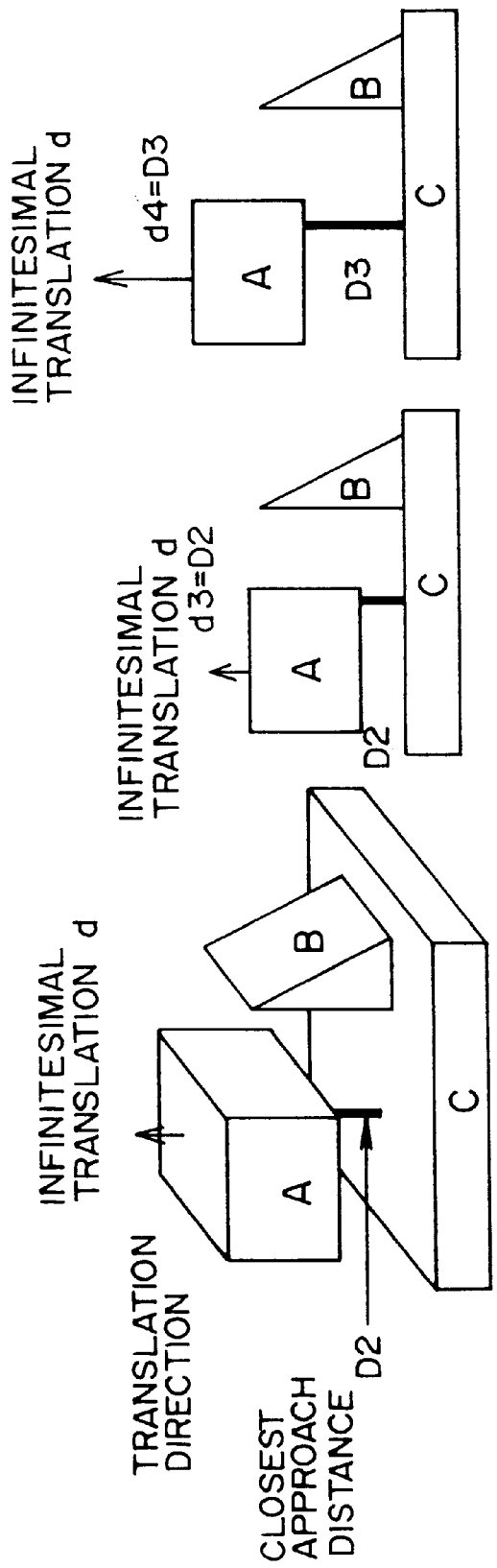
FIGS. 9(a), 9(b) and 9(c) are explanatory views useful for understanding characteristic portions of a first assembly route producing apparatus according to an embodiment of the present invention.

FIGS. 9(a), 9(b) and 9(c) are explanatory views useful for understanding characteristic portions of a first assembly route producing apparatus according to an embodiment of the present invention.

Assume that a part A is translated upward little by little by an infinitesimal movement $\underline{d}$, and as a result the closest approach distance at the present time is D2 shown in FIG. 9(a). At that time, the subsequent infinitesimal movement $\underline{d}$=d3 of the part A is set up to d3=D2, and the part A is translated by D2 to perform a collision check, so that the closest approach distance D3 is obtained. If no collision occurs, then d4=D3 is set up where the translation distance $\underline{d}$ of the part A is given by d4, that is, $\underline{d}$=d4.

In this manner, the part in disassembly is translated in the next step by a distance equivalent to the closest approach distance at the present time in the middle of a disassembly to perform a collision check with respect to the state after the translation. This feature makes it possible to perform a search of a disassembly route at higher speed as compared with a scheme in which a part is translated little by little simply by the same movement, since a step of movement is increased as the part in disassembly goes away farther from the remaining parts.

Figure 10:
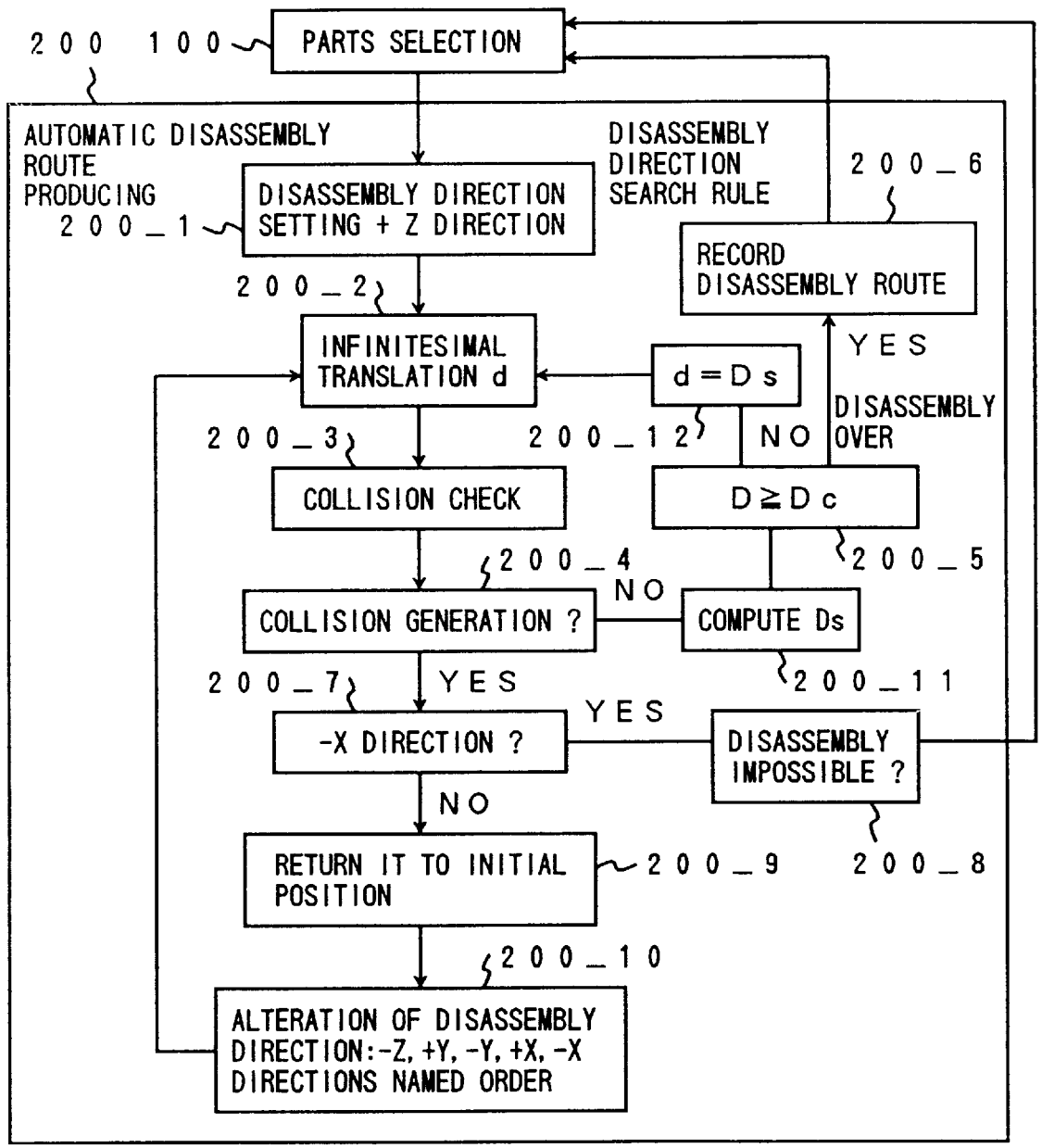
FIG. 10 is a flowchart showing a routine for implementing characteristic structures shown in FIGS. 9(a), 9(b) and 9(c)

FIG. 10 is a flowchart showing a routine for implementing characteristic structures shown in FIGS. 9(a), 9(b) and 9(c). Here, there will be described a difference between it and the flowchart of the basic routine shown in FIG. 5.

In the flowchart shown in FIG. 10, as compared with the flowchart shown in FIG. 5, there are added step 200_11 and step 200_12. In step 200_11, a calculation of the closest approach distance Ds is performed. In step 200_11, as a movement $\underline{d}$ of a part, $\underline{d}$=Ds is set up.

Next, there will be explained aspects of a second assembly route producing apparatus according to an embodiment of the present invention.

Figure 11:
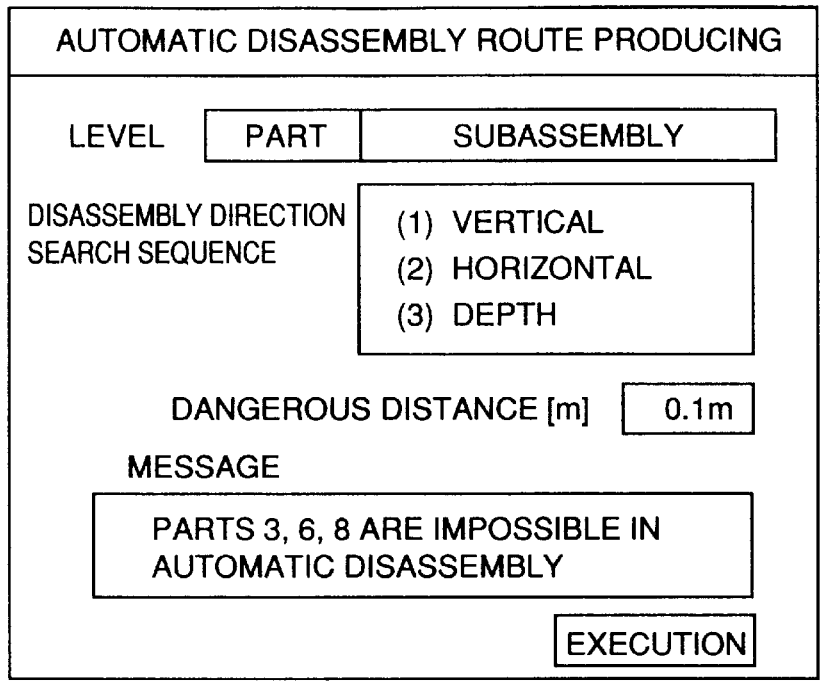
FIG. 11 is a view showing an alternative screen of an automatic disassembly route producing set up menu, which may be adopted instead of the screen of the automatic disassembly route producing set up menu shown in FIG. 7.

FIG. 11 is a view showing an alternative screen of an automatic disassembly route producing set up menu, which may be adopted instead of the screen of the automatic disassembly route producing set up menu shown in FIG. 7. Here, there will be described a difference between it and the menu screen shown in FIG. 7.

In the menu screen shown in FIG. 11, as compared with the menu screen shown in FIG. 7, there is added a "DANGEROUS DISTANCE". The dangerous distance is such a distance that while a certain part is disassembled, the part is too close to another part, although it does not interfere with another part, and thus it is decided that there is a possibility of danger that the part comes in contact with another part in an actual assembly work. According to an example shown in FIG. 11, the "DANGEROUS DISTANCE" is given with 0.1 m, and it is monitored in a search of a disassembly route whether the closest approach distance between the part in a disassembly and another part is not less than 0.1 m.

Figure 12:
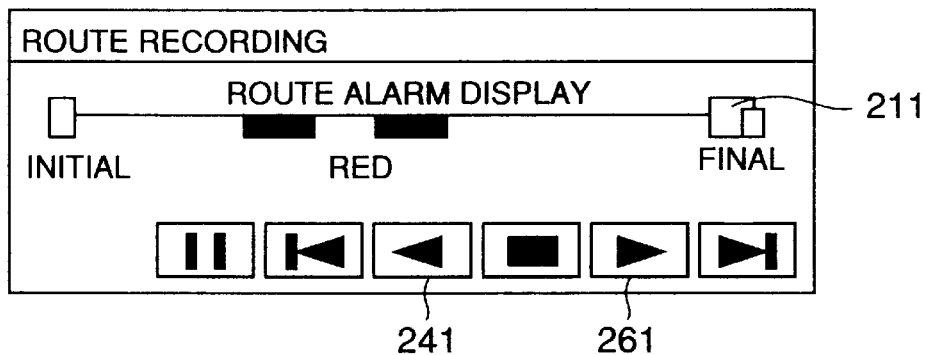
FIG. 12 is a view showing a screen of a route recording operation menu by way of example.

FIG. 12 is a view showing a screen of a route recording operation menu by way of example, which is similar to that of FIG. 8.

On the menu screen shown in FIG. 12, as a difference from the menu screen shown in FIG. 8, there is displayed a route alarm indication with red in the middle between the initial position and the final position. The route alarm indication is displayed on the route recording operation menu when a search of a disassembly route is terminated. The route alarm indication means that the part in disassembly approaches another part within the dangerous distance (here 0.1 m) in the middle of the disassembly route associated with the alarm indication position.

After termination of the search of a disassembly route, when the reverse regeneration button 241 or the regeneration button 261 is depressed to translate the cursor 211, a graphics screen in the state associated with the cursor 211 is displayed whenever the cursor 211 reaches the position of the route alarm indication, so that an operator can visually recognize the situation.

Figure 13:
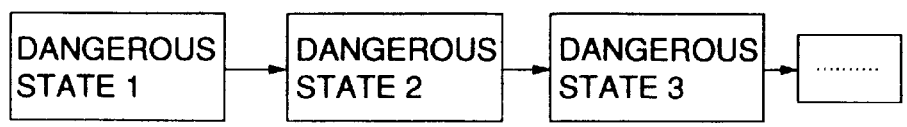
FIG. 13 is an explanatory view useful for understanding a display sequence of the graphics screens.

FIG. 13 is an explanatory view useful for understanding a display sequence of the graphics screens at that time.

Here, there is not displayed a graphics screen associated with a position of the cursor 211 in which no route alarm indication exists, and as shown in FIG. 13, there is provided such a display that only the graphics screens involved in the dangerous state undergoing the route alarm indication are switched in turn. Providing such a display of only the dangerous state makes it possible to implement a high speed plotting, and also to strongly impress on an operator the dangerous state.

Figures 14A, 14B:
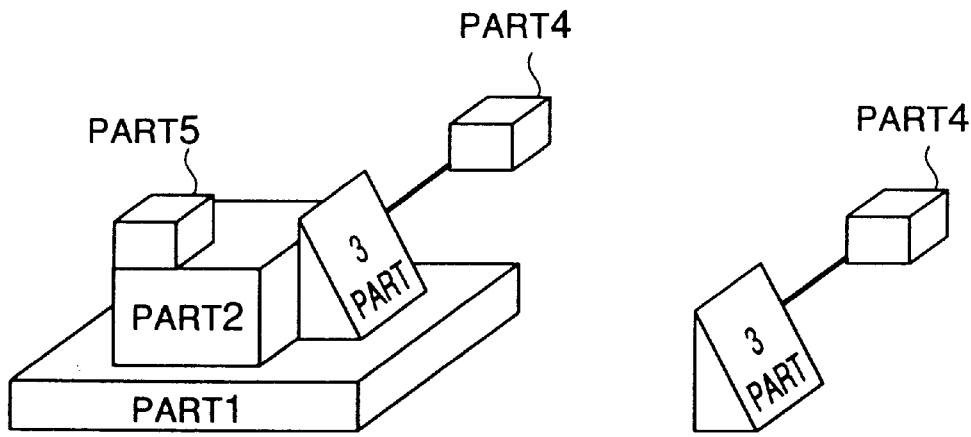
FIGS. 14(a) and 14(b) are illustrations each showing a display mode wherein a dangerous state of graphics screen is displayed.

FIGS. 14(a) and 14(b) are illustrations each showing a display mode wherein a dangerous state of graphics screen is displayed.

In FIG. 14(a), there are displayed not only two parts in the dangerous state, but also all the parts in the state of a disassembly at that time. In FIG. 14(b), there are displayed only two parts in the dangerous state.

A display scheme shown in FIG. 14(a) is suitable for grasping the state of a disassembly in the dangerous state in its entirety, while a display scheme shown in FIG. 14(b) is suitable for a higher speed of plotting, and more strongly impressing on an operator a dangerous state.

Figure 15:
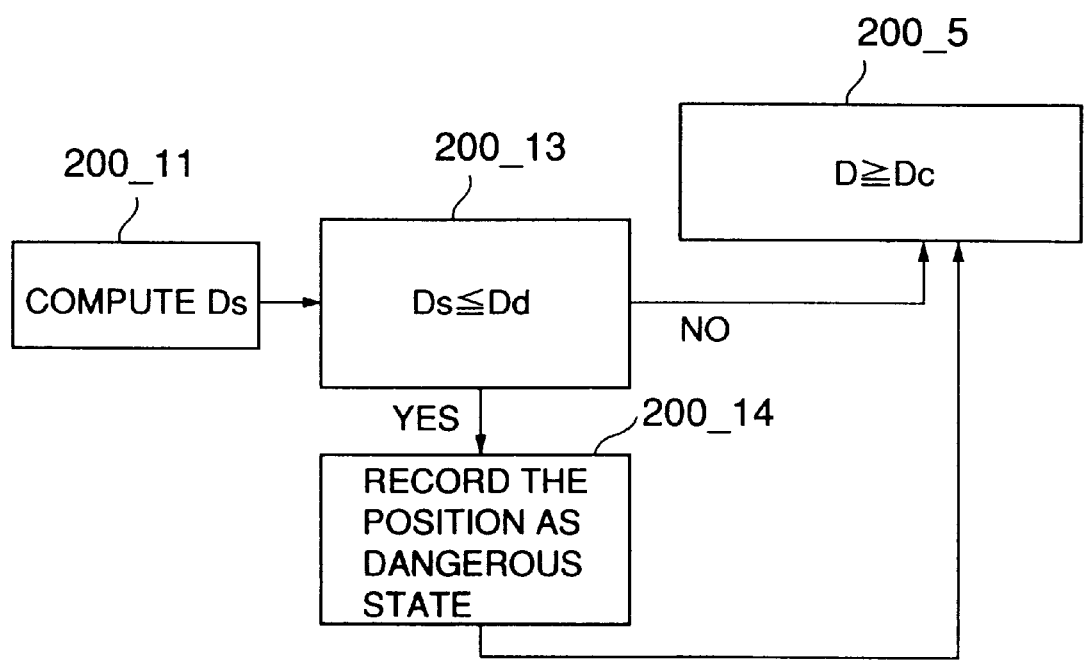
FIG. 15 is a flowchart of a portion, which is to be added to the basic routine shown in FIG. 5, of routines for implementing characteristic structures of a second assembly route producing apparatus according to an embodiment of the present invention.
Figure 16A:
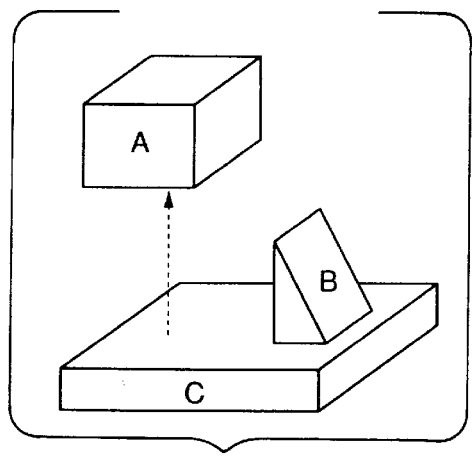
FIGS. 16(a), 16(c) and 16(d) are illustrations of graphics screens by way of example useful for understanding characteristic portions of a third assembly route producing apparatus according to an embodiment of the present invention.
Figure 16B:
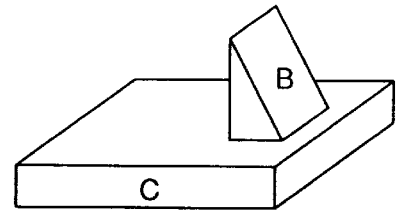
Figure 16C:
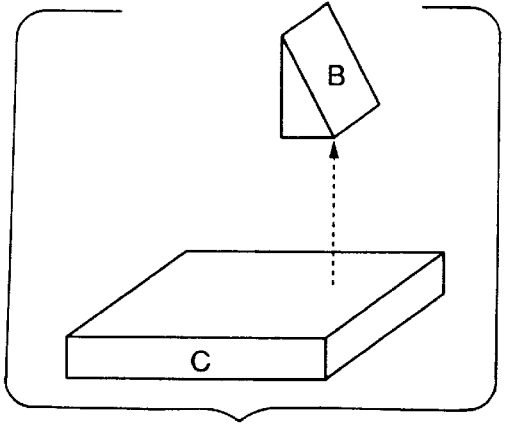
Figure 16D:
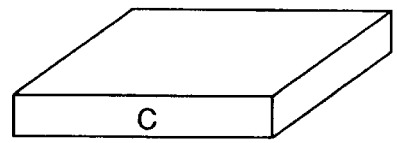

FIG. 15 is a flowchart of a portion, which is to be added to the basic routine shown in FIG. 5, of routines for implementing characteristic structures of a second assembly route producing apparatus according to an embodiment of the present invention.

In the step 200_4 in which a decision of the presence of a collision is performed, when it is decided that no collision occurs, the process does not go directly to the step 200_5, but go to a step 200__11 shown in FIG. 15 in which a calculation of the closest approach distance Ds is carried out. In a step 200__13, the closest approach distance Ds is compared with a certain constant distant Dd, which is a threshold as to whether a part is in the dangerous state set up by the item "DANGEROUS DISTANCE" shown in FIG. 11, and if Ds>Dd, the process goes directly to the step 200__5, whereas if Ds≦Dd the process goes to the step 200__14 in which the matter of the dangerous state is recorded, and then goes to the step 200__5.

The matter recorded in the step 200__14 is reflected, as mentioned above, on the screen of a route recording operation menu shown in FIG. 12.

Next, there will be explained aspects of a third assembly route producing apparatus according to an embodiment of the present invention.

FIGS. 16(*a*), 16(*b*) and 16(*c*) are illustrations of graphics screens by way of example useful for understanding characteristic portions of a third assembly route producing apparatus according to an embodiment of the present invention.

As shown in FIG. 16(*a*), when a part A is disassembled by a predetermined distance, the part A is erased from the graphics screen as shown in FIG. 16(*b*). And as shown in FIG. 16 (*c*), when a part B is disassembled by a predetermined distance, the part B is erased from the graphics screen as shown in FIG. 16(*d*). Reversely, when an assembly is performed, starting from the state of FIG. 16(*d*), the part B appears at the position apart from a parent part C as shown in FIG. 16(*c*), the part B is assembled as shown in FIG. 16(*b*), then the part A appears as shown in FIG. 16(*a*), and the part A is assembled.

In this manner, the parts, which have been subjected to a disassembly, are not displayed. This feature makes it possible to hasten a plotting speed of the graphics screen. Further, it is permitted that the parts, which have been subjected to a disassembly, are removed from an object of a collision check, and thus it is possible to hasten an operation speed. Furthermore, it is possible to provide a screen easy to see in which useless parts are not displayed.

Figure 17:
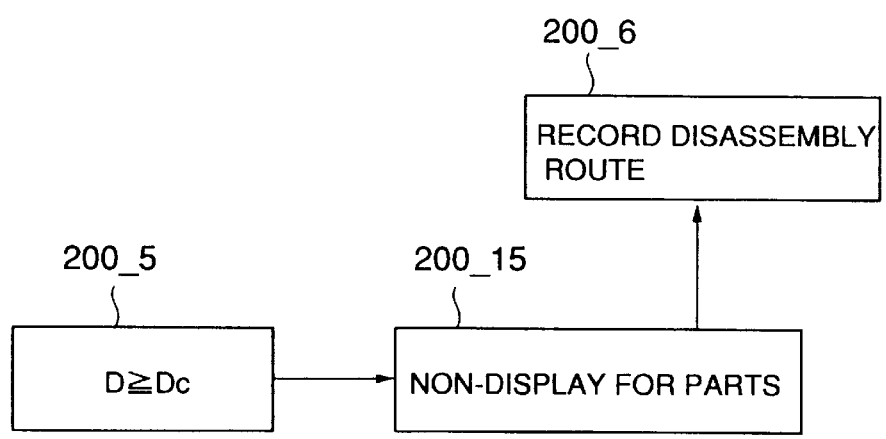
FIG. 17 is a flowchart of a portion, which is to be added to the basic routine shown in FIG. 5, of routines for implementing characteristic structures of a third assembly route producing apparatus according to an embodiment of the present invention.

FIG. 17 is a flowchart of a portion, which is to be added to the basic routine shown in FIG. 5, of routines for implementing characteristic structures of a third assembly route producing apparatus according to an embodiment of the present invention.

In the step 200__5, when it is determined that the translation distance D is not less than the constant Dc, the process goes to a step 200__15 in which the part now on disassembly is erased from a display, and then the process goes to the step 200__6 in which a disassembly route is recorded.

Next, there will be explained aspects of a fourth assembly route producing apparatus according to an embodiment of the present invention.

Figure 18:
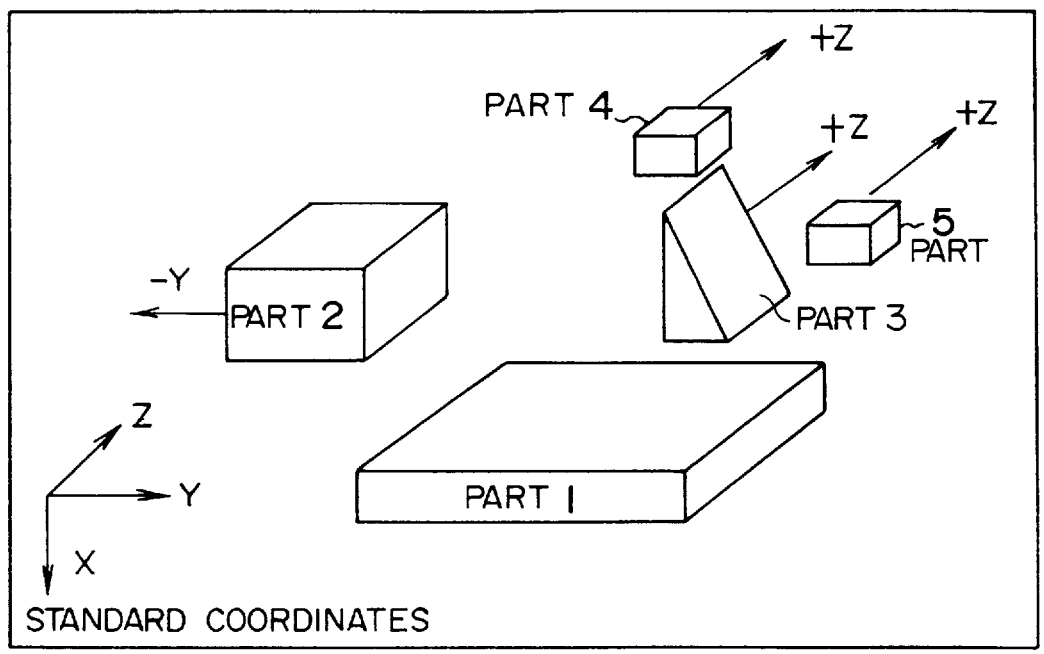
FIG. 18 is an illustration of graphics screen s by way of example useful for understanding problems raised in the event that a search sequence of a disassembly direction is determined on the basis of a reference coordinate system of data representative of the configuration of components and products.

FIG. 18 is an illustration of a graphics screen by way of example useful for understanding problems raised in the event that a search sequence of a disassembly direction is determined on the basis of a reference coordinate system of data representative of the configuration of components and products.

As a basic coordinate system is shown in FIG. 18, it is assumed that a depth direction, a direction from the left to the right and a downward direction of the graphics screen shown in FIG. 18 are denoted by +Z direction, +Y direction and +X direction, respectively, and a sequence of a search of a disassembly direction is defined by +Z direction, −Z direction, +Y direction, −Y direction, +X direction and −X direction in the named order on the basis of the basic coordinate system. In this case, as seen from FIG. 18, all the parts, which are able to be disassembled in the +Z direction, move in the +Z direction, that is, the depth direction of the graphics screen. This involves such a possibility that parts overlap with each other and the screen becomes hard to see.

Figure 19:
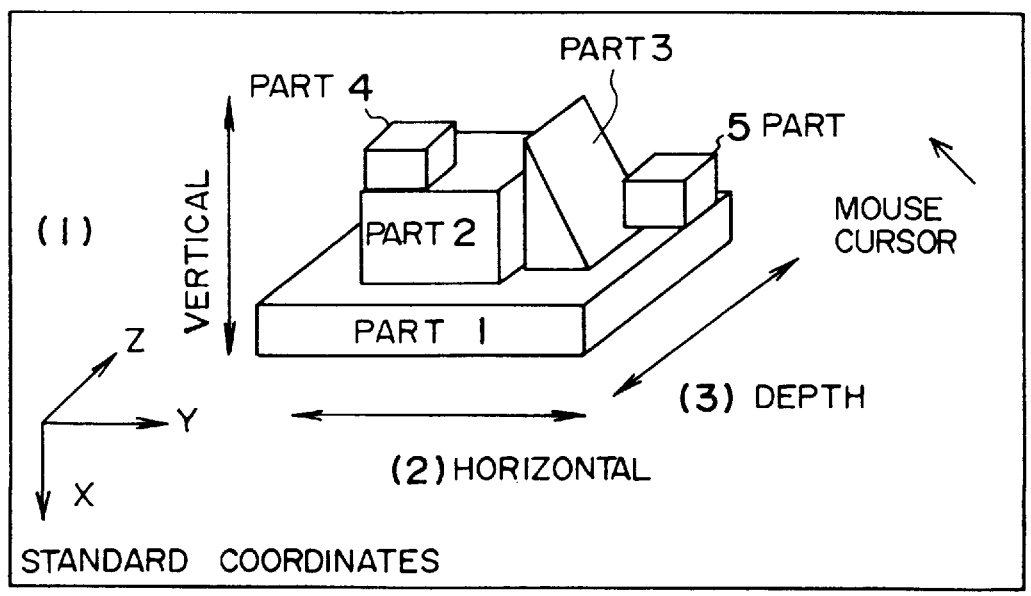
FIG. 19 is an illustration of graphics screen s by way of example useful for understanding characteristic portions of a fourth assembly route producing apparatus according to an embodiment of the present invention.

FIG. 19 is an illustration of a graphics screen by way of example useful for understanding characteristic portions of a fourth assembly route producing apparatus according to an embodiment of the present invention.

Here, a sequence of a search of a disassembly direction is determined in the named order of "VERTICAL DIRECTION", "HORIZONTAL DIRECTION" and "DEPTH" on the graphics screen regardless of the basic coordinate system. For example, a plurality of graphics screens, which are involved in a plurality of viewpoints, respectively, are displayed on the CRT display unit 104. In this condition, when the cursor of the mouse 103 shown in FIG. 2 is translated to a desired one of the plurality of graphics screens thus displayed and then the mouse 103 is clicked, the graphics screen of interest is selected, and a disassembly route search direction is determined, as will be described hereinafter by way of example, in the named order of a vertical direction, a horizontal direction and a depth direction on the graphics screen of interest.

Figure 20:
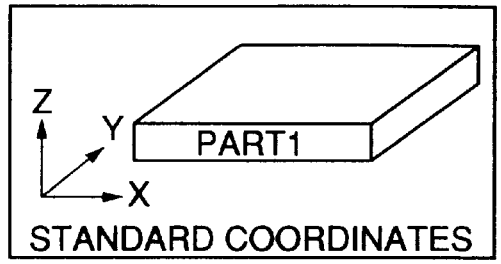
FIG. 20 is an illustration showing an example of the selected graphics screen.
Figure 21:
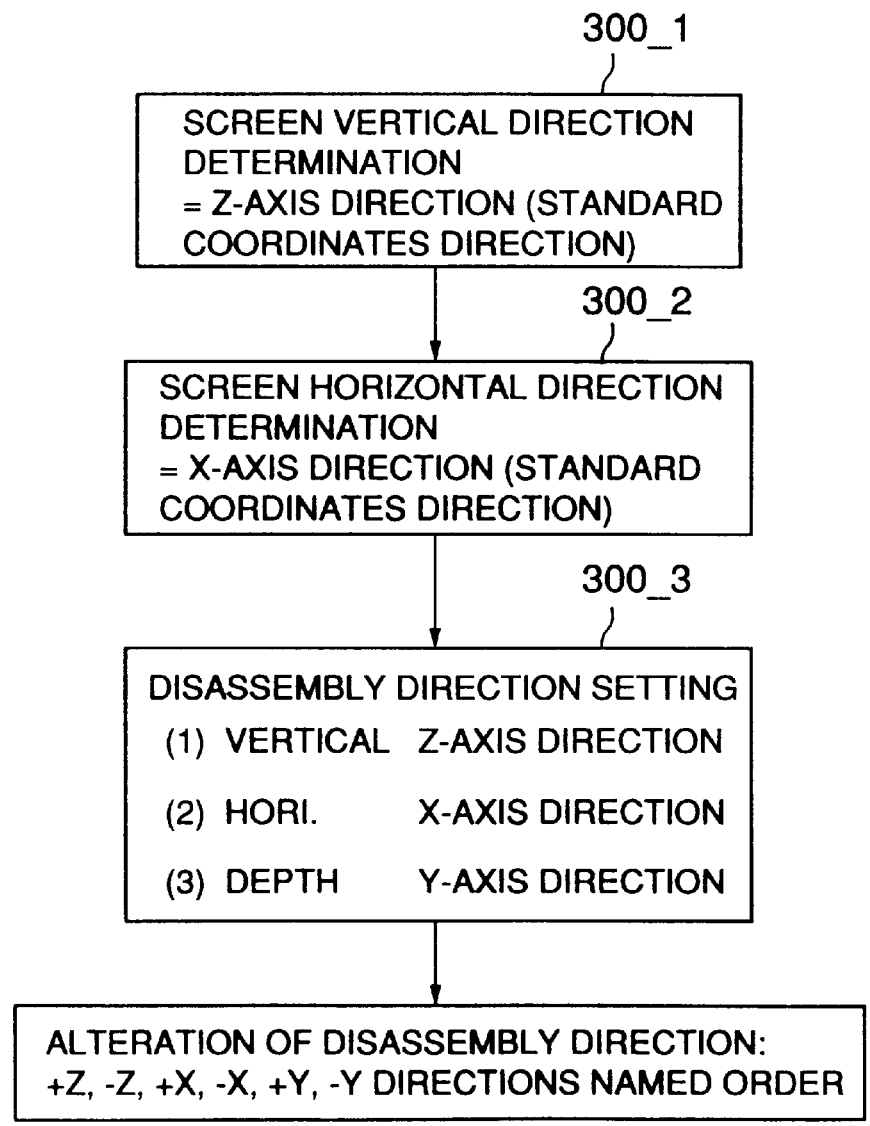
FIG. 21 is a flowchart of a routine for determining a sequence of a disassembly direction search.

FIG. 20 is an illustration showing an example of the selected graphics screen. FIG. 21 is a flowchart of a routine for determining a sequence of a disassembly direction search.

In the event that the basic coordinate system of the selected graphics screen is given, as shown in FIG. 20, with a vertical direction of a Z-axis direction, a horizontal direction of an X-axis and a depth direction of a Y-axis, a sequence of a disassembly direction search is determined as shown in FIG. 21.

That is, in a step 300__1, a determination of a coordinate axis of a vertical direction of the screen is performed. In this case, it is decided that the Z-axis denotes the vertical direction. Next, in a step 300__2, a determination of a coordinate axis of a horizontal direction of the screen is performed. In this case, it is decided that the X-axis denotes the horizontal direction. In a step 300__3, a sequence of a disassembly direction search is set up. That is, here, as shown in FIG. 5, first, in the step 200__1, the +Z direction is set up, and in the step 200__10, a sequence of a search of a disassembly direction is set up in such a manner that the sequence of the search is altered in turn in the named order of −Z direction, +X direction, −X direction, +Y direction and −Y direction.

Figure 22:
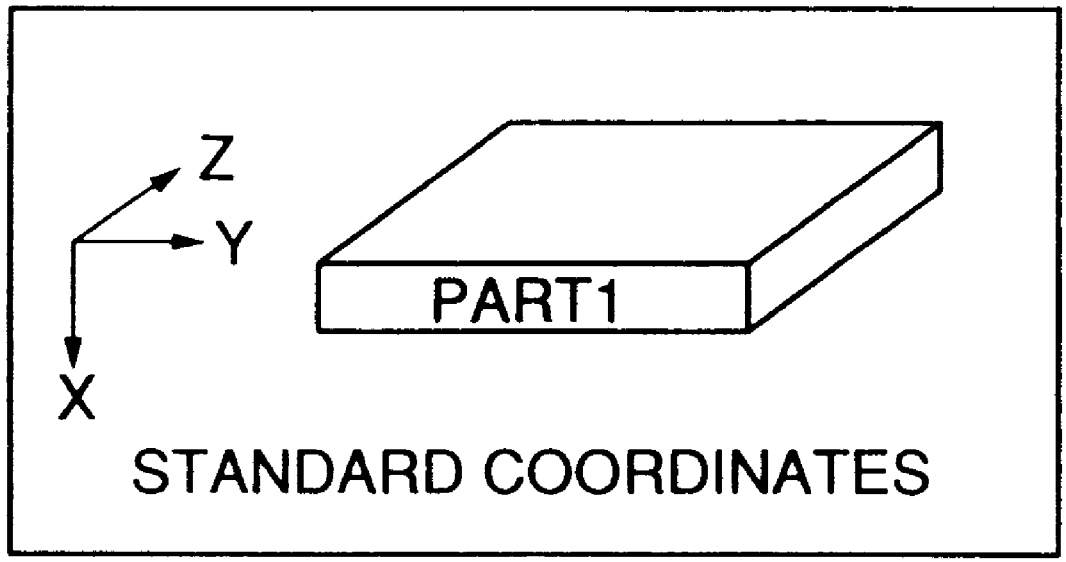
FIG. 22 is an illustration showing an alternative example of the selected graphics screen.
Figures 23, 24:
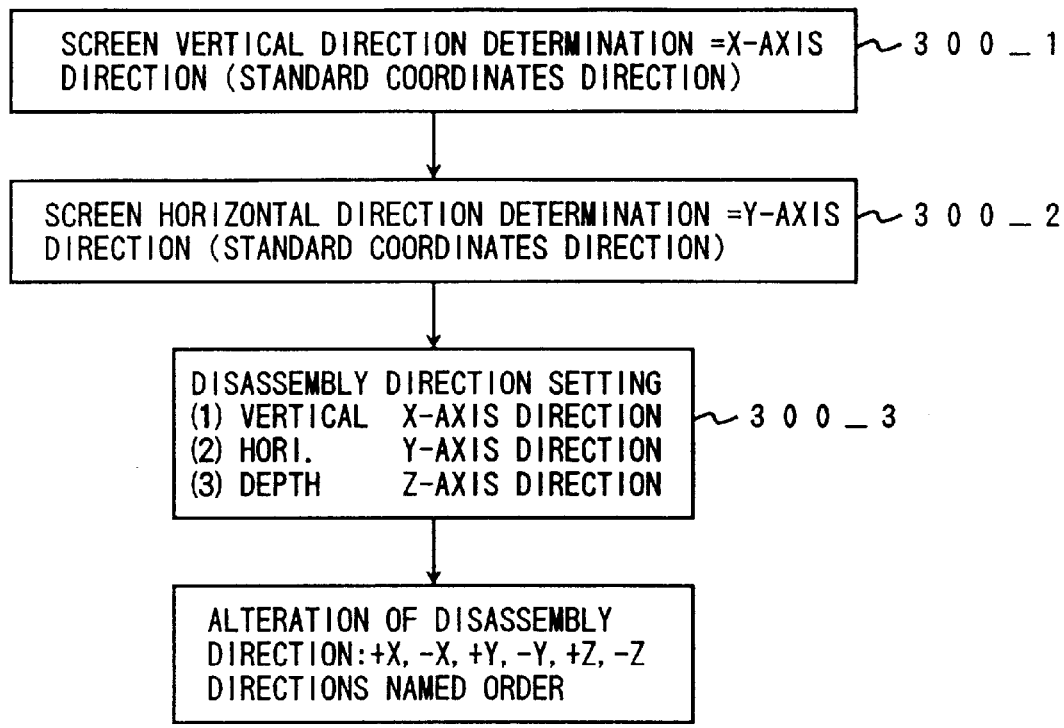
FIG. 23 is a flowchart of a routine for determining a sequence of a disassembly direction search in the event that the graphics screen shown in FIG. 22 is selected.
FIG. 24 is an explanatory view useful for understanding an alteration operation of a sequence of a disassembly direction search.

FIG. 22 is an illustration showing an alternative example of the selected graphics screen. FIG. 23 is a flowchart of a routine for determining a sequence of a disassembly direction search in the event that the graphics screen shown in FIG. 22 is selected.

That is, in a step 300__1, a determination of a coordinate axis of a vertical direction of the screen is performed. In this case, it is decided that the X-axis denotes the vertical direction. Next, in a step 300__2, a determination of a coordinate axis of a horizontal direction of the screen is performed. In this case, it is decided that the Y-axis denotes the horizontal direction. In a step 300__3, a sequence of a disassembly direction search is set up. That is, here, as shown in FIG. 5, first, in the step 200__1, the +X direction is set up, and in the step 200__10, a sequence of a search of a disassembly direction is set up in such a manner that the sequence of the search is altered in turn in the named order of −X direction, +Y direction, −Y direction, +Z direction and −Z direction.

FIG. 24 is an explanatory view useful for understanding an alteration operation of a sequence of a disassembly direction search.

Through an operation of the mouse 103 shown in FIG. 2, anyone of the items "VERTICAL", "HORIZONTAL" and "DEPTH" in the column of the item "DISASSEMBLY DIRECTION SEARCH SEQUENCE" on the screen of an automatic disassembly route producing set up menu shown in FIG. 7 is picked up and translated, and thereafter the button "EXECUTION" shown in FIG. 7 is clicked. Those operations make it possible to alter the sequence of a disassembly direction search.

Next, there will be explained aspects of a fifth assembly route producing apparatus according to an embodiment of the present invention.

Figure 25:
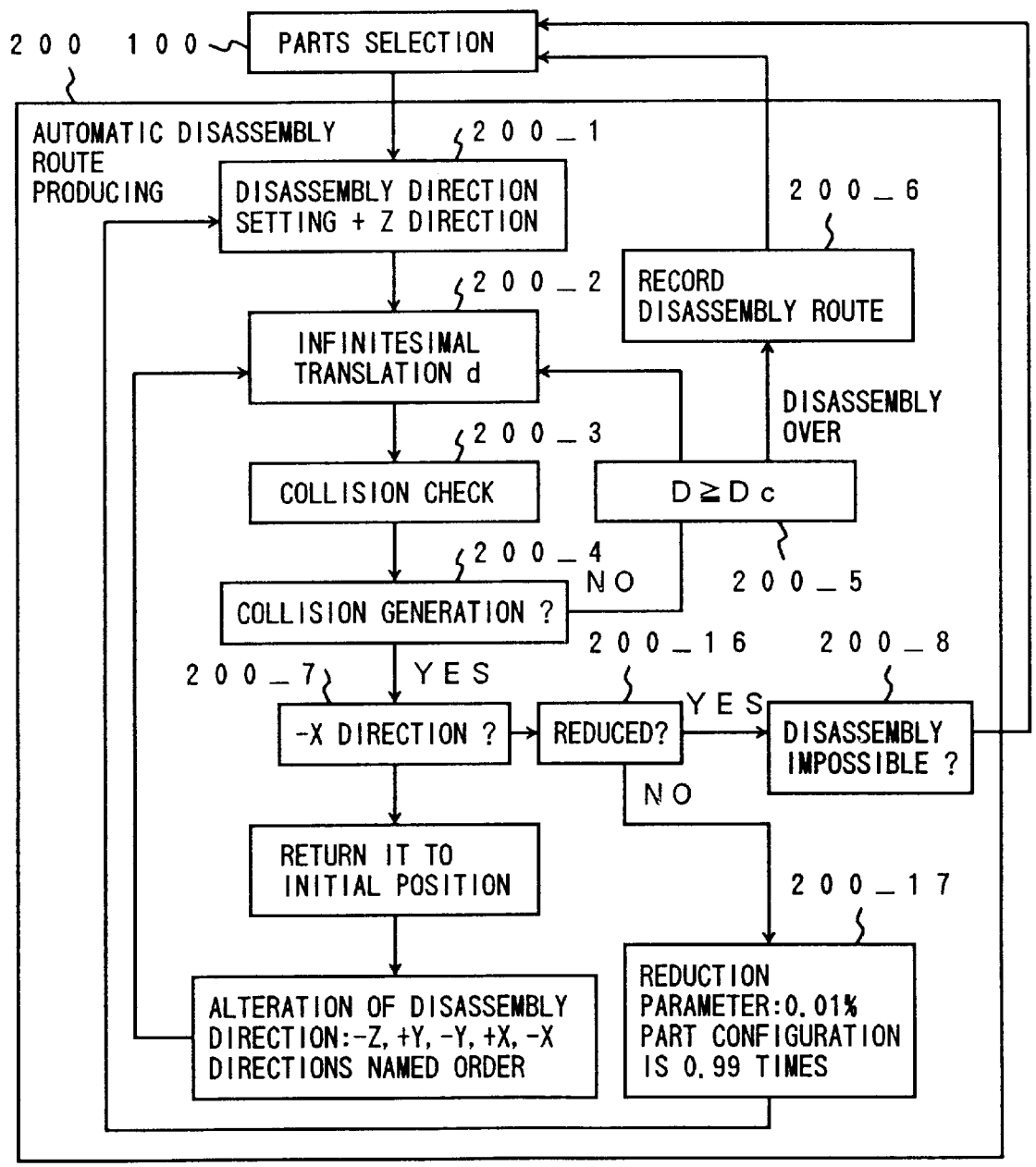
FIG. 25 is a flowchart showing a routine for implementing characteristic structures of a fifth assembly route producing apparatus according to an embodiment of the present invention.

FIG. 25 is a flowchart showing a routine for implementing characteristic structures of a fifth assembly route producing apparatus according to an embodiment of the present invention.

This routine includes, in addition to the basic routine shown in FIG. 5, a step 200_16 in which it is decided whether a size of a part has been already reduced, and a step 200_17 in which a size of the part is reduced.

Specifically, when a search of a disassembly route for a part of interest to be disassembled is performed while a size of the part is kept on size as designed, and the part cannot be disassembled in any of the directions, in the step 200_16 it is decided whether the size of the part has been reduced. When it is decided whether the size of the part is not yet reduced, the process goes to the step 200_17 in which the size of the part is reduced by the corresponding predetermined reduction parameter (e.g. 0.01%) (that is, here 0.99 times as large as the original size), and a search of a disassembly direction is performed again on the reduced part. When a direction, in which the part can be disassembled without any occurrence of a collision, is not detected even though the size of the part is reduced, the process goes to the step 200_8.

In this manner, a reduction of a size of a part intended to be disassembled may increase a possibility that even a part, which cannot be disassembled per se in any directions, for example, in the event that for the purpose of strong engagement, a rod having a larger diameter than a diameter of an aperture of the party of an engagement is designed, can be disassembled. Incidentally, while it is acceptable that the reduction parameter 0.01% shown in FIG. 25 is fixedly determined beforehand, it is also acceptable that for example, a reduction parameter set up portion is added onto the screen of an automatic disassembly route producing set up menu shown in FIG. 7, so that the reduction parameter can be optionally set up.

Next, there will be explained aspects of a sixth assembly route producing apparatus according to an embodiment of the present invention.

Figure 26:
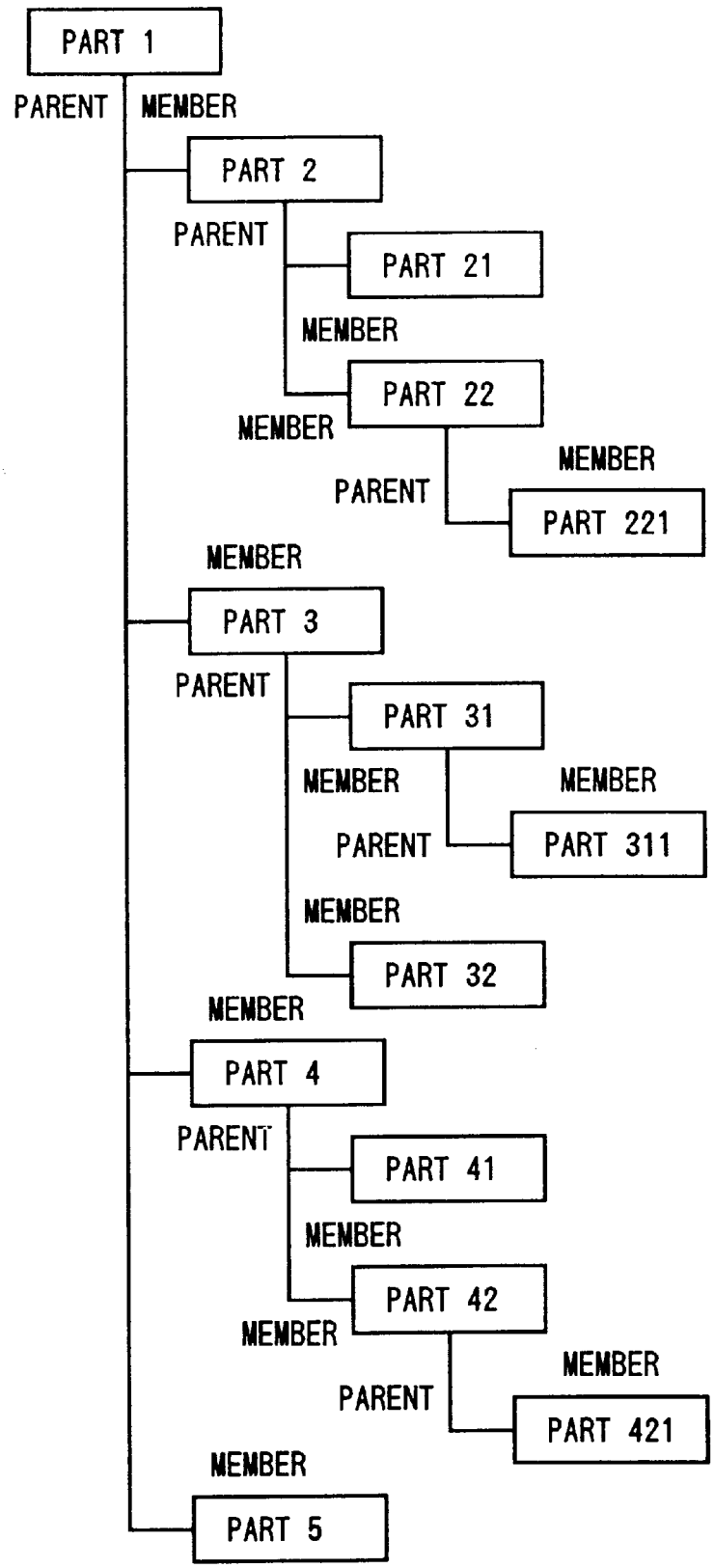
FIG. 26 is a view showing a part tree structure.

FIG. 26 is a view showing a part tree structure.

A product, which is designed with the use of a three-dimensional CAD system, has usually, as shown in FIG. 26, configuration data for parts and assembly arrangement information as well including a membership (indicating as to what child part is to be associated with what parent part) of the parts.

Here, in the parts selection routine 100 shown in FIG. 5, parts, which undergo a disassembly route search, are selected for the disassembly route search in such a manner that the more the part is located close to the terminal end of the part tree structure shown in FIG. 26, the more the part is early in order of the selection. The part tree structure as shown in FIG. 26 may be displayed on the CRT display unit 104 shown in FIG. 2 through a selection by a main menu (not illustrated).

Figure 27:
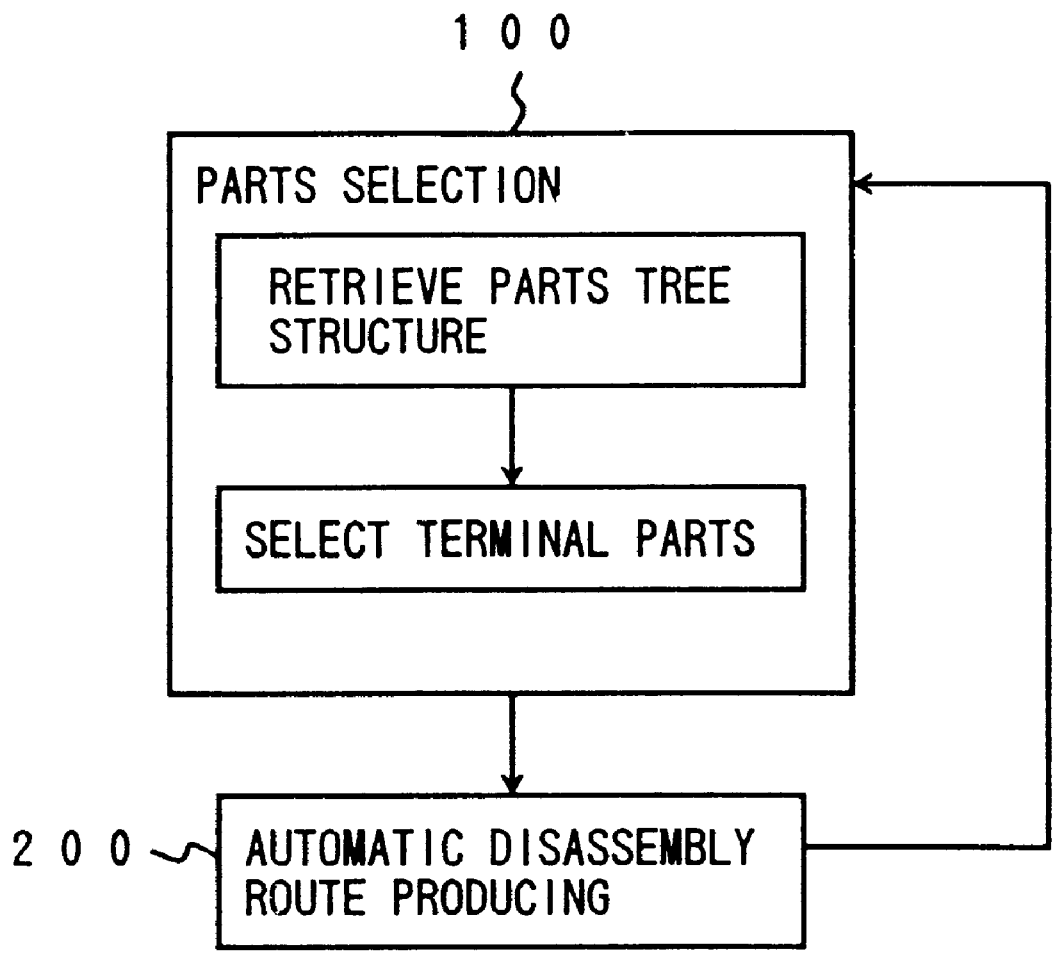
FIG. 27 is a flowchart of a part selection routine.

FIG. 27 is a flowchart of the content of a part selection routine 100 at that time.

In the part selection routine 100, first, and whenever the process returns from the automatic disassembly route producing routine 200 shown in FIG. 5, a retrieval of the part tree structure as shown in FIG. 26 is performed so that a terminal part having no child part is selected.

FIGS. 28(*a*), 28(*b*), 28(*c*) and 28(*d*) are views each showing an embodiment of a part selection.

In the part tree structure shown in FIG. 28(*a*), parts having no child or member part are part 21, part 221, part 311, part 32, part 41, part 421 and part 5. Thus, at the first stage in which the part selection routine 100 is executed, and thereafter whenever the process returns from the automatic disassembly route producing routine 200 to the part selection routine 100, those parts having no member part are selected one by one in turn. Here, a part, which is once selected and is able to be disassembled, is replaced by '0' in the form of a flag representative of a disassembled-state part. Thus, the part tree structure shown in FIG. 28(*a*) may be expressed by that of FIG. 28(*b*). Then, in the state of FIG. 28(*b*), parts having no member part, that is, part 22, part 31, part 4 and part 42, are selected in turn. Where the parts having the flag '0' are removed from the membership.

It is assumed that although the part 22 and the part 31 can be disassembled, the part 4 and part 42 cannot be disassembled. At that time, the part 22 and the part 31 are replaced by the flag '0', while a tag indicative of the fact that it is impossible in disassembly is applied to the part 4 and part 42.

Next, as shown in FIG. 28(*c*), part 2 and part 3 are selected in turn, and as shown in FIG. 28(*d*), it takes a state that all the parts but the part 1 as the base and the parts 4 and 42 impossible in disassembly, are replaced by the flag '0' representative of a disassembled-state part.

In this manner, a search for a disassembly route is carried out first in the order from parts of the terminal end of the part tree structure. The reason why this is to do so is that there is a possibility that the more the parts are located close to the terminal end, the more the parts are assembled later, and accordingly a disassembly at earlier stage makes it possible to expect a high possibility such that the parts can be disassembled.

Incidentally, with respect to addressing the parts which are impossible to be disassembled, it will be described later.

Next, there will be explained aspects of a seventh assembly route producing apparatus according to an embodiment of the present invention.

Figure 29:
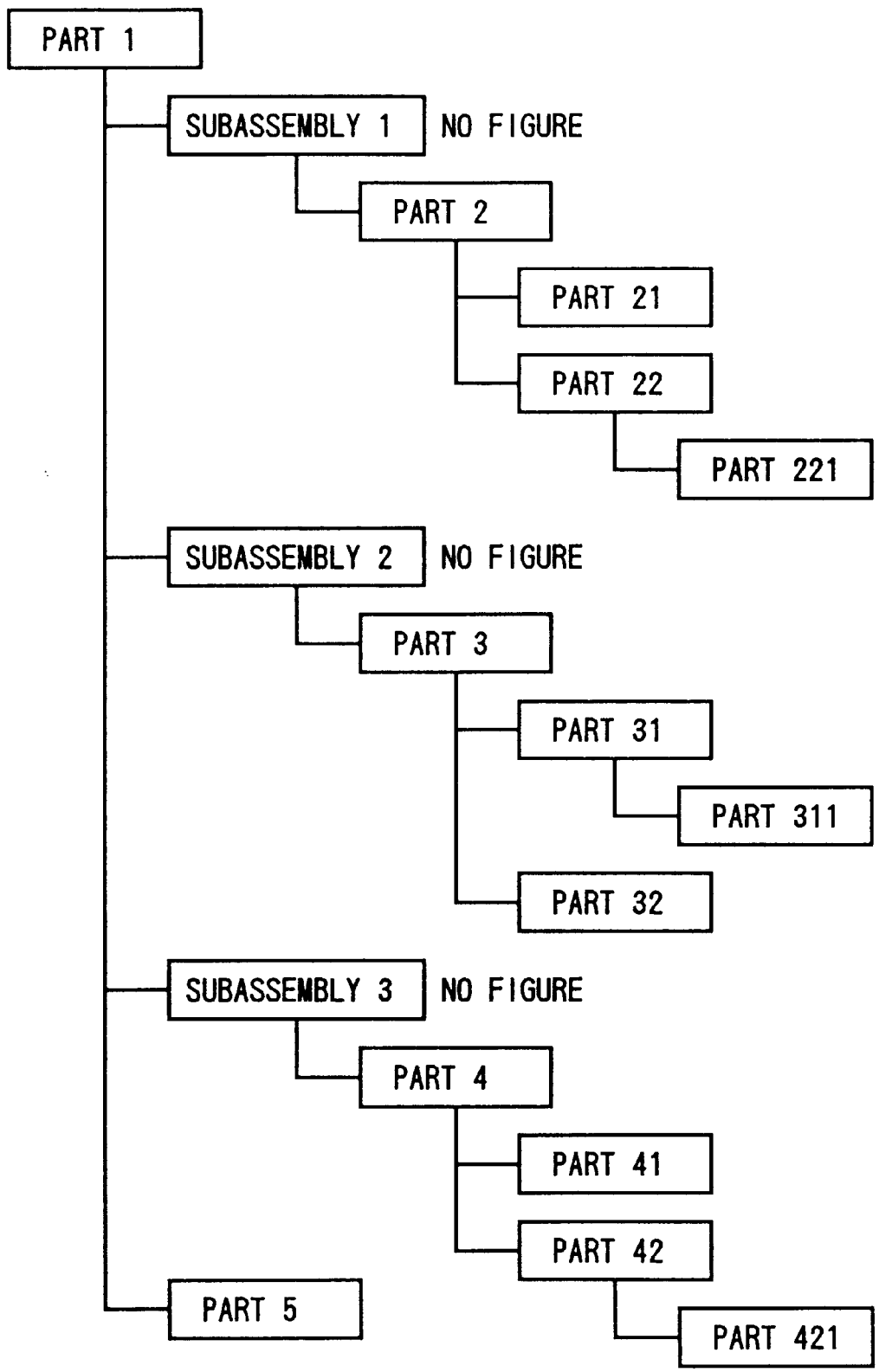
FIG. 29 is a view showing a part tree structure having information of a subassembly.

FIG. 29 is a view showing a part tree structure having information of a subassembly.

A subassembly implies a single structure in which a plurality of parts are assembled. Assembly and disassembly are performed in units of the subassembly.

According to the example shown in FIG. 29, part 2, part 21, part 22 and part 221 constitutes a subassembly 1; part 3, part 31, part 311 and part 32 a subassembly 2; and part 4, part 41, part 42 and part 421 a subassembly 3. Part 5 is an independent part, alternatively it is acceptable that the part 5 is regarded as constituting a subassembly by itself only.

FIG. 30 is a flowchart of a part selection routine 100 at that time.

In the part selection routine 100, first, and whenever the process returns from the automatic disassembly route producing routine 200 shown in FIG. 5, a retrieval of the part tree structure as shown in FIG. 29 is performed, so that regarding a subassembly all the parts constituting the subassembly are selected on a batch basis, on the other hand, regarding parts not constituting a subassembly the parts are solely selected.

When the item "PART" is selected in the automatic disassembly route producing set up menu shown in FIG. 7, subassemblies are disassembled on a batch basis in units of subassembly, and thereafter the subassembly is disassembled into individual parts. When the item "SUBASSEMBLY" is selected in the automatic disassembly route producing set up menu shown in FIG. 7, a disassembly process is terminated at the stage that the subassemblies are disassembled on a batch basis in units of subassembly, and no further disassembly process is conducted.

A subassembly means an assembly in which a plurality of parts are gathered. Conducting a disassembly in units of subassembly makes it possible to expect a high possibility of a feasible disassembly. Accordingly, as shown in the present example, when information of the subassembly exists, it is preferable that a disassembly is first conducted in units of subassembly.

Next, there will be explained aspects of a eighth assembly route producing apparatus according to an embodiment of the present invention.

In the above-mentioned explanation referring to FIGS. 28(a)–(d), while it has been explained that parts are disassembled one by one in turn starting from parts of the terminal end of the part tree structure, the present embodiment has a mode in which a plurality of parts are simultaneously disassembled. Here, there will be explained the mode in which a plurality of parts are simultaneously disassembled, again referring to FIGS. 28(a)–(d).

Figure 28A:
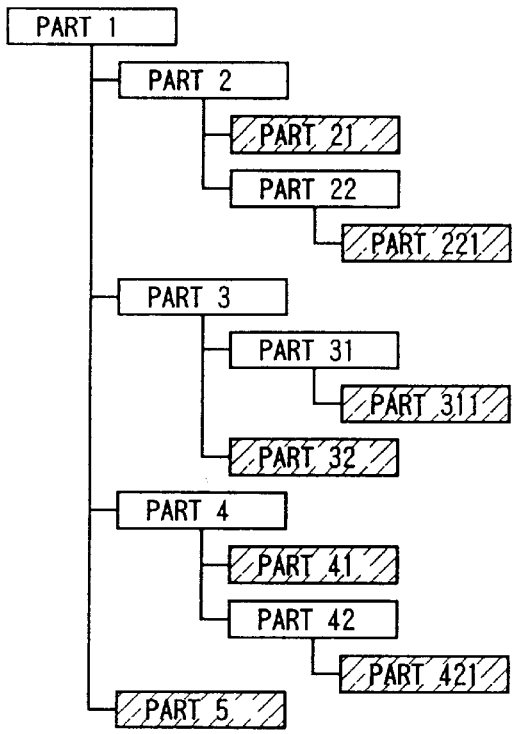
FIGS. 28(a), 28(b), 28(c) and 28(d) are views each showing an embodiment of a part selection.

At the stage of the example shown in FIG. 28(a), part 21, part 221, part 311, part 32, part 41, part 421 and part 5, which have no child or member part, are simultaneously selected, and disassembly and translation are simultaneously conducted on the graphics screen. However, the simultaneous translation is conducted only on the display, and in the internal operation a search for a disassembly route is sequentially conducted on a plurality of parts one by one. And as a result, there is provided such a display that the plurality of parts are simultaneously disassembled and translated along the associated disassembly routes, respectively.

Figure 28B:
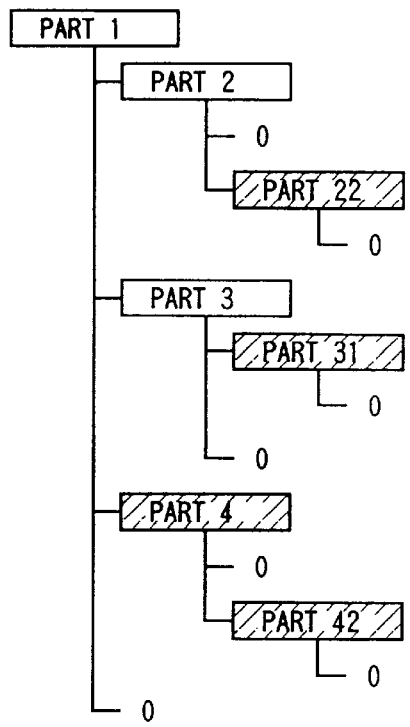

Next, at the stage of the example shown in FIG. 28(b), part 22 and part 31 are simultaneously disassembled on a display. However, as mentioned above, since part 4 and part 42 are impossible in disassembly, they are remained without being disassembled.

Figure 28C:
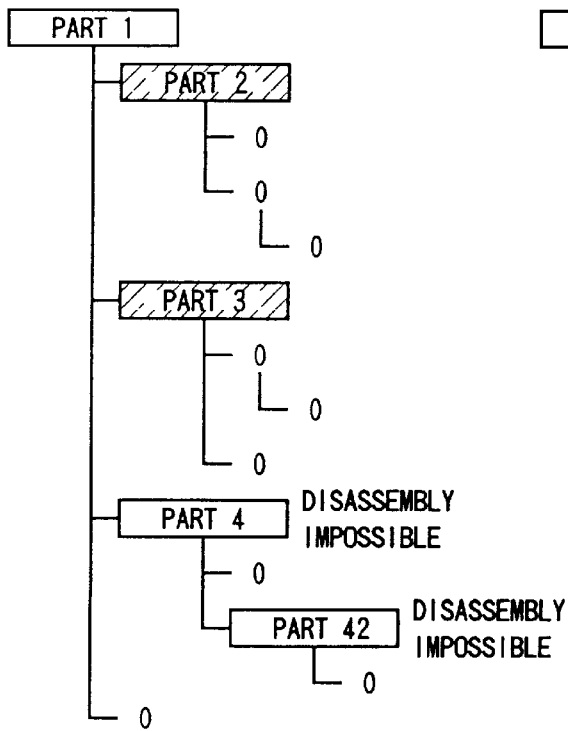
Figure 28D:
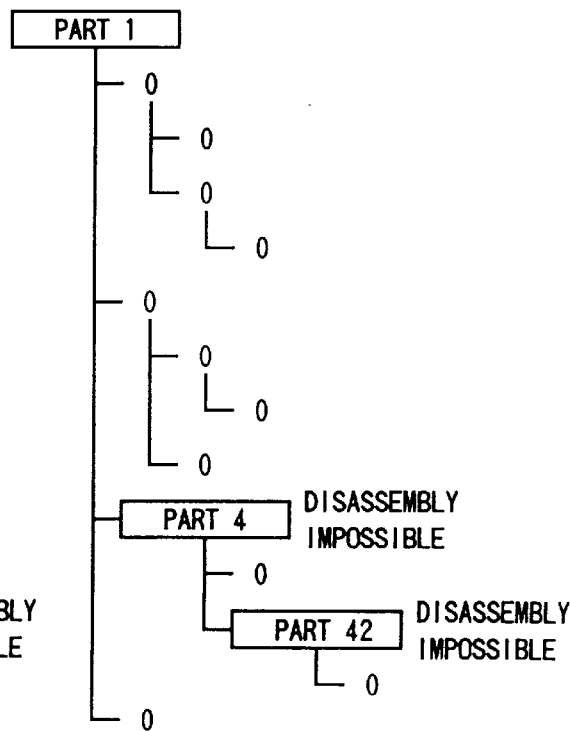

Next, at the stage of the example shown in FIG. 28(c), part 2 and part 3 are simultaneously disassembled on a display.

Usually, parts are sequentially disassembled one by one. However, in the event that for example, pins, screws, etc. are disassembled, a simultaneous disassembly makes it easier to see, and also possible to reduce a display time for a disassembly and an assembly.

Next, there will be explained aspects of a ninth assembly route producing apparatus according to an embodiment of the present invention.

FIGS. 31(a) and 31(b) are views each showing a sequence of a part disassembly.

When the associated icon is clicked on the main menu (not illustrated), a sequence of a part disassembly is determined beforehand in accordance with the part tree structure as shown in FIG. 26, and the sequence of a part disassembly thus determined is displayed as shown in FIG. 31.

Then, the mouse 103 (cf. FIG. 2) is operated to pick up a part on the display screen and translate the same. This operation makes it possible to alter the state in which parts are arranged in a series as shown in FIG. 31(a) to the state that a plurality of parts are arranged in parallel as shown in FIG. 31(b).

Oppositely, it is also possible to make an alteration from the the state that a plurality of parts are arranged in parallel as shown in FIG. 31(b) to the state in which parts are arranged in a series as shown in FIG. 31(a).

In this manner, when parts are rearranged into a parallel or a series, a disassembly route is produced, as to a plurality of parts arranged in parallel, on a simultaneous basis, and as to parts arranged in series, on a sequential basis.

Thus, an alteration of a sequence of a part disassembly makes it possible to expect a fine measurement, as compared with the event that a parallel disassembly operation is mechanically performed in accordance with an arrangement position of parts on the part tree structure as described referring to FIGS. 28(a)–(d), in such a manner that for example, only a plurality of screws are disassembled, and parts other than the screws, which are ranked in the same class as the screws on the part tree structure, are disassembled in timing different from that for the screws.

Next, there will be explained aspects of a tenth assembly route producing apparatus according to an embodiment of the present invention.

Figure 32:
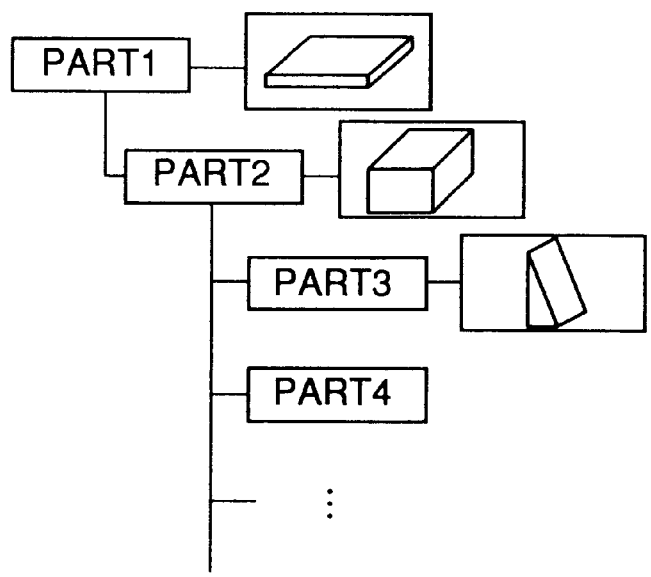
FIG. 32 is a view showing an example of a part tree structure.

FIG. 32 is a view showing an example of a part tree structure.

To display a screen indicative of a part tree structure on the display screen of the CRT display unit 104 shown in FIG. 2, as shown in FIG. 32, schematic graphics images each corresponding to the associated part are also simultaneously displayed.

Displaying the screen of the part tree structure and such graphics images of parts as well makes it possible, as compared with the event that the part tree structure having only the name of parts is displayed, to intuitively grasp the parts, thereby providing a screen display easy to see.

Since it may happen that displaying graphics images on all the parts brings about rather troublesomeness, the graphics image associated with the name of the part is alternately changed between a display and a non-display, whenever the name of the part is double-clicked using, for example, the mouse 103 (cf. FIG. 2).

Figure 33:
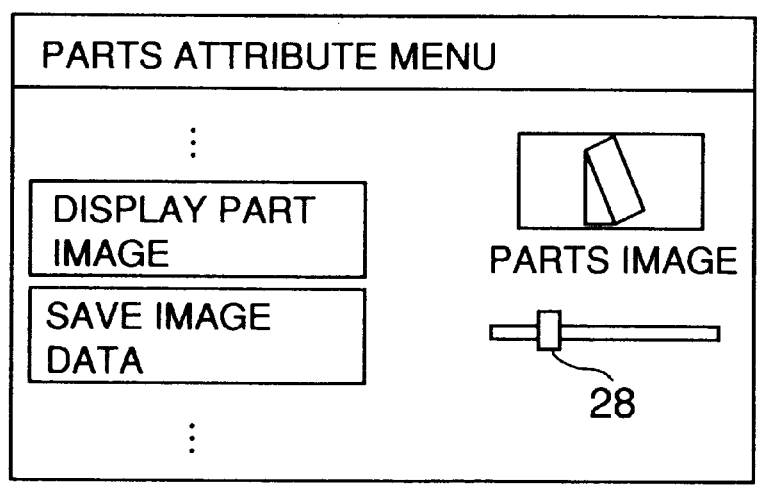
FIG. 33 is a view showing a screen of a part attribute menu.

FIG. 33 is a view showing a screen of a part attribute menu.

At the stage in which the screen of the part tree structure as shown in FIG. 32 is displayed, the icon corresponding to the main menu (not illustrated) is clicked through the mouse 103. This operation serves to open the screen of the part attribute menu as shown in FIG. 33 as well as the screen of the part tree structure.

When a desired name of the part on the screen of the part tree structure as shown in FIG. 32 is clicked, and then an item "PART IMAGE DISPLAY" on the screen of the part attribute menu as shown in FIG. 33 is clicked, a schematic graphics image of the part clicked on the screen of the part tree structure is plotted in accordance with configuration data of the clicked part, and is displayed in an area associated with the name of the part in the screen of the part attribute menu and the screen of the part tree structure. When a variator 28 in the screen of the part attribute menu is picked up by the mouse 103 and translated, the part of the part graphics image is rotated in accordance with the movement of the variator 28. In this manner, the part graphics image looking from a desired direction is obtained. When an item "IMAGE DATA SAVE" is depressed, a part graphics image looking from the desired direction is saved. Hereafter, the part graphics image thus saved is alternately changed between a display and a non-display, whenever the name of the associated part in the screen of the part tree structure is double-clicked.

Next, there will be explained aspects of an eleventh assembly route producing apparatus according to an embodiment of the present invention.

Figure 34:
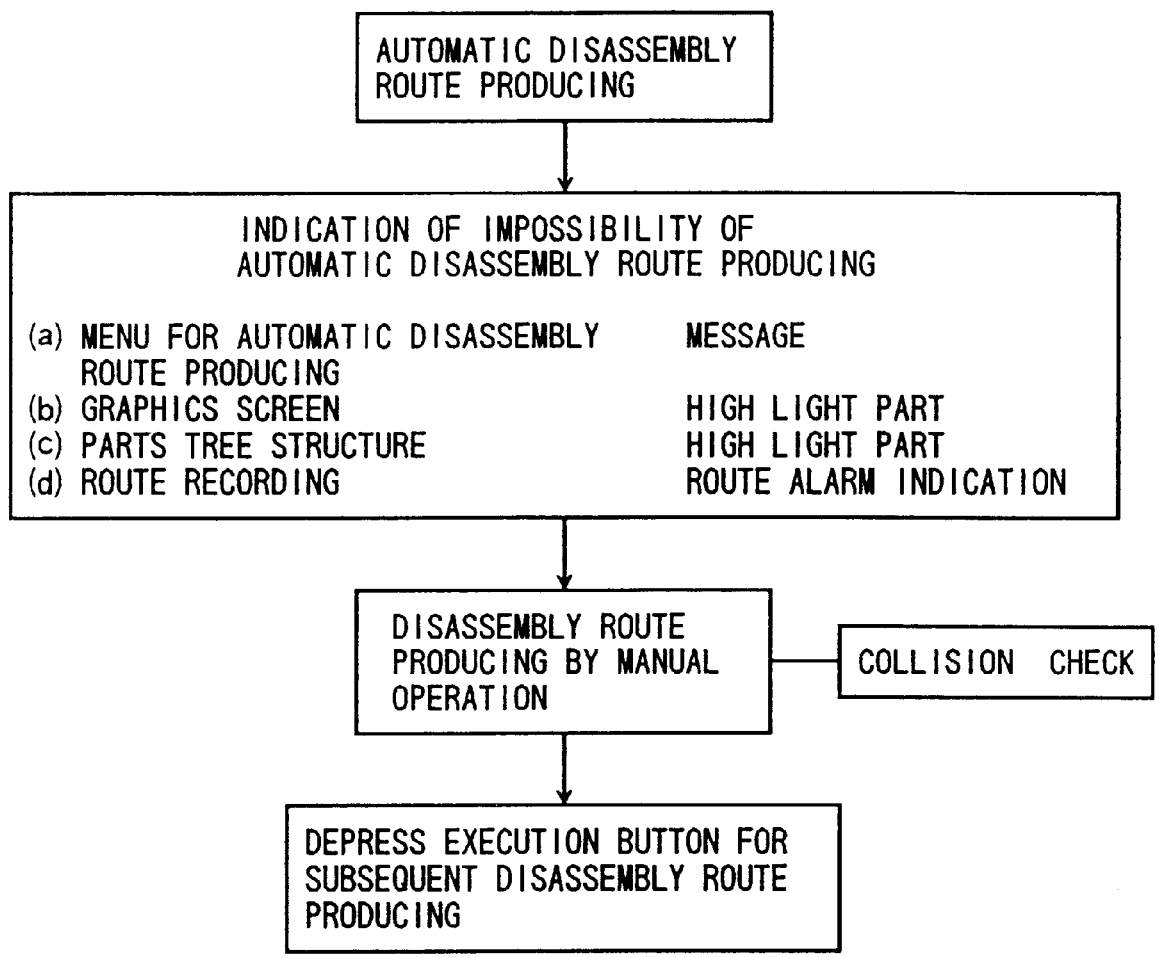
FIG. 34 is a flowchart useful for understanding a procedure for a search for a disassembly route.

FIG. 34 is a flowchart useful for understanding a procedure for a search for a disassembly route.

For example, when parts are disassembled in accordance with the automatic disassembly route producing routine 200 shown in FIG. 5 and a certain part cannot be disassembled in any direction, according to the present mode, an automatic search for a disassembly route is once interrupted at the stage wherein the situation is in face of the part which cannot be disassembled in any direction, and it is indicated that the automatic disassembly route producing is impossible.

FIGS. 35(a), 35(b), 35(c) and 35(d) are explanatory views useful for understanding a scheme of indicating that an automatic disassembly route producing is impossible.

FIGS. 35(a), 35(b), 35(c) and 35(d) show a screen of a set up menu for an automatic disassembly route producing, a graphics screen, a screen of the part tree structure and a screen of an operation menu for a route recording, respectively. As shown in FIG. 34, on the screen of a set up menu for an automatic disassembly route producing, there is displayed a message indicating that the automatic disassembly route producing is impossible; on the graphics screen, a part (here part 3), for which the automatic disassembly route producing is impossible, is displayed in a way different from another part (here a highlight display); on the screen of the part tree structure, a name of the part (here part 3), for which the automatic disassembly route producing is impossible, and a graphics image are also displayed on a highlight basis; and on the screen of an operation menu for a route recording, a red color of route alarm indication appears at a position wherein a collision in the disassembly route occurs.

Figure 35:
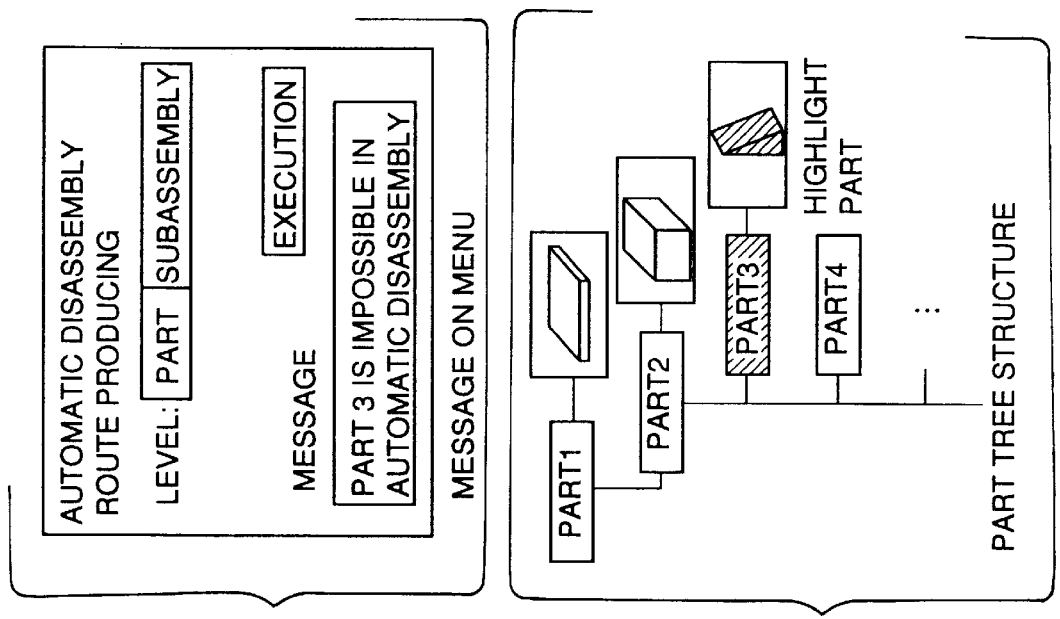
FIGS. 35(a), 35(b), 35(c) and 35(d) are explanatory views useful for understanding a scheme of indicating that an automatic disassembly route producing is impossible.

In this condition, the assembly route producing apparatus shown in FIG. 2 stand by. At this stage, when an operator operates the mouse 103 to translate the button 211 to a position of the route alarm indication, it is possible to identify the state of the collision on the graphics screen of FIG. 35(b). When the part (here part 3) of interest on the graphics screen of FIG. 35(b) is picked up and translated, a collision check is conducted on the respective points of the translation route. As a result, if there is no occurrence of the collision while the part is translated up to the sufficiently far location, it means that a disassembly route of the part is produced on a manual basis.

In this manner, when the disassembly route is manually produced and the mouse 103 is used to click an "EXECUTION" button on the screen of a set up menu for an automatic disassembly route producing of FIG. 35(a), a disassembly route, which is produced on a manual basis for the part, is decided, and an automatic search for a disassembly route for the subsequent part is resumed.

Taking such an operational procedure makes it possible to produce a disassembly route for even a product having a part for which a disassembly route cannot be automatically produced.

Next, there will be explained aspects of a twelfth assembly route producing apparatus according to an embodiment of the present invention.

Figure 36:
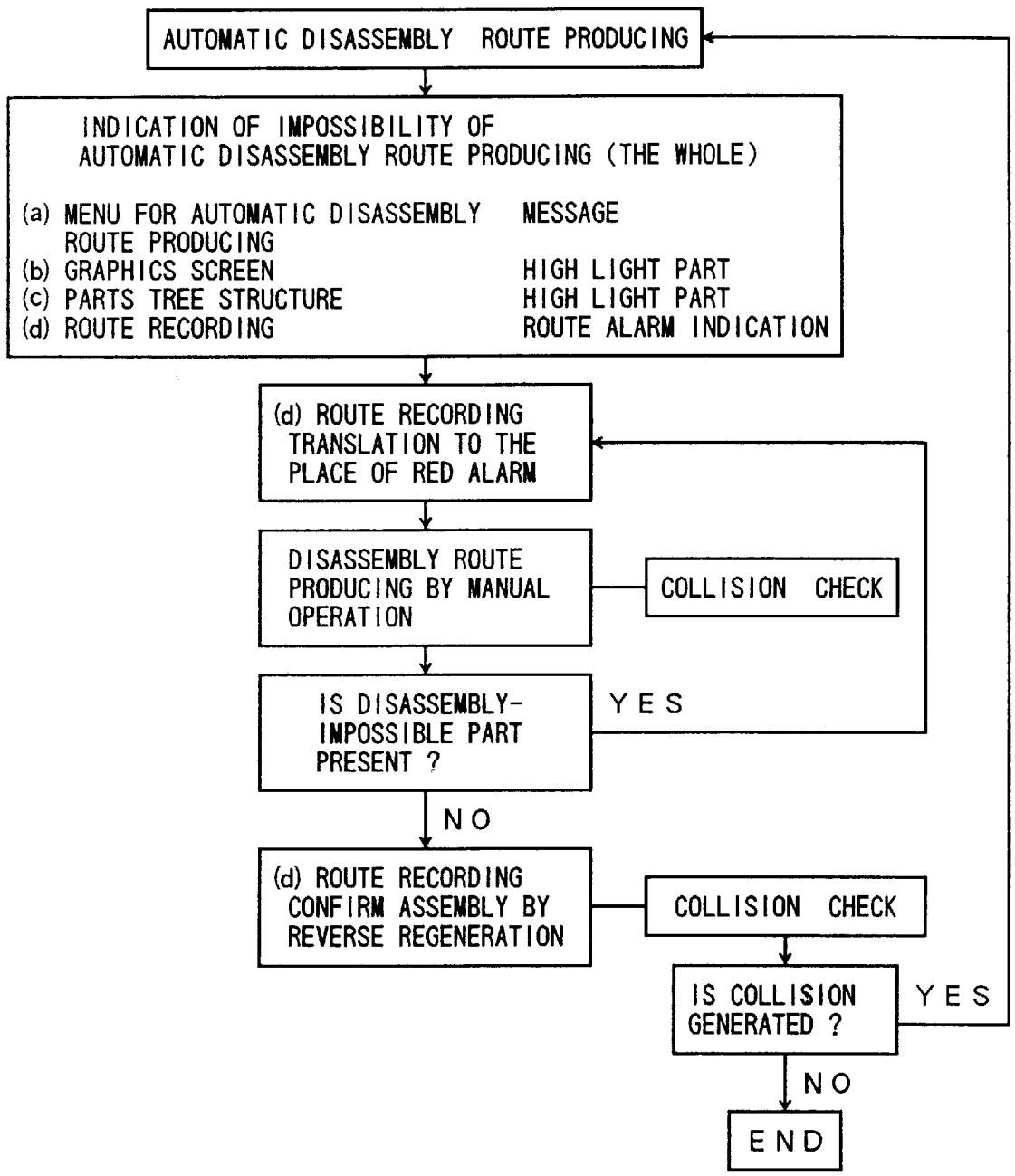
FIG. 36 is a flowchart useful for understanding a procedure for a search for a disassembly route.

FIG. 36 is a flowchart useful for understanding a procedure for a search for a disassembly route.

For example, when parts are disassembled in accordance with the automatic disassembly route producing routine shown in FIG. 5 and a part, which cannot be disassembled, is found, the part is returned to the starting position without a disassembly and the process goes to a search for a disassembly route of the subsequent part. In this manner, all of the parts feasible in disassembly are disassembled, retaining parts which are impossible in an automatic disassembly, and thereafter with respect to all of the parts which are impossible in an automatic disassembly, it is indicated that they are impossible in an automatic disassembly route producing.

FIGS. 37(a), 37(b), 37(c) and 37(d) are explanatory views useful for understanding a scheme of indicating that an automatic disassembly route producing is impossible.

The indication scheme of FIGS. 37(a), 37(b), 37(c) and 37(d) is the same as that of FIGS. 35(a), 35(b), 35(c) and 35(d), except for that it is displayed that a plurality of parts are not disassembled, and thus the redundant explanation will be omitted.

Figure 37B:
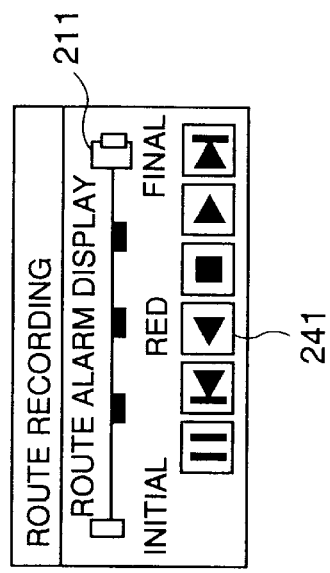
FIGS. 37(a), 37(b), 37(c) and 37(d) are explanatory views useful for understanding a scheme of indicating that an automatic disassembly route producing is impossible.
Figure 37A:
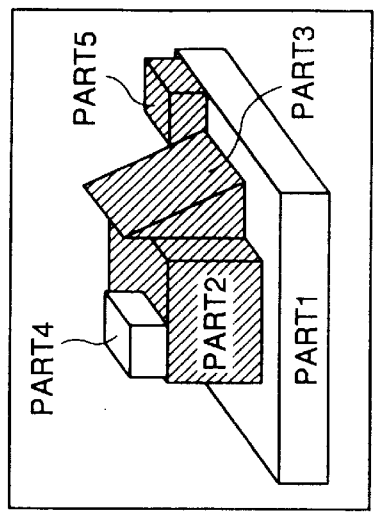
Figure 37D:
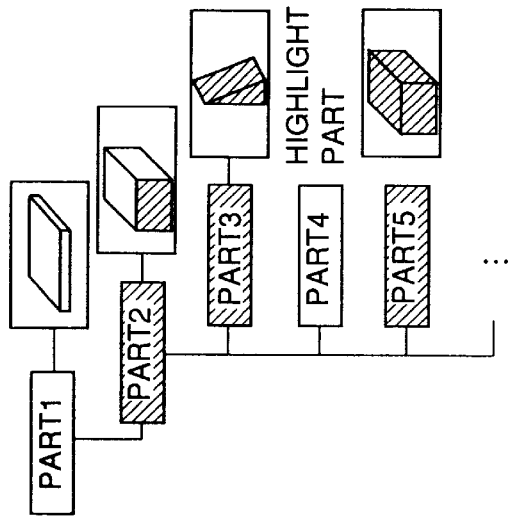
Figure 37C:
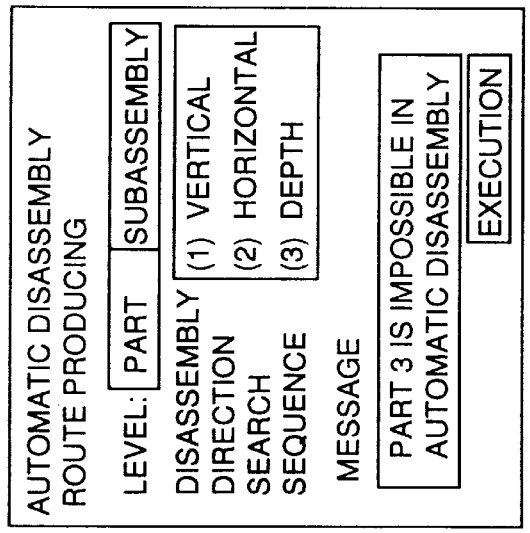

When it is indicated that an automatic disassembly route producing is impossible, an operator operates the mouse 103 to bring the cursor 211 on the screen of an operation menu for a route recording of FIG. 37(d) with any one of a red color of plurality of route alarm indications. As a result, on the graphics screen of FIG. 37(b) there will appear a graphics image of a product in the middle of disassembly including parts in the middle of disassembly in the state that they interfere with another part. Then, the parts in the middle of disassembly on the graphics screen are translated, through the mouse operation, in a direction free from an occurrence. During the translation, an arithmetic operation for a collision check is conducted in the apparatus as to whether a collision occurs. In the event that a part is able to be translated over a sufficiently far distance without an occurrence of a collision, it means that a disassembly route for the part can be produced on a manual basis. When the "EXECUTION" button on the screen of a set up menu for an automatic disassembly route producing of FIG. 37(a) is clicked, a disassembly route manually produced for the part is decided. The above operation is repeated by the number of parts impossible in disassembly. When the disassembly for the whole parts is completed, then a reverse regulation button 241 on the screen of an operation menu for a route recording of FIG. 37(d) is depressed to translate the cursor 211 from the position "FINAL" to the position "INITIAL", so that an assembly situation of the parts is confirmed on the graphics screen. While the collision check is conducted again in the apparatus. The reason why this is to do so is that since the disassembly route producing by the manual operation on a plurality of parts is carried out later on a batch basis, performing an assembly or a disassembly in turn involves a possibility that a collision occurs. When the collision occurs, the automatic disassembly route producing is conducted again. To conduct again the automatic disassembly route producing, as to a part for which a disassembly route is manually designated, the disassembly route manually designated is applied for the part.

In the mode explained referring to FIG. 34 and FIGS. 35(a), 35(b), 35(c) and 35(d), the run of the routine for the automatic disassembly route producing is interrupted whenever a part impossible in an automatic disassembly is found. In such a case, it is needed for an operator to be always near the apparatus. In a case where the number of parts is little, this will be admitted. However, in the event that the number of parts is large, it is a convenient way that as mentioned above, skipping parts impossible in an automatic disassembly, an automatic disassembly route for the subsequent part is produced, and the manual operation is performed later on a batch basis.

Next, there will be explained aspects of a thirteenth assembly route producing apparatus according to an embodiment of the present invention.

FIGS. 38(a), 38(b) and 38(c) are illustrations showing a state that one of parts on graphics screens is now being disassembled. FIG. 38(a) shows a three-dimensional graphics screen. For the purpose of better understanding, FIGS. 38(b) and 38(c) each show a two-dimensional screen looking from a side.

According to the scheme of the disassembly route producing explained referring to FIG. 34 and FIGS. 35(a), 35(b), 35(c) and 35(d), or the scheme of the disassembly route producing explained referring to FIG. 36 and FIGS. 37(a), 37(b), 37(c) and 37(d), the designation of the disassembly route by manual is conducted. According to the present embodiment, it is assumed that a part A is now being disassembled through such a manual operation. At that time, as shown in FIG. 38(b), when the part A is translated to a position wherein the closest approach distance d1 between the remaining parts B and C is not less than a predetermined distance Dm, it is prohibited that the part A enters an area less than the predetermined distance as shown in FIG. 38(c), in other words, the part A is translated to a position wherein the closest approach distance d2 is less than Dm, or d2<Dm.

In this manner, limiting a translation possible area of parts in disassembly to an area apart exceeding the predetermined distance Dm contributes to speeding up of the collision check.

Figure 39:
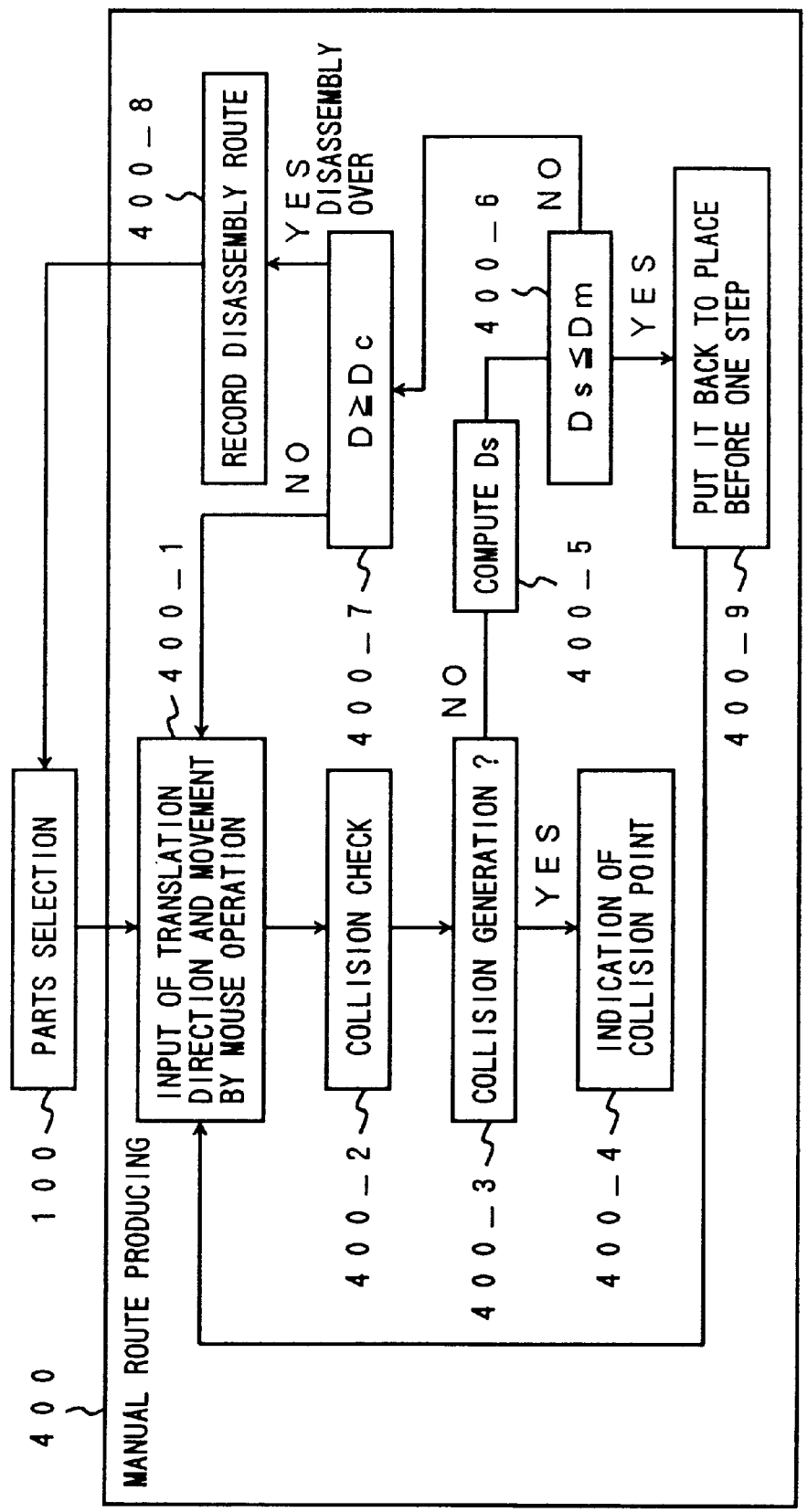
FIG. 39 is a flowchart showing a routine for implementing characteristic structures shown in FIGS. 38(a), 38(b) and 38(c)

FIG. 39 is a flowchart showing a routine for implementing characteristic structures shown in FIGS. 38(a), 38(b) and 38(c).

When a part to be disassembled is selected, in a manual route producing routine 400, a translation direction of the part to be disassembled and a movement thereof are inputted through a mouse operation (step 400_1); a collision check is performed (step 400_2); and the presence of occurrence of a collision is decided (step 400_3). In the step 400_3, when it is decided that a collision occurs, a point (a collision point: see FIG. 3(a)) wherein a collision occurs is displayed on the graphics screen. In the step 400_3, when it is decided that no collision occurs, the closest approach distance Ds is calculated and it is determined as to whether the closest approach distance Ds is not more than the above-mentioned predetermined distance Dm (step 400_6). In the step 400_6, when it is decided that Ds>Dm, since it means that the part in disassembly (in case of FIG. 38(a), the part A) locates apart from another part, the process goes to a step 400_7 in which it is determined whether a translation distance D of the part (in case of FIG. 38(a), the part A) is not less than a distance Dc in which a disassembly is regarded as having been completed. In the step 400_7, when it is decided that D≧Dc, a disassembly for the part is regarded as having been completed, and the process goes to a step 400_8 in which a disassembly route for the part is recorded, and then shifts to a selection for the subsequent part. On the other hand, in the step 400_7, when it is decided that D<Dc, the situation offers a state that the subsequent mouse operation is waited. In the step 400_6, when it is decided that Ds≦Dm, that is, when the mouse operation is performed in such a manner that the part in disassembly is translated into an area prohibiting an entry, the process goes to a step 400_9 in which the procedure is returned to the stage before the mouse operation of this time is conducted, and the situation offers a state that the subsequent mouse operation is waited.

In this manner, it is prohibited that a part in disassembly enters the area of the distance Dm from the remaining part.

Next, there will be explained aspects of a fourteenth assembly route producing apparatus according to an embodiment of the present invention.

Figure 40:
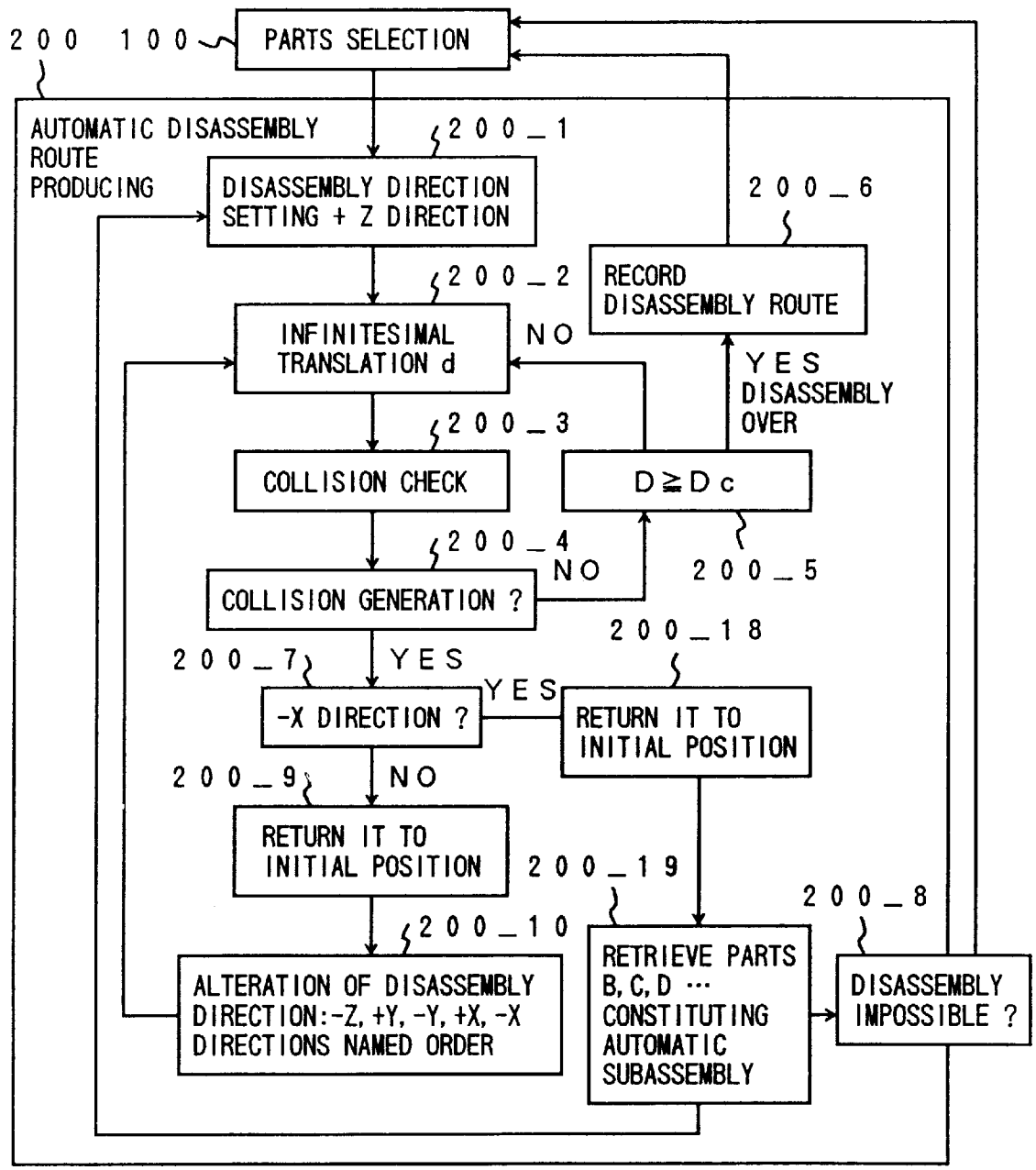
FIG. 40 is a flowchart showing a routine for implementing characteristic structures of a fourteenth assembly route producing apparatus according to an embodiment of the present invention.

FIG. 40 is a flowchart showing a routine for implementing characteristic structures of a fourteenth assembly route producing apparatus according to an embodiment of the present invention. A difference between it and the basic routine shown in FIG. 5 will be described hereinafter.

In the step 200_7, when it is decided that a collision still occurs even through searching in the final searching direction: -X direction, the process goes to a step 200_18 in which the part in search for a disassembly route is returned to the initial position. In a step 200_19, it is regarded that the part in search for a disassembly route constitutes a subassembly in combination with one or a plurality of parts other than the part in search, and a search for a disassembly route is conducted in such a manner that a plurality of parts, which are regarded as constituting the subassembly, are simultaneously translated in the same direction. When it is impossible in disassembly, then it is regarded that the part in search for a disassembly route constitutes a subassembly in combination with a different part or a plurality of different parts other than the part in search, and a search for a disassembly route is conducted in such a manner that a plurality of parts, which are regarded as constituting the subassembly, are simultaneously translated in the same direction. When this process is repeated and it is still impossible in disassembly, the process goes to the step 200_8.

This routine is applied, in the event that parts possible to be individually disassembled are first disassembled beforehand, to the remaining parts which were impossible in disassembly.

This feature may enhance a possibility that a disassembly route can be automatically produced.

Figure 41:
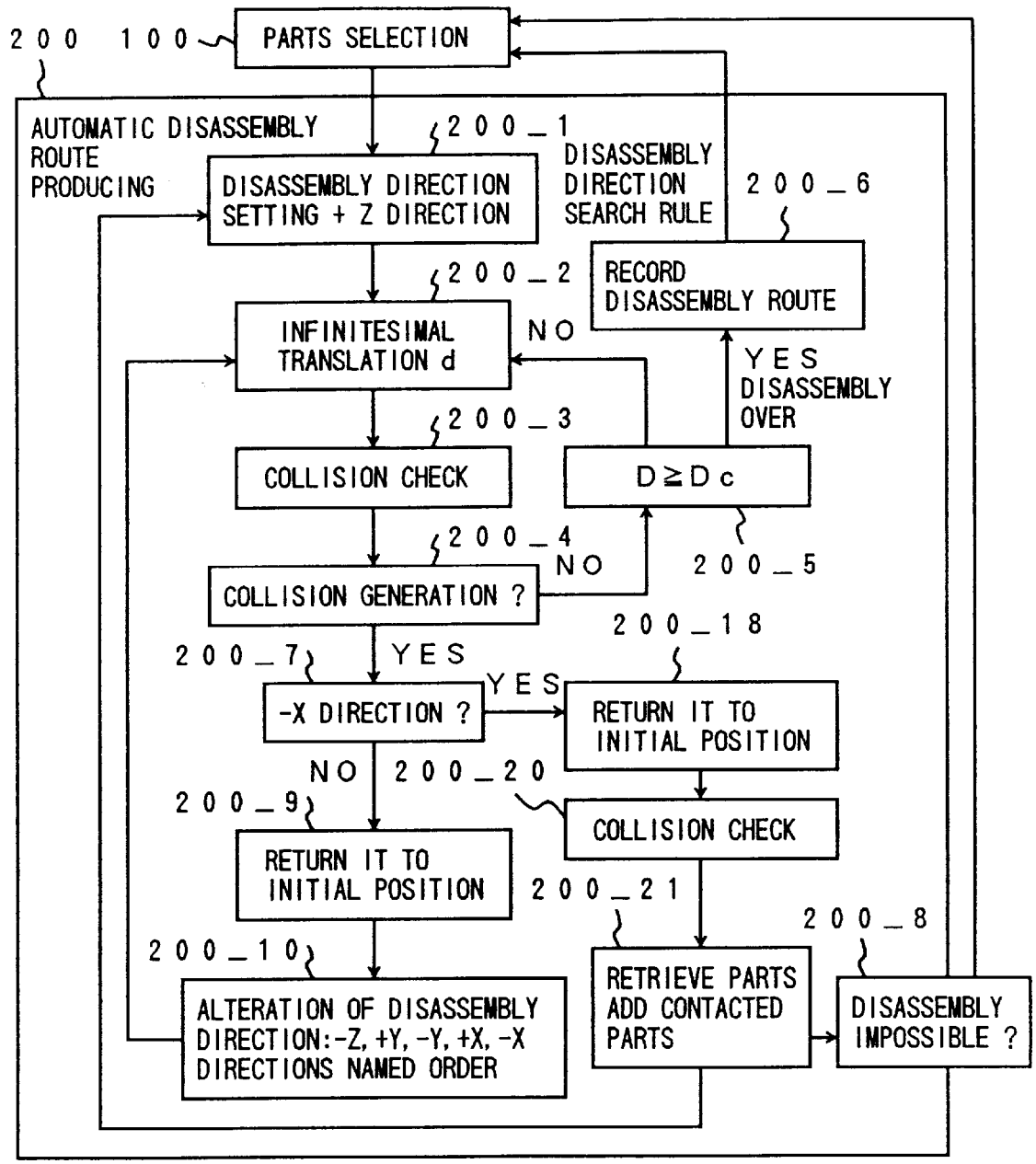
FIG. 41 is a flowchart showing a modification of the routine shown in FIG. 40.

FIG. 41 is a flowchart showing a modification of the routine shown in FIG. 40. A difference between it and the routine shown in FIG. 40 will be described hereinafter.

In the step 200_18, the part in a disassembly is returned to the initial position, and thereafter, in a step 200_20, a collision check of the part intended to be disassembled, which is returned to the initial position, with another part is conducted. In step 200_21, as a part constituting a subassembly in combination with the part intended to be disassembled, a part, which is in contact with the part intended to be disassembled, is selected. Alternatively, in the event that a plurality of parts, which constitute a subassembly in combination with the part intended to be disassembled, are selected, a part(s), which is directly contact with the part intended to be disassembled, and a part(s), which is not directly contact with the part intended to be disassembled, but is contact with the part which is directly in contact with the part intended to be disassembled, are selected.

According to the present embodiment, in this manner, a plurality of parts, which are sequentially in contact with one another, are regarded as constituting a subassembly. The reason why this is to do so is that there is a high possibility that a set of parts in contact with one another is actually a subassembly, and also there is a high possibility that a disassembly direction of the subassembly is determined on a unitary basis.

Figure 42:
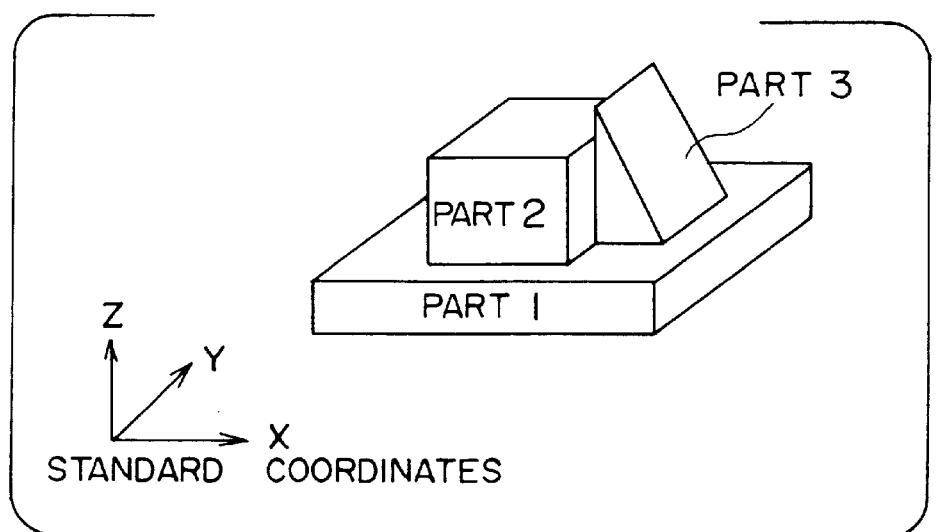
FIG. 42 is an explanatory view useful for understanding characteristic portions of a fifteenth assembly route producing apparatus according to an embodiment of the present invention.
Figure 43:
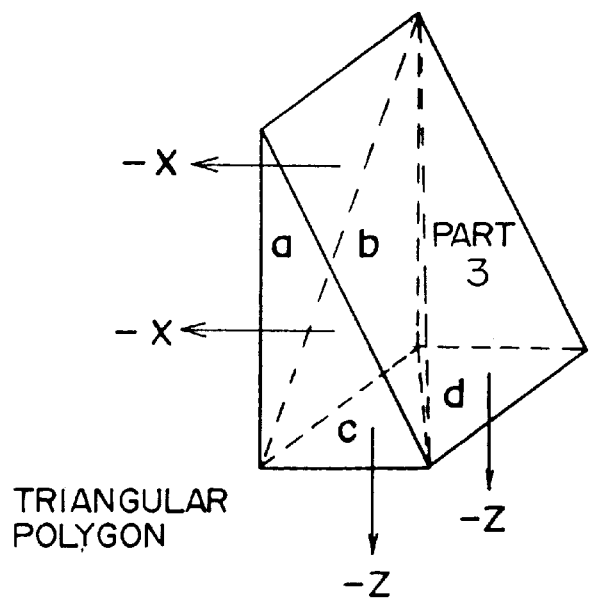
FIG. 43 is an explanatory view useful for understanding characteristic portions of a fifteenth assembly route producing apparatus according to an embodiment of the present invention.

FIG. 42 and FIG. 43 are each an explanatory view useful for understanding characteristic portions of a fifteenth assembly route producing apparatus according to an embodiment of the present invention.

Here, as shown in FIG. 42, let us consider a product consisting of three parts 1, 2 and 3, and it is assumed that a basic coordinate system is defined as shown in FIG. 42.

When the part 3 is disassembled, the part 3 cannot be translated in the −Z direction, that is, the direction in which the part 1 is disposed, looking from the part 3, and in the −X direction, that is, the direction in which the part 2 is disposed. For these reasons, according to the present embodiment, prior to conducting a search for a disassembly route, a direction impossible in a disassembly (translation) is detected, and the search for a disassembly route is not conducted per se with respect to the direction impossible in a disassembly. This feature may contribute to speeding up of the search for a disassembly route.

Here, the parts constituting the product are defined as a triangular polygon of aggregate, as shown in FIG. 43, on the part 3.

With respect to a part intended to be disassembled, of triangular polygons constituting the part, a triangular polygon interfered with any of triangular polygons constituting another part is detected. And a search for a disassembly route is not tried with respect to a direction of the triangular polygon thus detected (a direction, which is perpendicular to a plane of the triangular polygon detected, and is oriented outward with respect to the part constituted of the triangular polygon, is addressed as a direction of the triangular polygon, and a vector of this direction is referred to as an "outward normal vector".

Figure 44:
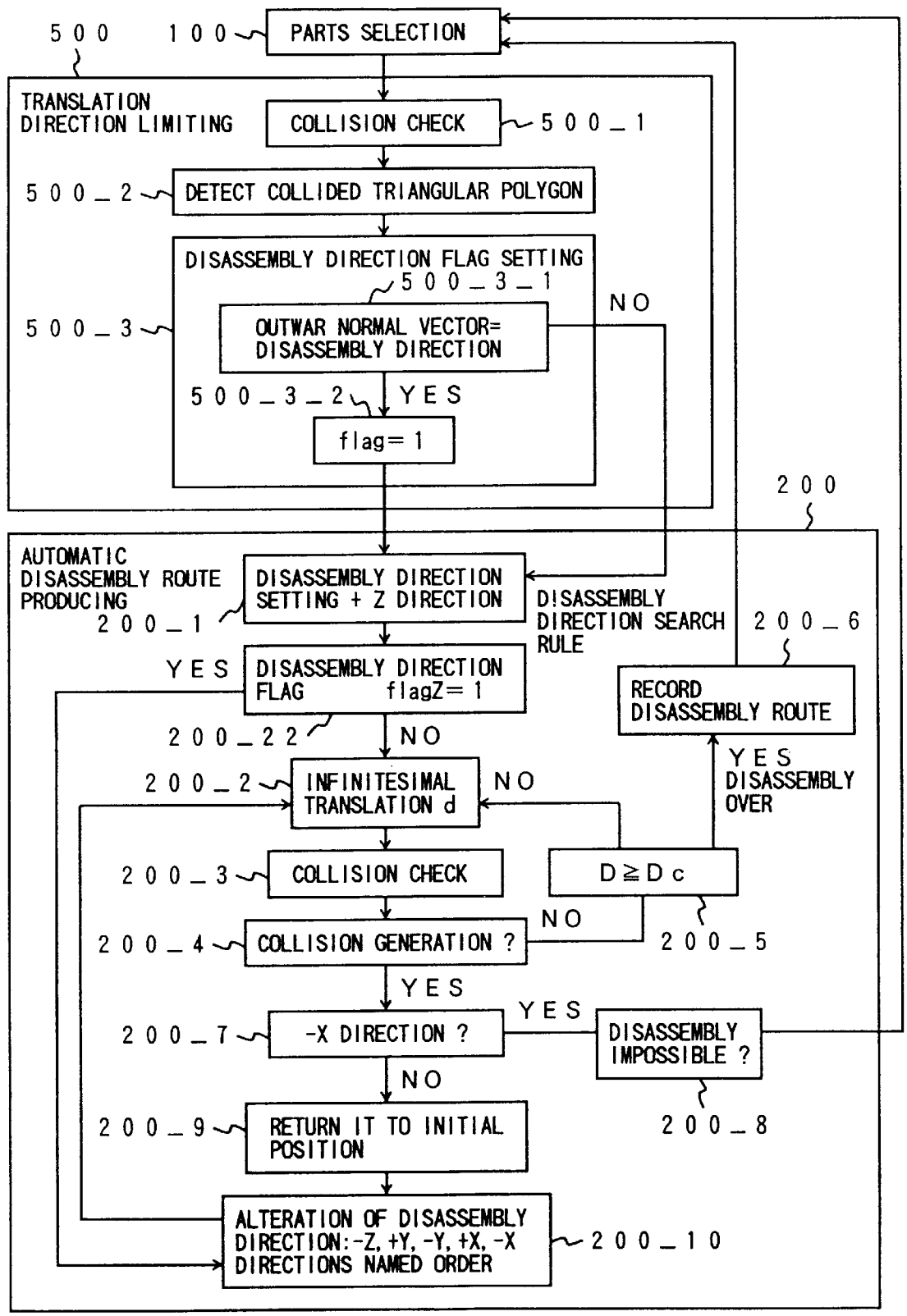
FIG. 44 is a flowchart showing a routine for implementing characteristic structures of a fifteenth assembly route producing apparatus according to an embodiment of the present invention.

FIG. 44 is a flowchart showing a routine for implementing characteristic structures of a fifteenth assembly route producing apparatus according to an embodiment of the present invention, explained referring to FIG. 42 and FIG. 43. A difference between it and the basic routine shown in FIG. 5 will be described hereinafter.

In the routine shown in FIG. 44, as compared with the basic routine shown in FIG. 5, a translation direction limit routine 500 is added, and further, in the automatic disassembly route producing routine a step 200_22 for a disassembly direction flag determination is added.

In the translation direction limit routine 500, on a part selected in the part selection routine 100, a collision check between triangular polygons constituting the part and triangular polygons constituting another part is performed, so that a triangular polygon of the part intended to be disassembled, which is interfered with any of triangular polygons constituting another part, is detected (a step 500_1, and step 500_2). In a disassembly direction flag set up route 500_3, first, it is determined, in a step 500_3_1, as to whether an outward normal vector of the interfered triangular polygon coincides with a disassembly direction (anyone of ±Z directions, ±Y directions and ±X directions).

According to the present embodiment, the disassembly direction is restricted to the total six directions of ±Z directions, ±Y directions and ±X directions, and only when the outward normal vector coincides with a disassembly direction, a search for a disassembly route is not tried. In other words, when the outward normal vector coincides with none of the above-mentioned six disassembly directions, a search for a disassembly route is tried, even if a triangular polygon having the outward normal vector interferes.

In the step 500_3_1, when it is decided that the outward normal vector coincides with a disassembly direction, it sets a disassembly impossible flag associated with the outward normal vector so as not to conduct a search for a disassembly route in the direction of the outward normal vector (a step 500_3_2). In the step 500_3_2, disassembly impossible flags: a flag Z, a flag −Z, a flag Y, a flag −Y, a flag X, and a flag −X are defined in association with disassembly directions: +Z, −Z, +Y, −Y, +X and −X, respectively, while it is not illustrated.

In the automatic disassembly route producing routine 200, first, a disassembly direction is set up to the +Z direction, and it is determined whether the flag Z of the +Z direction is given by the flag Z=1. When the flag Z=1, a search for a disassembly route in the +Z direction is omitted and the process goes to the step 200_10. In the step 200_10, the subsequent disassembly route is determined in accordance with the disassembly direction retrieval rule, while the disassembly impossible flags are referred to, with respect to the direction impossible in a disassembly it is not designated as the subsequent disassembly route.

In the example of the part 3 shown in FIG. 42 and FIG. 43, a search for a disassembly route is not conducted with respect to the −Z direction and the −X direction. Thus, the number of times of searches is reduced thereby contributing to speeding up of the search for a disassembly route.

Next, there will be explained aspects of a sixteenth assembly route producing apparatus according to an embodiment of the present invention.

Figure 45:
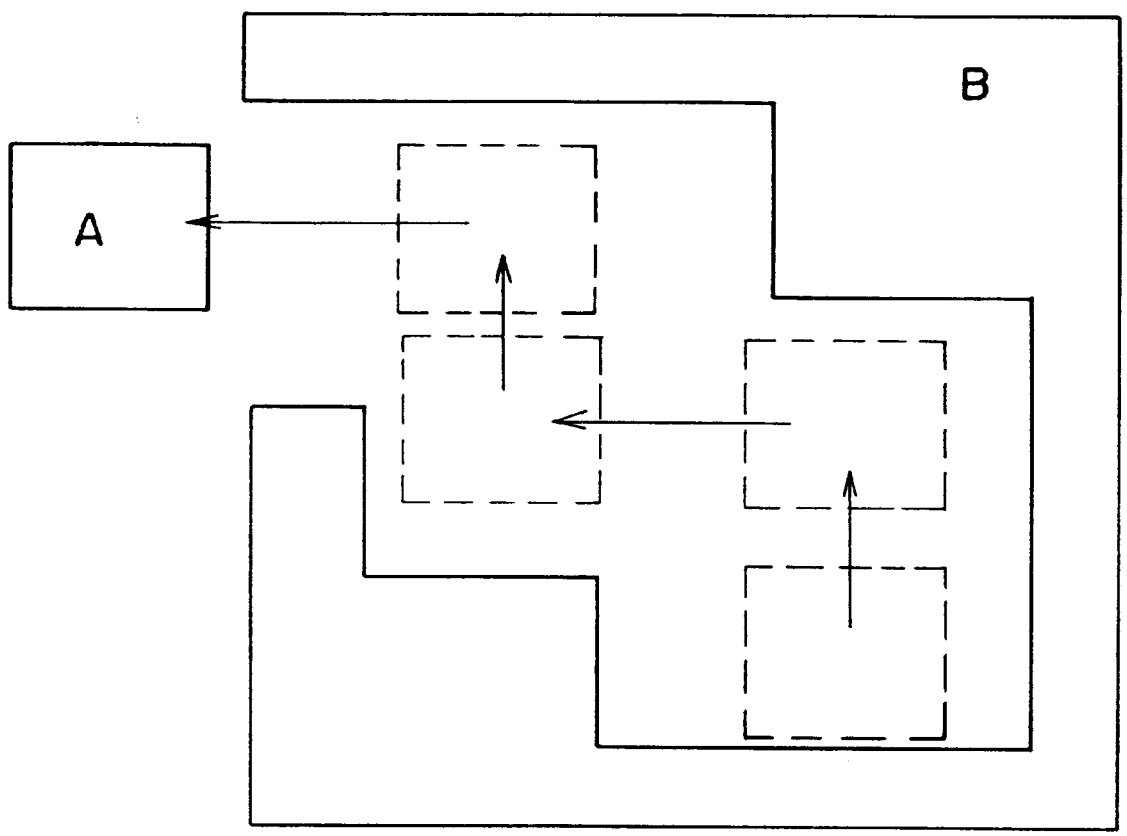
FIG. 45 is an explanatory view useful for understanding characteristic portions of a sixteenth assembly route producing apparatus according to an embodiment of the present invention.

FIG. 45 is an explanatory view useful for understanding characteristic portions of a sixteenth assembly route producing apparatus according to an embodiment of the present invention.

Now, let us consider a search for a disassembly route such that as shown in FIG. 45, a part A comes into a complicated configuration of internal space of a part B, and the part A is taken out from the internal space of the part B. According to the basis routine shown in FIG. 5, a search for a disassembly route is conducted with respect to any one of the disassembly directions, and when a part in disassembly interferes with another part, the part in disassembly is returned to the first place, and a search for a disassembly route is repeatedly conducted with respect to another disassembly directions. According to such a scheme, an automatic search is impossible for the disassembly route in which a disassembly direction is changed halfway as shown in FIG. 45, and it has come to the conclusion that the disassembly is impossible. For this reason, according to the present embodiment, with respect to each of the six directions of +Z, −Z, +Y, −Y, +X and −X directions, a translation distance from the initial position to a position involved in the occurrence of the collision with another part is recorded, and in the event that a disassembly is impossible in any direction, then the part A is translated in a direction involved in the maximum translation distance, by the maximum translation distance, of the six directions, and a search for a disassembly route is again conducted taking the position after a translation of the maximum distance as a starting point. In the second search, with respect to the direction involved in the maximum distance translation and an opposite direction returning to the first position, they are removed from an object of the search. According to the present embodiment, the number of times of the above-mentioned process of changing a course is defined by a TURN-DEFAULT. Thus, the above-mentioned process of changing a course is repeated by the number of times defined by the TURN-DEFAULT.

Figure 46:
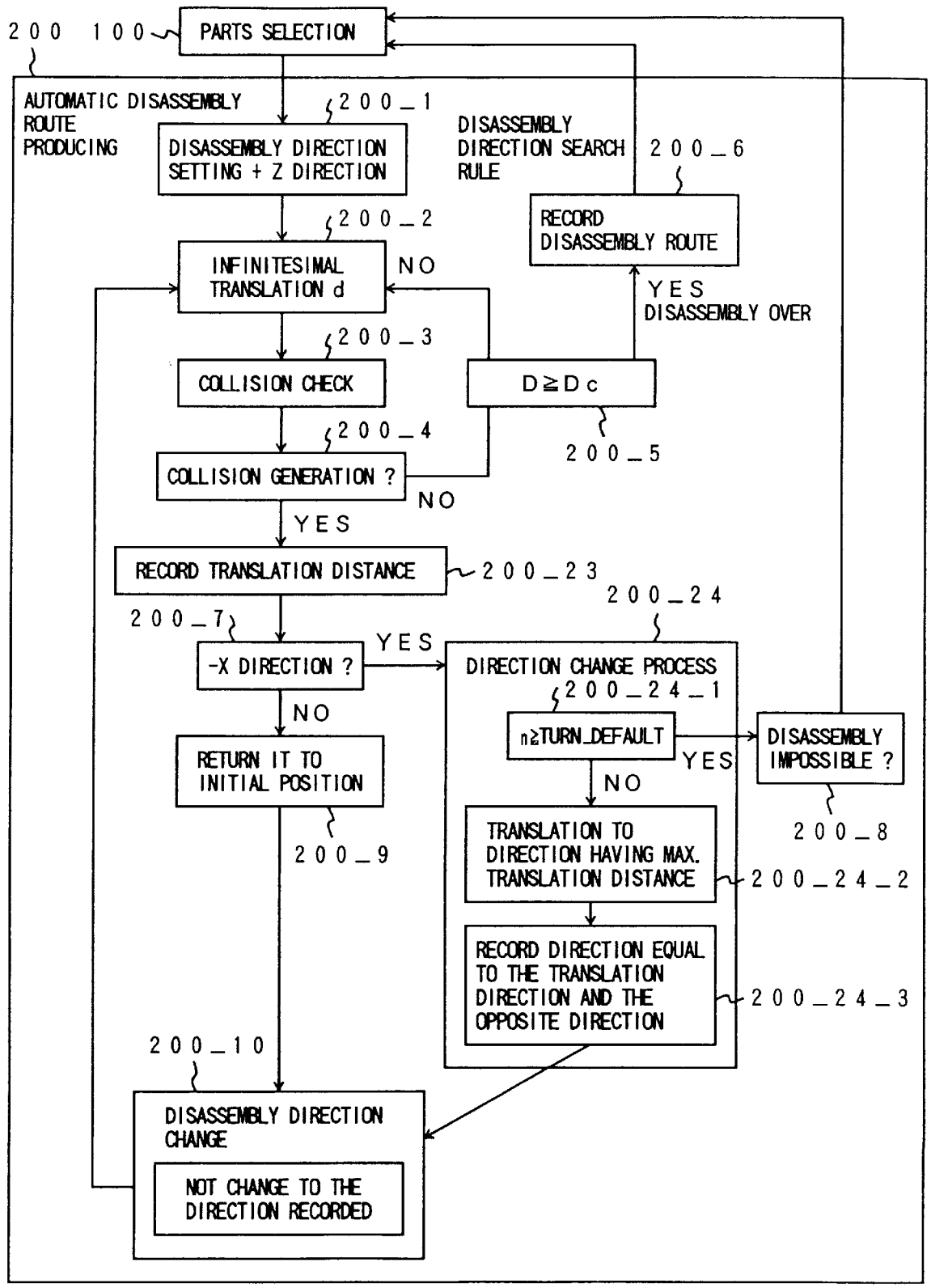
FIG. 46 is a flowchart showing a routine for implementing characteristic structures of a sixteenth assembly route producing apparatus according to an embodiment of the present invention.

FIG. 46 is a flowchart showing a routine for implementing characteristic structures of a sixteenth assembly route producing apparatus according to an embodiment of the present invention, which is explained referring to FIG. 45. A difference between it and the basic routine shown in FIG. 5 will be described hereinafter.

When a collision occurs in the respective directions (the step 200_4), a translation distance, involved in an occurrence of the collision, of a part in a disassembly is recorded in every disassembly direction (a step 200_23). When a collision, which now occurs, is equivalent to a collision, which occurs in a trial of a disassembly in a −X direction or the final disassembly direction (the step 200_7), the process enters a routine 200_24 for process of changing a course. In the routine 200_24, first, the number of times of changing a course, which is denoted by n, is compared with a predetermined number of times (TURN-DEFAULT), and if n ≧TURN-DEFAULT, it is decided that the disassembly is impossible. If n<TURN-DEFAULT, the process goes to a step 200_4_2 in which a part, which is now in a disassembly, is translated in a direction involved in the maximum translation distance, by the maximum translation distance, of the translation distances as to the six disassembly directions, which are recorded in the step 200_23. In a step 200_24_3, it is recorded that searches for a disassembly route in the direction involved in the maximum translation distance and in the opposite direction are not necessary, and the process passes through the routine 200_24 for process of changing a course. Then, in the step 200_10, a disassembly direction is designated. At that time, of the six disassembly directions, the two directions recorded in the step 200_24_3 are not designated as a disassembly direction, and a disassembly direction is designated in turn from among the remaining four directions.

A adoption of the routine shown in FIG. 46 makes it possible to conduct a search for a complicated disassembly route as shown in FIG. 45.

Next, there will be explained aspects of a seventeenth assembly route producing apparatus according to an embodiment of the present invention.

FIGS. 47(a) and 47(b) and FIGS. 48(a) and 48(b) are each an an explanatory view useful for understanding characteristic portions of a seventeenth assembly route producing apparatus according to an embodiment of the present invention.

FIG. 47(a) is a perspective view and a side view each showing a state that a part A is going to be disassembled from a part B.

The part A is disposed in such a manner that it strictly coincides with a step-like portion of the part B. In this condition, a collision of the part A with the part B makes it impossible to disassemble the part A. In this case, as shown in FIG. 47(b), a triangular polygon of the part A, which interferes with the part B, is detected, the triangular polygon is reduced in size, and the reduced triangular polygon is translated inside the part A. A part A' made in this manner has a finite distance d between it and the part B, and it is decided that the part A' does not interfere with the part B, so that the part A' can be disassembled from the part B. In the event that even when the triangular polygon of the part A involved in the collision is changed as mentioned above, the collision state is still continued, it is decided that the part A surely interferes with the part B, but not in contact with the part B.

Figure 48B:
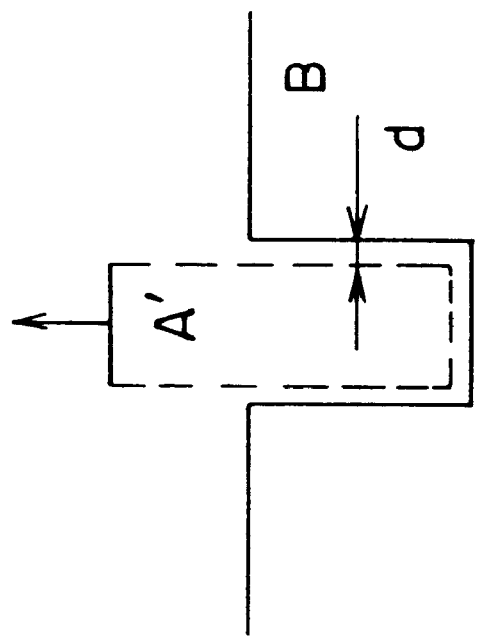
FIGS. 48(*a*) and 48(*b*) are an explanatory view useful for understanding characteristic portions of a seventeenth assembly route producing apparatus according to an embodiment of the present invention.
Figure 48A:
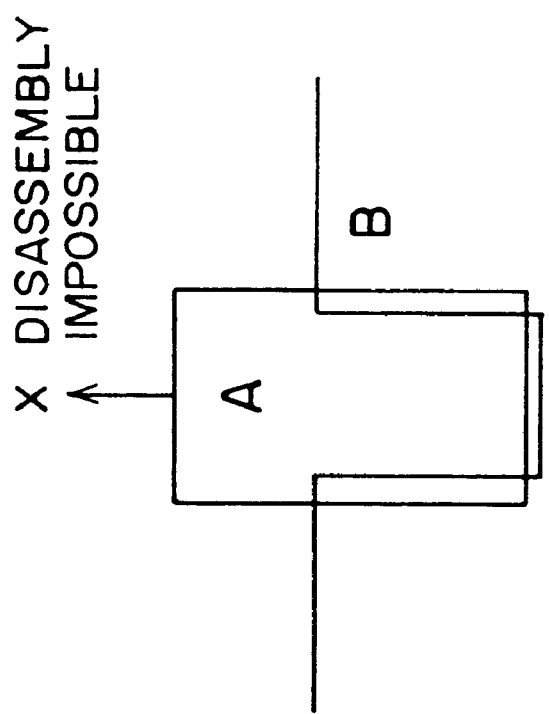

In FIG. 48(a), a part A is, for example, a pin or screw-like part which is engaged or screwed with a hole of a part B. In case of a screw for instance, screw threads of the part A overlap with screw threads of the part B. In case of a pin for instance, for example, in the event that for the purpose of providing a strict engagement of the pin with the hole, a pin having a somewhat larger outside diameter than an inside diameter of the hole is designed, the part A and the part B overlap each other as shown in FIG. 48(a), in other words, the part A and the part B interfere with each other. Thus, in this condition, it is impossible to disassemble the part A from the part B. In view of the foregoing, in a similar fashion to that of a case where it is explained referring to FIG. 47(b), a polygon of the part A, which interferes with the part B, is reduced in size, and the reduced polygon is translated inside the part A. A part A' made in this manner has a finite distance d between it and the part B, and it is decided that the part A' does not interfere with the part B, so that the part A' can be disassembled from the part B. According to the present embodiment, only the polygon involved in the collision is changed. This feature makes it possible to reduce an amount of operation, as compared with a scheme in which a part (part A) intended to be disassembled is reduced in size in its entirety, thereby contributing to speeding up of a search for a disassembly route.

According to the present embodiment, an attribute data TOLERANCE, which defines a degree of a reduction of a polygon involved in the collision and a degree of a translation of the polygon into a part, is defined for each part, wherein a default value is given by TOLERANCE=1.0×10⁻⁵.

Figure 49:
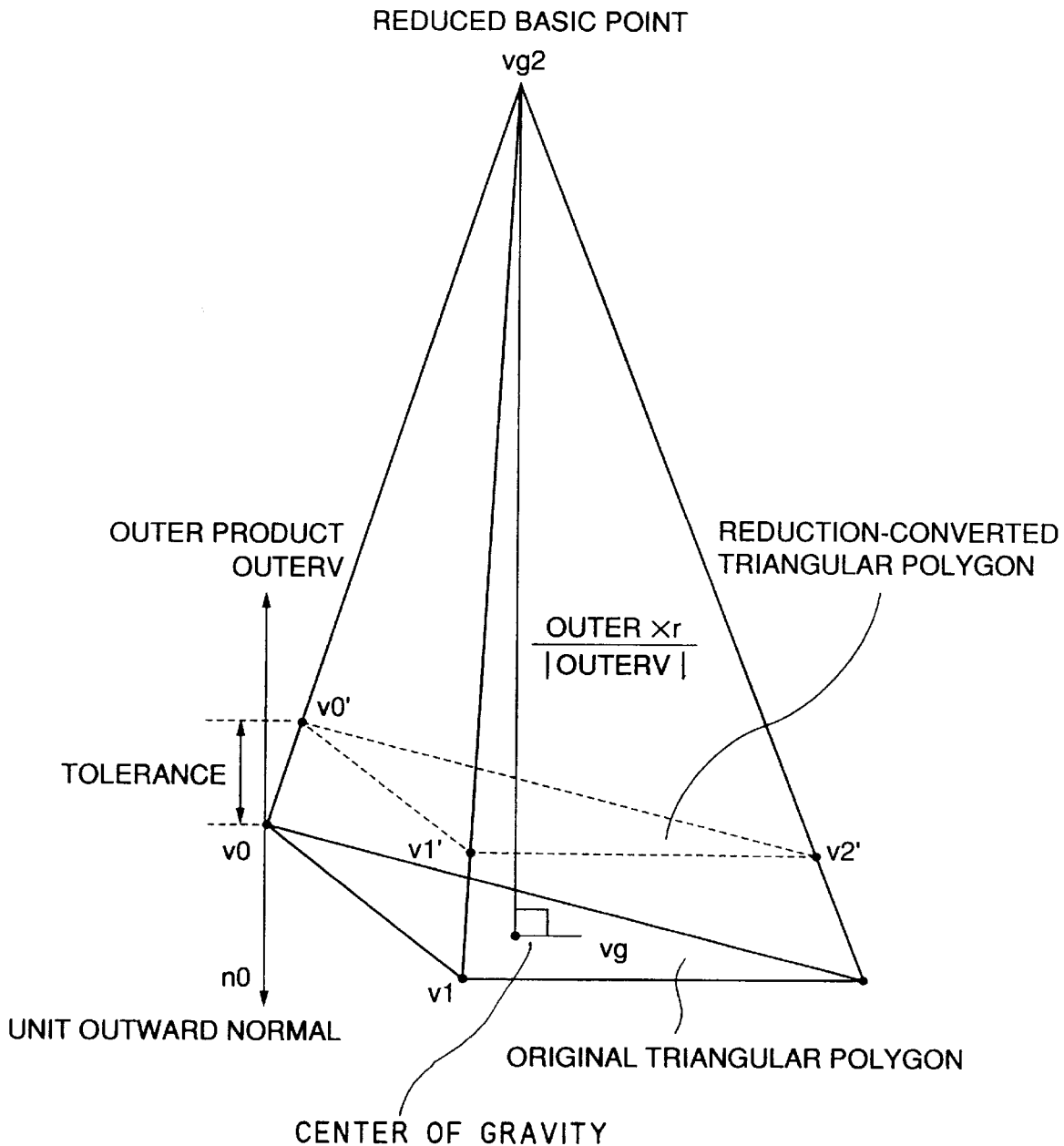
FIG. 49 is an explanatory view useful for understanding an algorithm in which an interfered polygon is reduced in size and moved in position.
Figure 50:
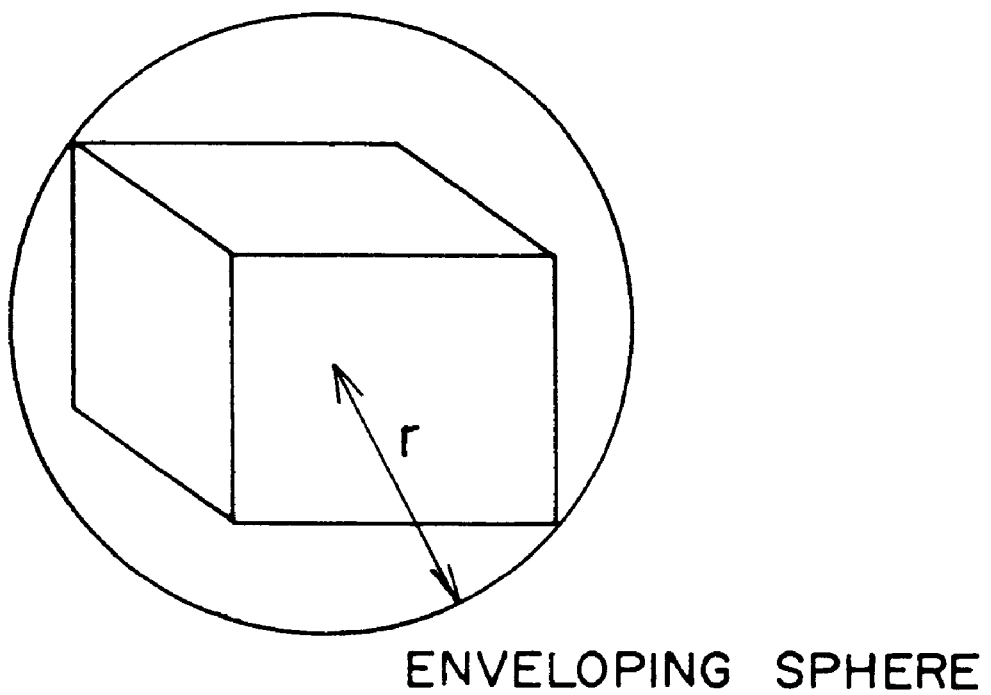
FIG. 50 is an illustration of an enveloping sphere of a part in search for a disassembly route.

FIG. 49 is an explanatory view useful for understanding an algorithm in which an interfered polygon is reduced in size and moved in position. FIG. 50 is an illustration of an enveloping sphere of a part in a search for a disassembly route, which is referred to in an explanation of FIG. 49.

A triangular polygon shown in FIG. 49 is defined by data of coordinate vectors V0, V1 and V2, which are representative of coordinates of three tops of the triangle, respectively, and data of unit length of outward normal vector n0.

First, a barycentric coordinates Vg of the original triangular polygon before reduced is calculated by $Vg=V0+V1+V2/3$ and assuming that a vector from V0 toward V1 and a vector from V0 toward V2 are expressed by V01 and V02, respectively, an outer product vector "outer V" of those two vectors is calculated by outer $V=V01 \times V02$ and in order that the outer product vector "outer V" is decided to be inward, an inner product vector "inner V" of the outer product vector "outer V" and the outward normal vector n0 is calculated by inner $V$=outer $V \cdot n0$ and if inner V=0, in other words, when a direction of the outer product vector "outer V" coincides with a direction of the outward normal vector n0, the outer product vector "outer V" is decided to be inward (a direction shown in FIG. 49) through an operation of $$\text{outer } V = \text{outer } V \cdot (-1.0).$$

Next, a reduction basic point Vg 2 is calculated by $$Vg\ 2 = Vg - r \cdot \text{outer } V / |\text{outer } V|$$

where r denotes a radius of a sphere (an enveloping sphere) having the minimum radius enveloping a part of interest (intended to be disassembled).

In this manner, when the reduction basic point Vg 2 is obtained, the coordinate vectors V0, V1 and V2 are respectively altered to $$V0' = Vg\ 2 + (V0 - Vg\ 2) \cdot \text{scale}$$

$$V1' = Vg\ 2 + (V1 - Vg\ 2) \cdot \text{scale}$$

$$V2' = Vg\ 2 + (V2 - Vg\ 2) \cdot \text{scale}$$

where the scale denotes a quantity defined by $$\text{scale} = (r - \text{TOLERANCE})/r$$

using the above-mentioned TOLERANCE defined as the auxiliary data for each part, and the enveloping sphere radius r show in FIG. 50.

Figure 51:
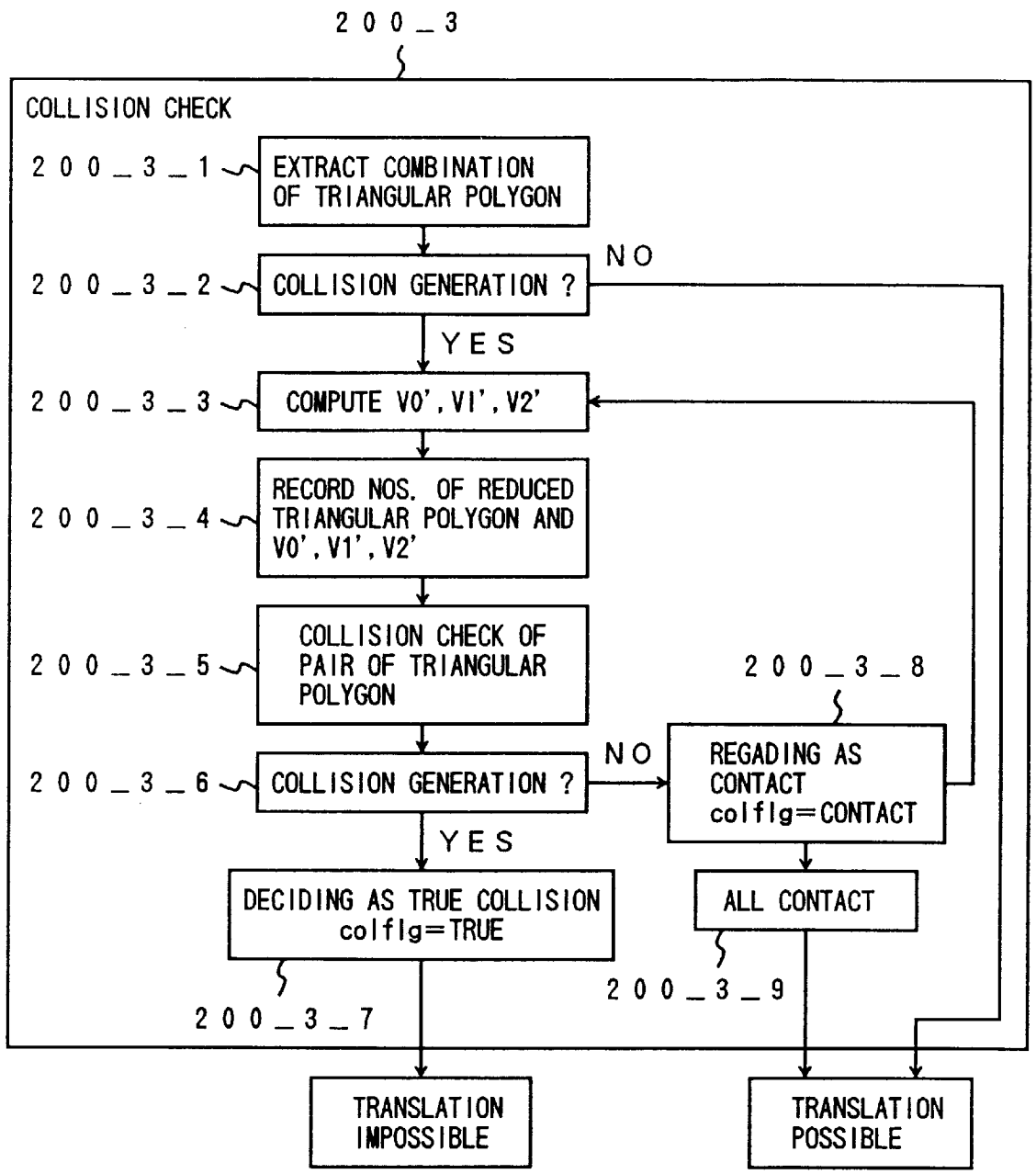
FIG. 51 is a flowchart showing a routine for implementing characteristic structures of a seventeenth assembly route producing apparatus according to an embodiment of the present invention.

FIG. 51 is a flowchart showing a routine for implementing characteristic structures of a seventeenth assembly route producing apparatus according to an embodiment of the present invention, explained referring to FIGS. 47–50. The flowchart shown in FIG. 51 corresponds to the step 200_3 for the collision check in the basic routine shown in FIG. 5 in its entirety.

In the collision check routine 200_3 shown in FIG. 51, first, in a step 200_3_1, a combination of polygons, which constitute a part in a search for a disassembly route, and polygons, which constitute another part, those two types of polygons colliding with each other or having a possibility of colliding with each other, is extracted. In the step 200_3_1, while it is acceptable that the collision check is carried out sequentially on the whole combinations of the polygons, which constitute a part in a search for a disassembly route, and the polygons, which constitute another part, more preferably, it is possible to adopt a so-called Bubble Collision method (cf. Japanese Patent Application Laid Open Gazette Hei. 9-27046, U.S. patent application Ser. No. 668,145) in which a collision of enveloping spheres is investigated.

In the step 200_3_1, for example, the Bubble Collision method is adopted to extract a plurality of combinations of triangular polygons involved in a possibility of a collision, and it is decided whether a collision occurs on each of the combinations thus extracted (a step 200_3_2).

When it is decided that no collision occurs on any of the combinations, the process passes through the collision check routine 200_3 carrying information of possible translation.

When it is decided that anyone of the combinations is involved in the occurrence of a collision, the process goes to a step 200_3_3 in which of two triangular polygons constituting the combination involved in the occurrence of a collision, the polygon in a search for a disassembly route is subjected to a reduction conversion in accordance with the above-mentioned algorithm. In a step 200_3_4, in order to avoid twice performing the same computation as to the triangular polygon once subjected to the reduction conversion, the number of the reduced triangular polygon and the tops V0', V1' and V2' after the reduction conversion are recorded. In a step 200_3_5, a collision check is conducted as to a collision between the triangular polygon thus reduced and a triangular polygon of another part interfered with the polygon before the reduction conversion, and if no collision occurs (a step 200_3_6), it is regarded as being simply in contact with it and CONTACT indicative of a 'contact' is stored in a collision flag "colfig".

The step 200_3_3 to the step 200_3_8 are repeated on all the combinations which have been decided, in the step 200_3_2, as being involved in an occurrence of a collision, and when it is decided that all the combinations are in the 'contact' (step 200_3_9), the process passes through the collision check routine 200_3.

In the step 200_3_6, when it is decided that a collision still occurs on the triangular polygon after the reduction conversion, it is decided as being a true collision and a value "TRUE" indicative of a true collision is stored in the collision flag "colflg", and then the process passes through the collision check routine 200_3.

Here, it is noted that as shown in FIG. 5, the process enters the collision check routine 200_3 whenever a part in a search for a disassembly route is translated by the infinitesimal distance d. At that time, for example, as shown in FIG. 47 and FIG. 48, it happens that the triangular polygon regarded as the 'contact' is decided again in the step 200_3_2 as being involved in an occurrence of a collision. In such a case, the step 200_3_3 is skipped and in step 200_3_4 the top coordinates V0', V1' and V2' after the reduction conversion are read.

Adoption of the above-mentioned routine makes it possible to conduct a search for a correct disassembly route, even in a case where parts are completely in contact with one another, as shown in FIG. 47, or in a case where parts are somewhat overlapped with each other, as shown in FIG. 48.

Next, there will be explained aspects of a eighteenth assembly route producing apparatus according to an embodiment of the present invention.

Figure 52:
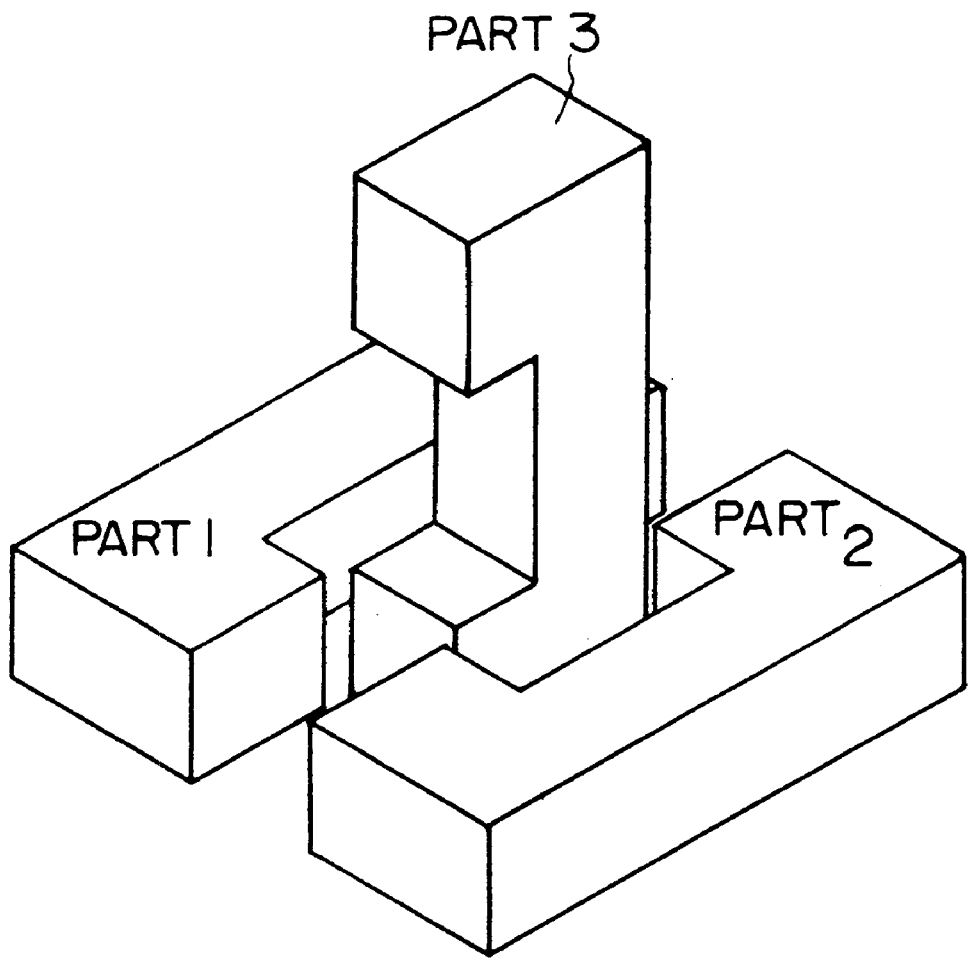
FIG. 52 is a perspective view of three parts.

FIG. 52 is a perspective view of three parts.

Each of those three parts is a concave-like configuration of part. A part 1 and a part 2 are horizontally arranged in such a manner that the recess portions of the parts 1 and 2 face each other, and a part 3 is vertically arranged in such a manner that the part 3 is engaged with the recess portions of the parts 1 and 2.

Figure 53A:
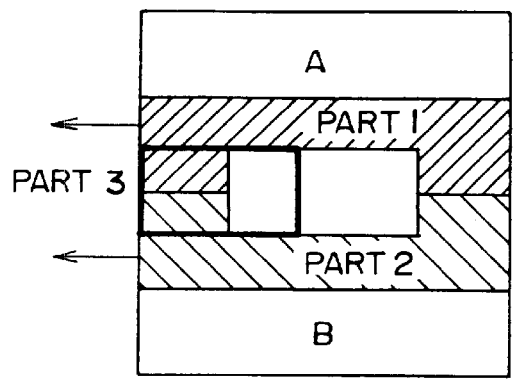
FIGS. 53(*a*), 53(*b*) and 53(*c*) are a top view, a front elevation, and a side elevation, respectively, each showing a state in which the three parts shown in FIG. 52 are combined.
Figure 53B:
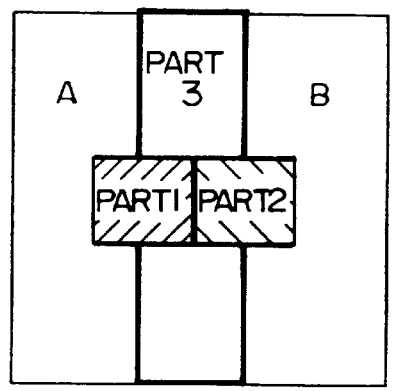
Figure 53C:
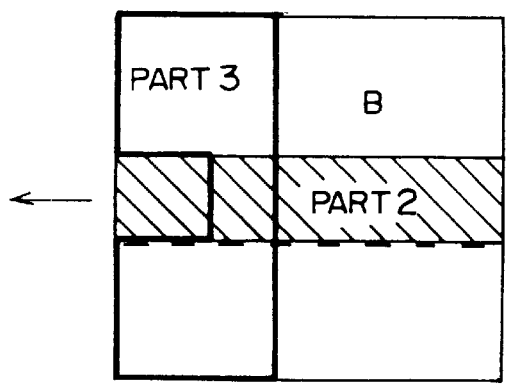

FIGS. 53(*a*), 53(*b*) and 53(*c*) are a top view, a front elevation, and a side elevation, respectively, each showing a state in which the three parts shown in FIG. 52 are combined.

The part 1 and the part 2 are sandwiched by other parts A and B, and are in the state that they cannot move in the directions of the parts A and B. At that time, the part 1 and the part 2 can move in a direction of arrows shown in FIG. 53(*a*) by a predetermined distance. But when the part 1 and the part 2 move by the predetermined distance, they will collide with the part 3, and thus it is impossible to disassemble the part 1 and the part 2. On the other hand, also with respect to the part 3, the part 3 will collide with the part 1 and the part 2, and thus it is impossible to disassemble the part 3. In this case, according to the basic routine shown in FIG. 5, it is decided as being impossible in a disassembly.

Figure 54A:
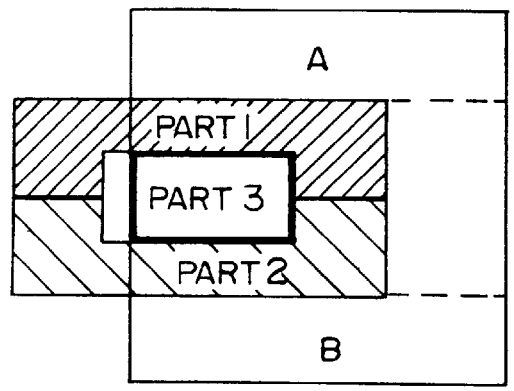
FIGS. 54(*a*), 54(*b*) and 54(*c*) are a top view, a front elevation, and a side elevation, respectively, each showing a state in which the three parts shown in FIG. 52 are combined.
Figure 54B:
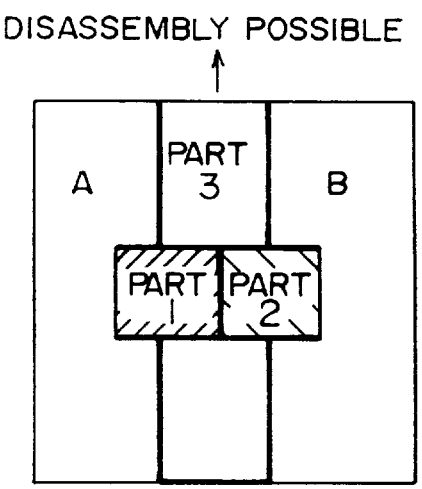
Figure 54C:
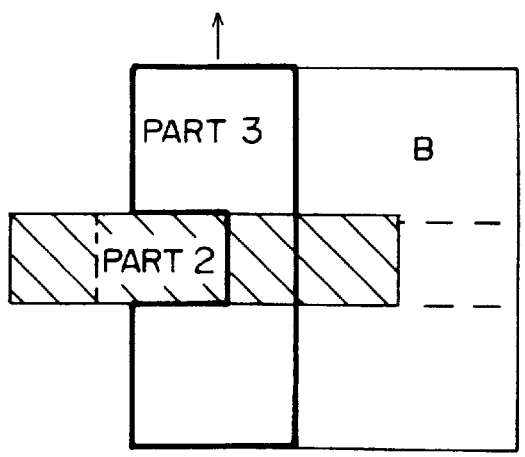

FIGS. 54(*a*), 54(*b*) and 54(*c*) are a top view, a front elevation, and a side elevation, respectively, each showing a state in which the three parts shown in FIG. 52 are combined.

When the part 1 and the part 2 are translated as shown in FIGS. 54(*a*) and 54(*c*), it is possible to disassemble the part 3 upward in this condition. The present embodiment makes it possible to perform coordinated movements, thereby enhancing a flexibility of a search for a disassembly route.

Figure 55:
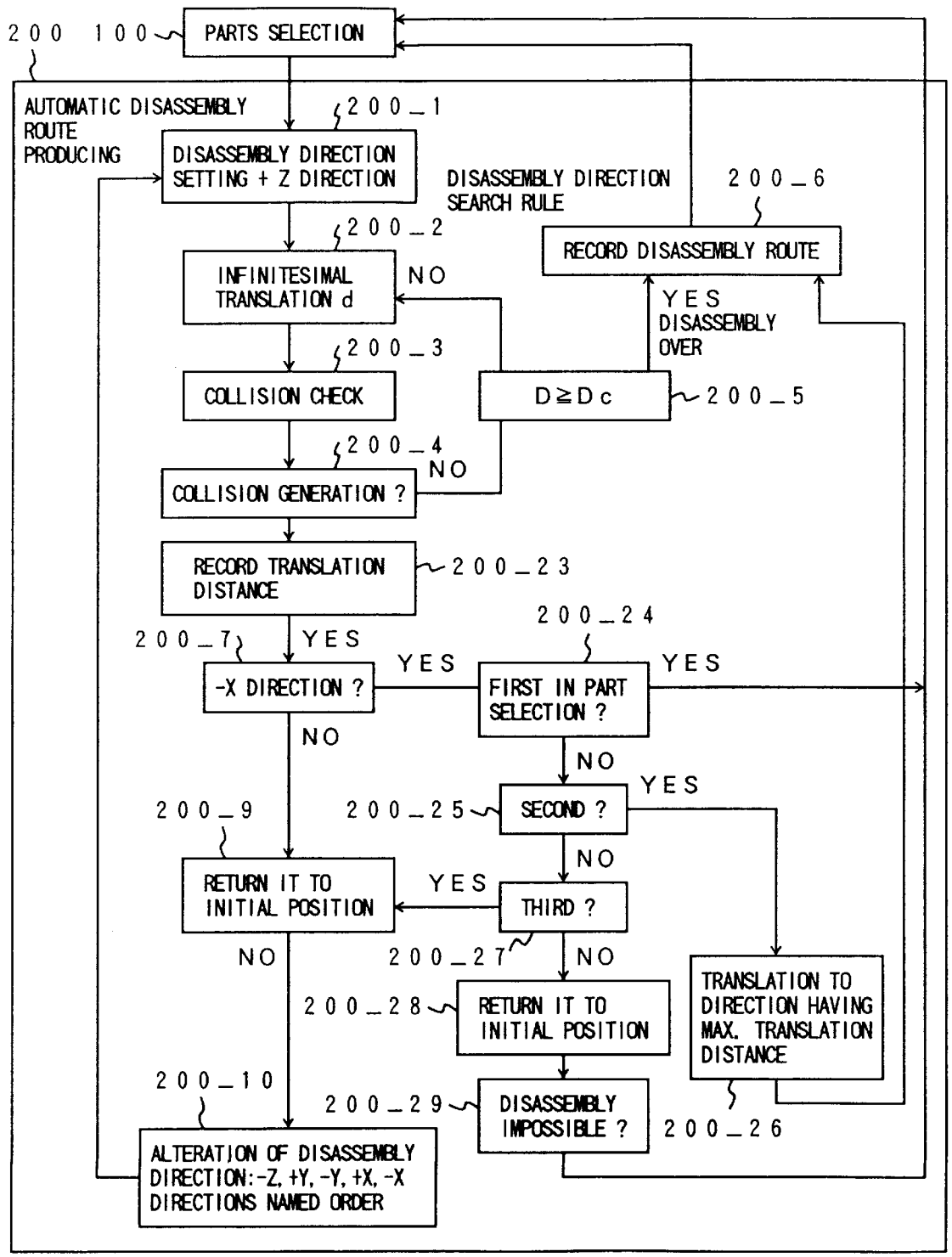
FIG. 55 is a flowchart showing a routine for implementing characteristic structures of an eighteenth assembly route producing apparatus according to an embodiment of the present invention.

FIG. 55 is a flowchart showing a routine for implementing characteristic structures of an eighteenth assembly route producing apparatus according to an embodiment of the present invention, explained referring to FIGS. 53(a), 53(b) and 53(c), and FIGS. 54(a), 54(b) and 54(c). A difference between it and the basic routine shown in FIG. 5 will be described hereinafter.

When a collision occurs in the respective directions (the step 200_4), a translation distance of a part in a search for a disassembly route, which is involved in an occurrence of a collision, is recorded for each disassembly direction (a step 200_23).

When a search for a disassembly route on a certain part is performed in the whole directions, so that the search on the final search direction or the −X direction is completed (the step 200_7), it is determined whether the part of interest is one first selected (a step 200_24), and when it is decided that the part of interest is one first selected, the process goes to a step for selection of the subsequent part.

In this manner, when a search for a disassembly route for the first time is completed for the whole parts, then parts not yet disassembled are sequentially selected through the part selection routine 100.

When one of the parts not yet disassembled is selected and the process again reaches the step 200_24, then since the part selection is not for the first time, the process goes to a step 200_25 in which it is determined whether the part selection is for the second time. When it is decided that the part selection is for the second time, the process goes to a step 200_26 in which the part now selected is translated in a direction having a maximum translation distance of the translation distances as to the six directions on the associated part, which have been stored in the step 200_23, by the maximum translation distance, and then the process goes to the step 200_6 in which it is recorded that the part is translated by the maximum translation distance, and then the process goes to the step for selection of the subsequent part. In this manner, when a certain part(s) (for example, parts 1 and 2 in FIG. 52 to FIGS. 54(a), 54(b) and 54(c)) is translated by the maximum translation distance, if a disassembly route for another part (for example, part 3 in FIG. 52 to FIGS. 54(a), 54(b) and 54(c)) is detected (the step 200_5), the disassembly route for the part disassembled is recorded (the step 200_6).

On the other hand, if a disassembly route is not yet detected and the process reaches again the step 200_24, then the process goes to a step 200_25 in which it is decided that the part selection is not for the second time, and further goes to a step 200_27 in which it is decided that the part selection is for the third time, and then the process goes to the step 200_9 in which in the event that of the parts not yet disassembled in the previous processes, parts associated with the state that they were translated from the initial position exist, all of those parts are returned to the initial position. With respect to all of the parts not yet disassembled, in the step 200_10, a search for a disassembly route is again conducted on those parts, while the disassembly directions including the +Z direction are sequentially set up. When anyone of the parts associated with the four time in the part selection occurs (the step 200_27), the process goes to a step 200_28 in which in the event that parts associated with the state that they were translated from the initial position exist, all of those parts are returned to the initial position, and it is informed the system that all of the parts not yet disassembled are impossible in a disassembly (a step 200_29).

With respect to the subsequent search for a disassembly route, it is possible to adopt another scheme, for example, the above-mentioned subassembling scheme and the like.

FIG. 56 and FIG. 57 are views each showing the manner in which a disassembly of parts is possible or impossible.

FIG. 56 shows an example in which parts 1, 2 and 3 cannot be disassembled through the part selection for the first time, and parts 4, 5 . . . can be disassembled through the part selection for the first time. Through the part selection for the second time, the parts 1 and 2 are each translated in a direction involved in a permitted maximum translation distance by the maximum distance, so that the part 3 can be disassembled. Through the part selection for the third time, the parts 1 and 2 are returned to the initial position, so that the parts 1 and 2 can be disassembled.

FIG. 57 shows an example in which parts 1, 2, 3 and 4 cannot be disassembled through the part selection for the first time, and parts 5 et seqq. can be disassembled through the part selection for the first time; through the part selection for the second time, the parts 1 and 2 are each translated in a direction involved in a permitted maximum translation distance by the maximum distance, so that the part 3 can be disassembled, but the part 4 is remained being not disassembled; and through the part selection for the third time, the parts 1 and 2 are returned to the initial position so that the search for a disassembly route is conducted again, but the parts 1 and 2 cannot be disassembled and the part 4 is still remained being not disassembled. As shown in the example of FIG. 57, when the parts impossible in a disassembly even with the routine of FIG. 55 are remained, another scheme such as the above-mentioned subassembling scheme and the like is tried thereafter.

According to the present embodiment as mentioned above, coordinated movements of a plurality of parts are permitted. This feature makes it possible to enhance a possibility that a disassembly route can be detected through the automatic disassembly route search and thus to apply the scheme of the automatic disassembly route search to the general complicated parts.

Next, there will be explained aspects of a nineteenth assembly route producing apparatus according to an embodiment of the present invention.

Figure 58:
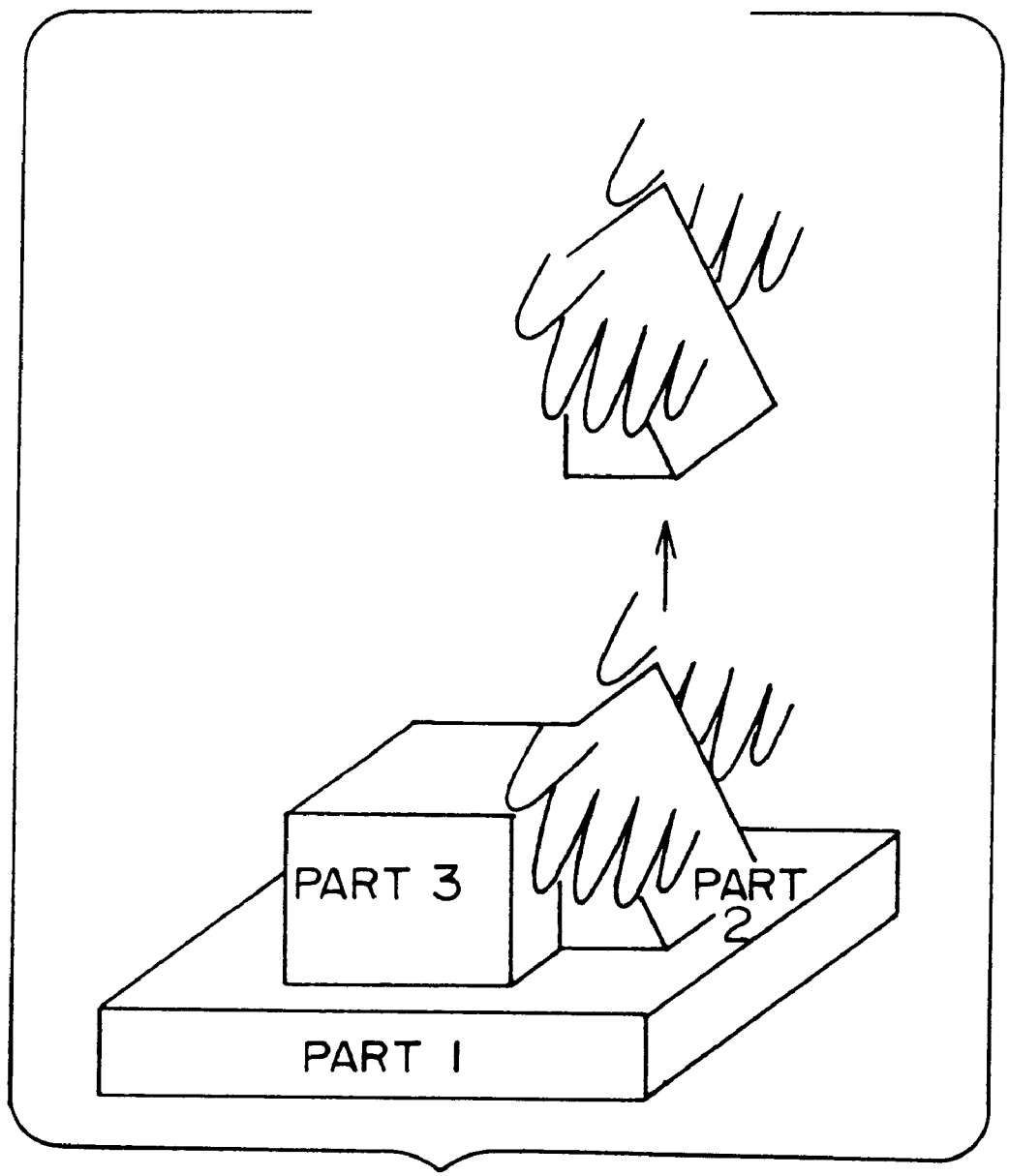
FIG. 58 is an explanatory view useful for understanding characteristic portions of a nineteenth assembly route producing apparatus according to an embodiment of the present invention.

FIG. 58 is an explanatory view useful for understanding characteristic portions of a nineteenth assembly route producing apparatus according to an embodiment of the present invention.

According to the above-mentioned embodiments, only parts (including a subassembly) constituting the product is addressed as an object of a search for a disassembly route. It is desired, however, during the actual disassembly and assembly, to investigate whether person's hands, tools for the disassembly and assembly and the like as well as parts to be disassembled and assembled do not collide with other parts.

In view of the foregoing, a search for a disassembly route is conducted, as shown in FIG. 58, for example, in the state that a model of 'hand' is appended to a part, regarding the model of 'hand' and a part grasped by the 'hand' as a unitary part. This feature makes it possible to search routes easy for a disassembly and an assembly.

Figure 59:
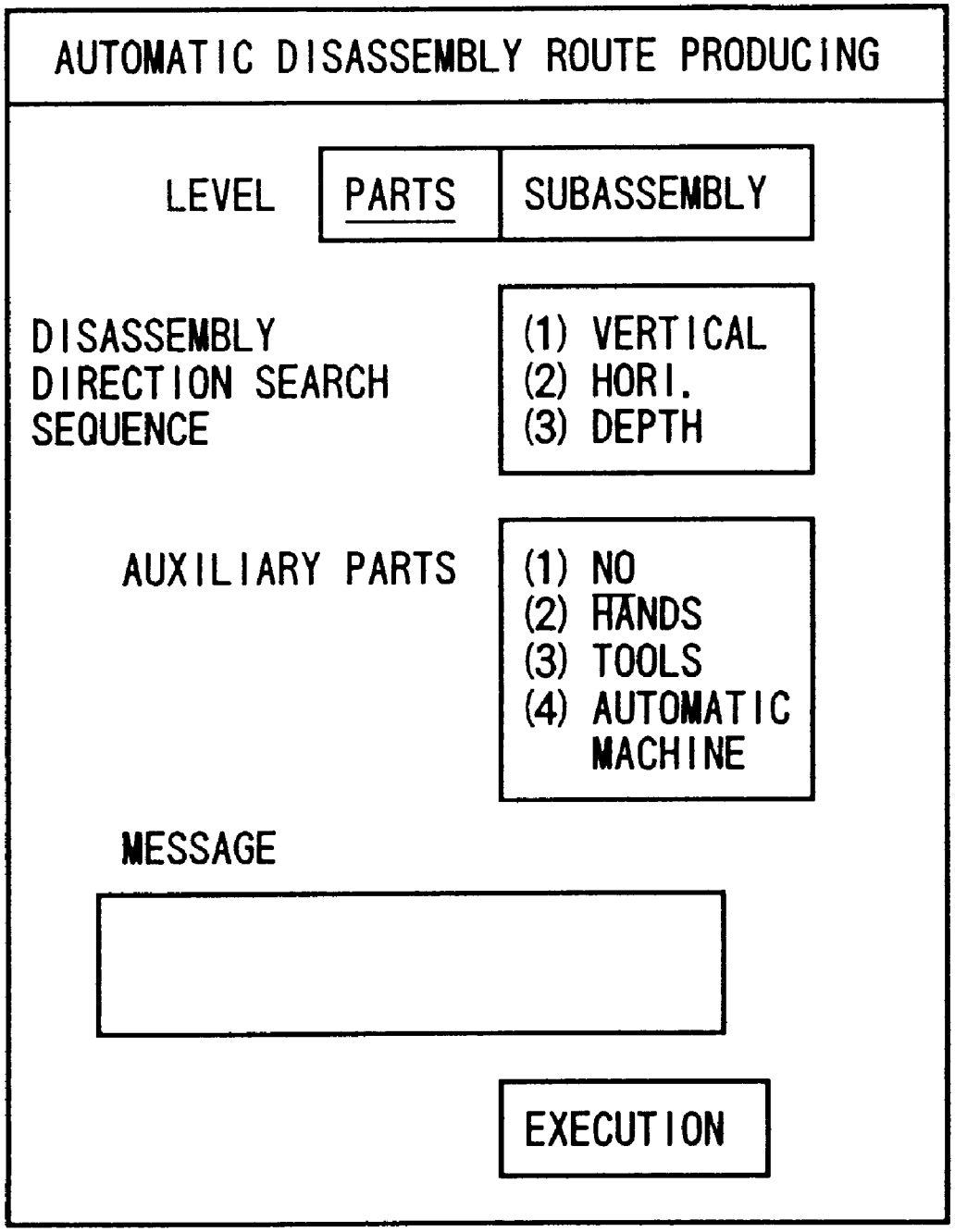
FIG. 59 is a view showing an example of a screen of an automatic disassembly route producing set up menu to implement characteristic structures of the nineteenth assembly route producing apparatus according to an embodiment of the present invention.

FIG. 59 is a view showing an example of a screen of an automatic disassembly route producing set up menu to implement characteristic structures of the nineteenth assembly route producing apparatus according to an embodiment of the present invention.

The screen of an automatic disassembly route producing set up menu shown in FIG. 59 includes, as compared with the screen of an automatic disassembly route producing set up menu shown in FIG. 7, additionally a menu for auxiliary parts.

In the menu for the auxiliary parts, there are prepared items of no auxiliary part, hands, tools and automatic machines. As the default value, the no auxiliary part is designated. With respect to models of the hands, the tools and the automatic machines, they have been specially prepared. To designate the auxiliary parts, the mouse 103 shown in FIG. 2 is used to click the auxiliary parts to be designated on the screen of an automatic disassembly route producing set up menu shown in FIG. 59.

Figure 60:
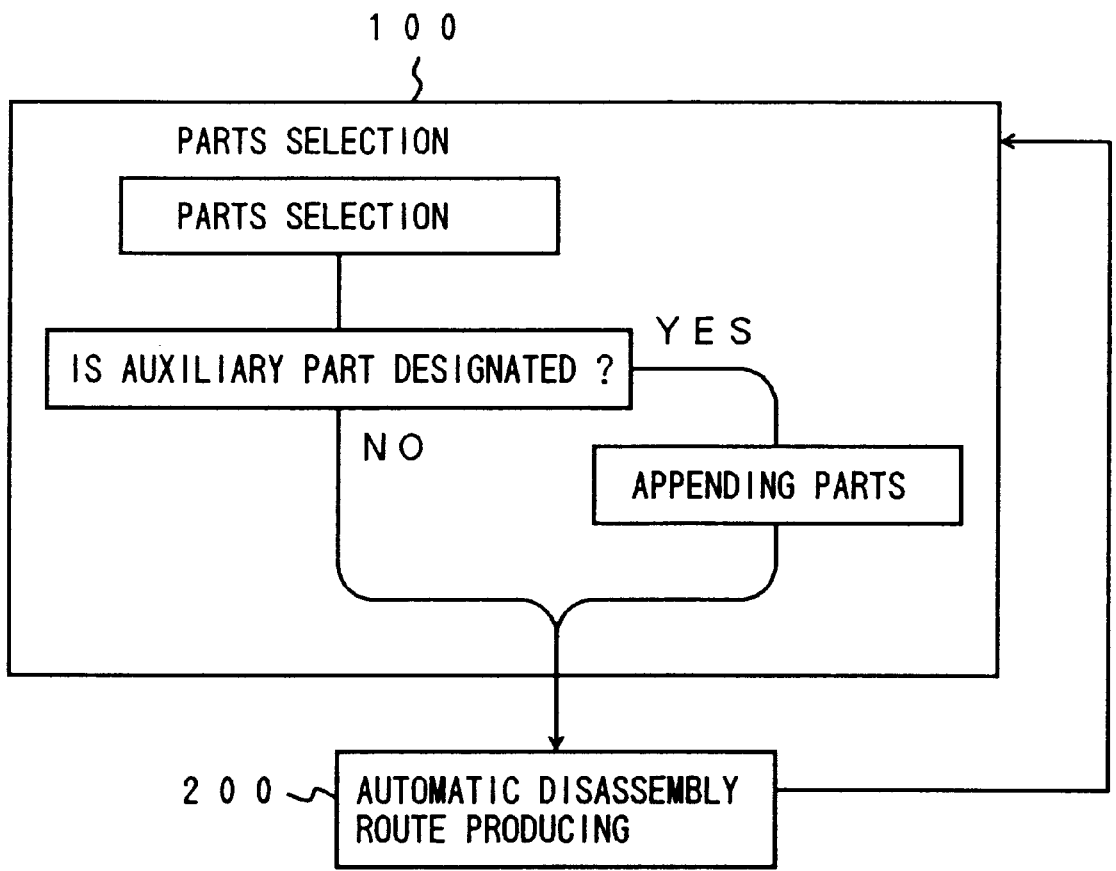
FIG. 60 is a flowchart of a part selection routine showing characteristic portions of the nineteenth assembly route producing apparatus according to an embodiment of the present invention.

FIG. 60 is a flowchart of a part selection routine showing characteristic portions of the nineteenth assembly route producing apparatus according to an embodiment of the present invention.

In the part selection routine 100, first, a part is selected in accordance with a predetermined algorithm, and then it is determined whether an auxiliary part is designated. When it is decided that the auxiliary part is designated, the auxiliary part thus designated is appended to the selected part. In the automatic disassembly route producing routine 200, a search for a disassembly route is conducted regarding the selected part and the auxiliary part as a unitary part.

According to the present embodiment, there is shown an example in which when an auxiliary part is appended to the selected part, the same auxiliary part is appended to all parts constituting a product. However, it is acceptable that a different auxiliary part, including no auxiliary part, is appended to each of the parts. Further, according to the present embodiment, when an auxiliary part is appended, the auxiliary part is appended directly to conduct a search for a disassembly route. However, it is acceptable that even when an auxiliary part is appended, first, a search for a disassembly route is conducted with appending no auxiliary part, and as a result, when the part can be disassembled, then the auxiliary part is appended, and it is investigated whether the part can be disassembled.

Next, there will be explained aspects of a twentieth assembly route producing apparatus according to an embodiment of the present invention.

Figure 61A:
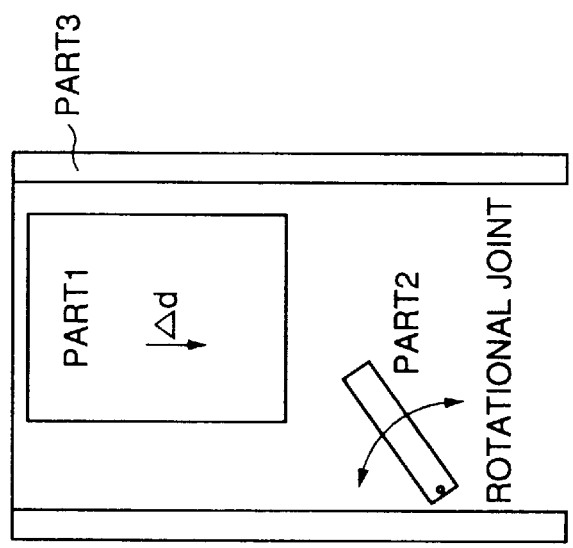
FIGS. 61(*a*), 61(*b*) and 61(*c*) are explanatory views useful for understanding characteristic portions of a twentieth assembly route producing apparatus according to an embodiment of the present invention.
Figure 61B:
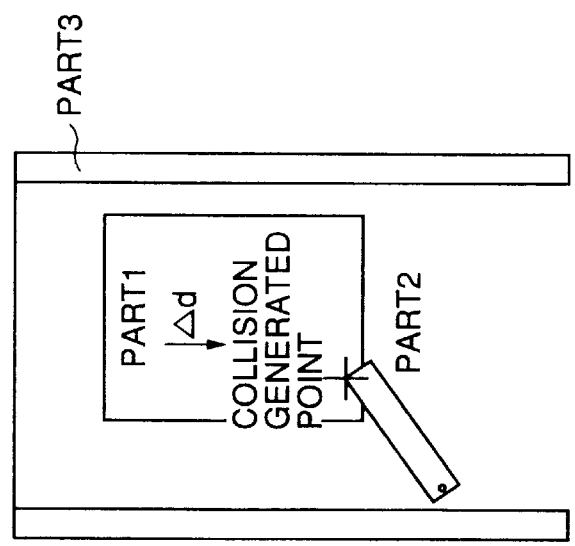
Figure 61C:
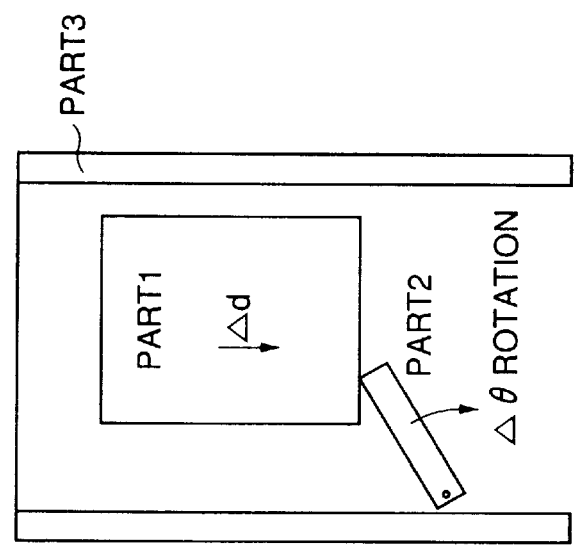

FIGS. 61(*a*), 61(*b*) and 61(*c*) are explanatory views useful for understanding characteristic portions of a twentieth assembly route producing apparatus according to an embodiment of the present invention.

According to the present embodiment, a part 1 and a part 2 are disposed inside a part 3, and the part 2 has a rotational joint and is rotatable in a direction of a arrow shown in FIG. 61(*a*).

In this condition, let us consider that the part 1 is taken out from the part 3.

First, as shown in FIG. 61(*a*), a collision check is conducted by means of translating the part 1 downward by an infinitesimal distance Δd one by one. And as shown in FIG. 61(*b*), when the part 1 and the part 2 collide with each other, the part 2 rotates in synchronism with the translation of the part 1, as shown in FIG. 61(*c*).

Figure 62:
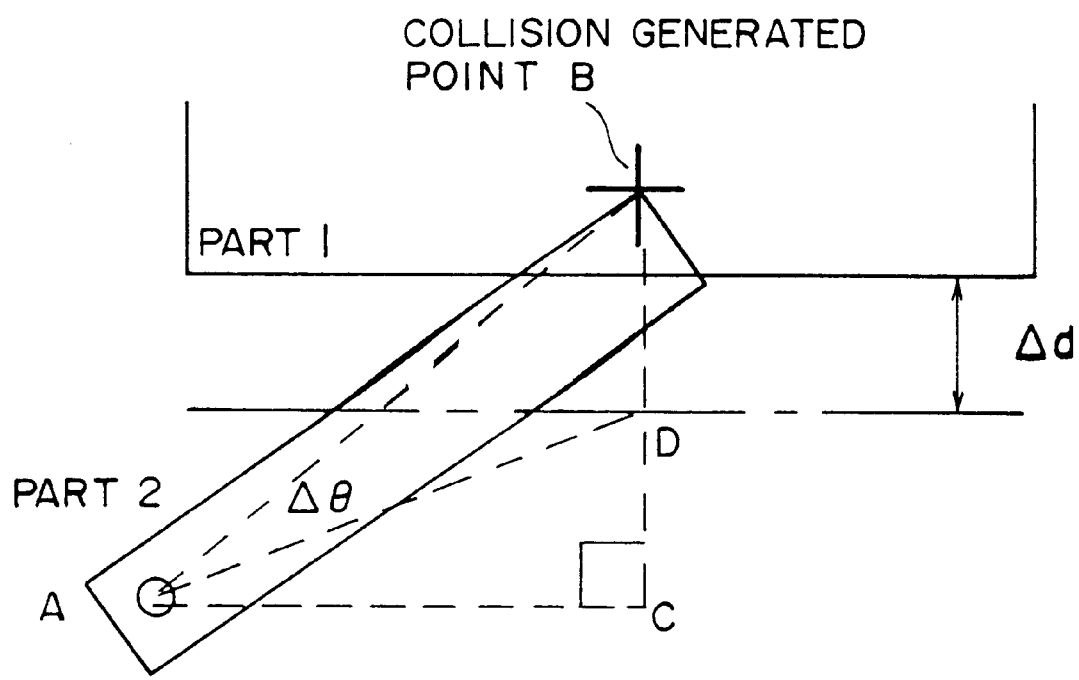
FIG. 62 is an explanatory view useful for understanding an algorithm for an amount of rotation of a movable part having a rotational joint.

FIG. 62 is an explanatory view useful for understanding an algorithm for an amount Δθ of rotation of the part 2 having the rotational joint.

It is assumed that the part 1 is translated the infinitesimal distance Δd by Δd, and the first collision of the part 1 with the part 2 occurs in the state shown in FIG. 62. At that time, one of the points of the part 2 collided with the part 1 is selected as a collision generating point. In FIG. 62, while a top of the part 2 is selected as a collision generating point B, it is indistinct as to what point is selected as a collision generating point from among a number of points which collide with the part 1. When the collision generating point B is selected, a cross point C of a perpendicular line extending from the collision generating point B in a direction of an outward normal vector of the polygon involved in an occurrence of a collision, of the part 1, and a plane running parallel to the face of the polygon involved in an occurrence of a collision, of the part 1, the plane passing through the rotation center A of the part 2, is determined, and in addition a cross point D of the surface of the part 1 wherein the part 1 is further translated by the infinitesimal distance Δd, and the above perpendicular line is determined, and the angle Δθ is determined by $$\Delta\theta = \angle CAB - \angle CAD$$

Next, the part 2 is rotated by the angle Δθ, so that the translation of the part 1 and the rotation of the part 2 are simultaneously performed (cf. FIG. 31(*b*) and the associated description). In this manner, the translation of the part 1 and the rotation of the part 2 are simultaneously performed on the graphics screen.

According to the present embodiment, when a part in a search for a disassembly route collides with a movable part having a rotational joint, the movable part moves within a movable limit together with the part. This feature makes it possible to extend an applying limit of the automatic disassembly route producing routine.

Figure 63:
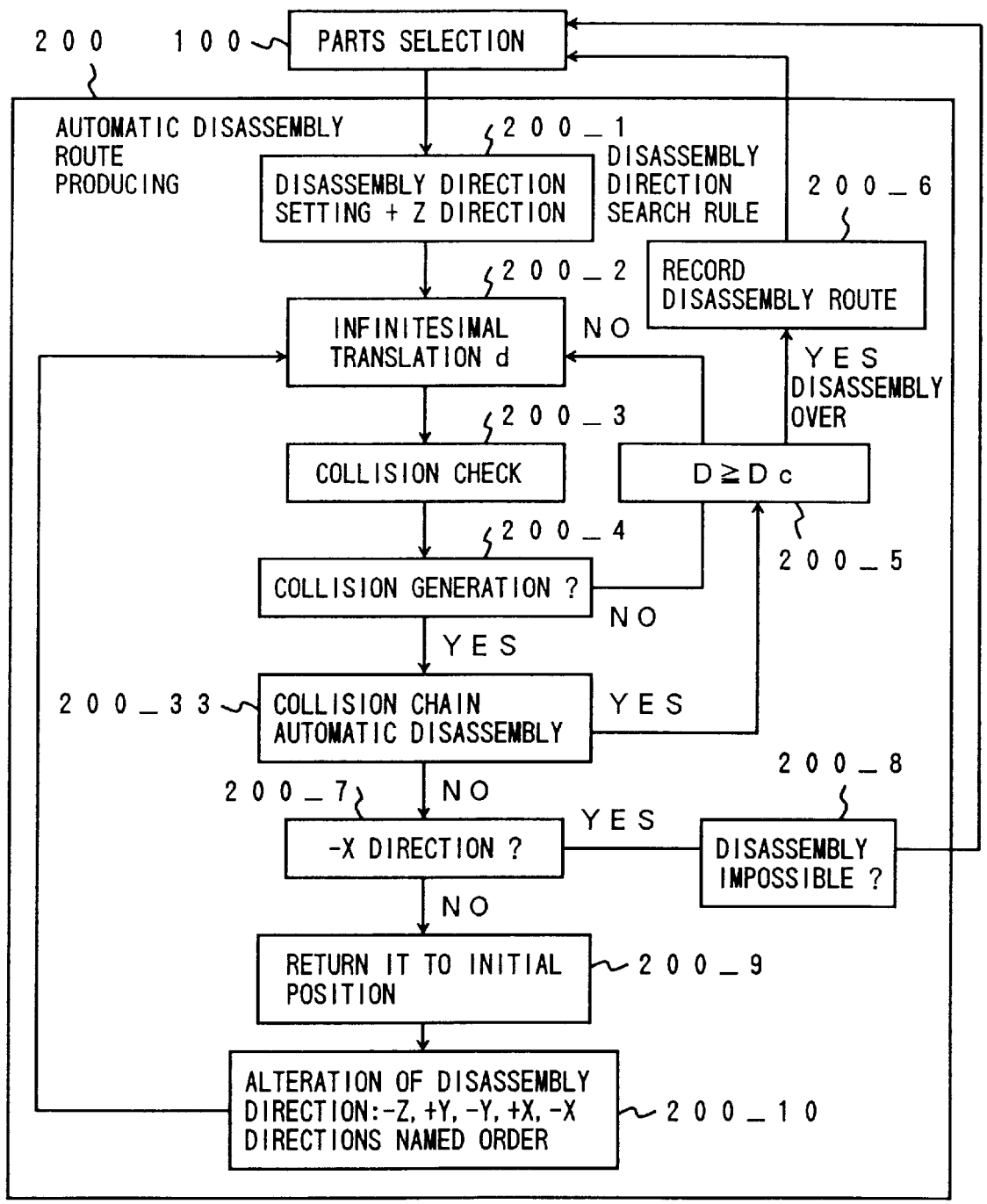
FIG. 63 is a flowchart showing a routine for implementing characteristic structures of a twentieth assembly route producing apparatus according to an embodiment of the present invention.

FIG. 63 is a flowchart showing a routine for implementing characteristic structures of a twentieth assembly route producing apparatus according to an embodiment of the present invention, explained referring to FIGS. 61(*a*), 61(*b*) and 61(*c*), and FIG. 62. A difference between it and the basic routine shown in FIG. 5 will be described hereinafter.

The automatic disassembly route producing routine shown in FIG. 63 includes, as compared with the basic routine shown in FIG. 5, additionally a step 200_33 for a collision chain automatic disassembly routine, forming a subroutine.

Figure 64:
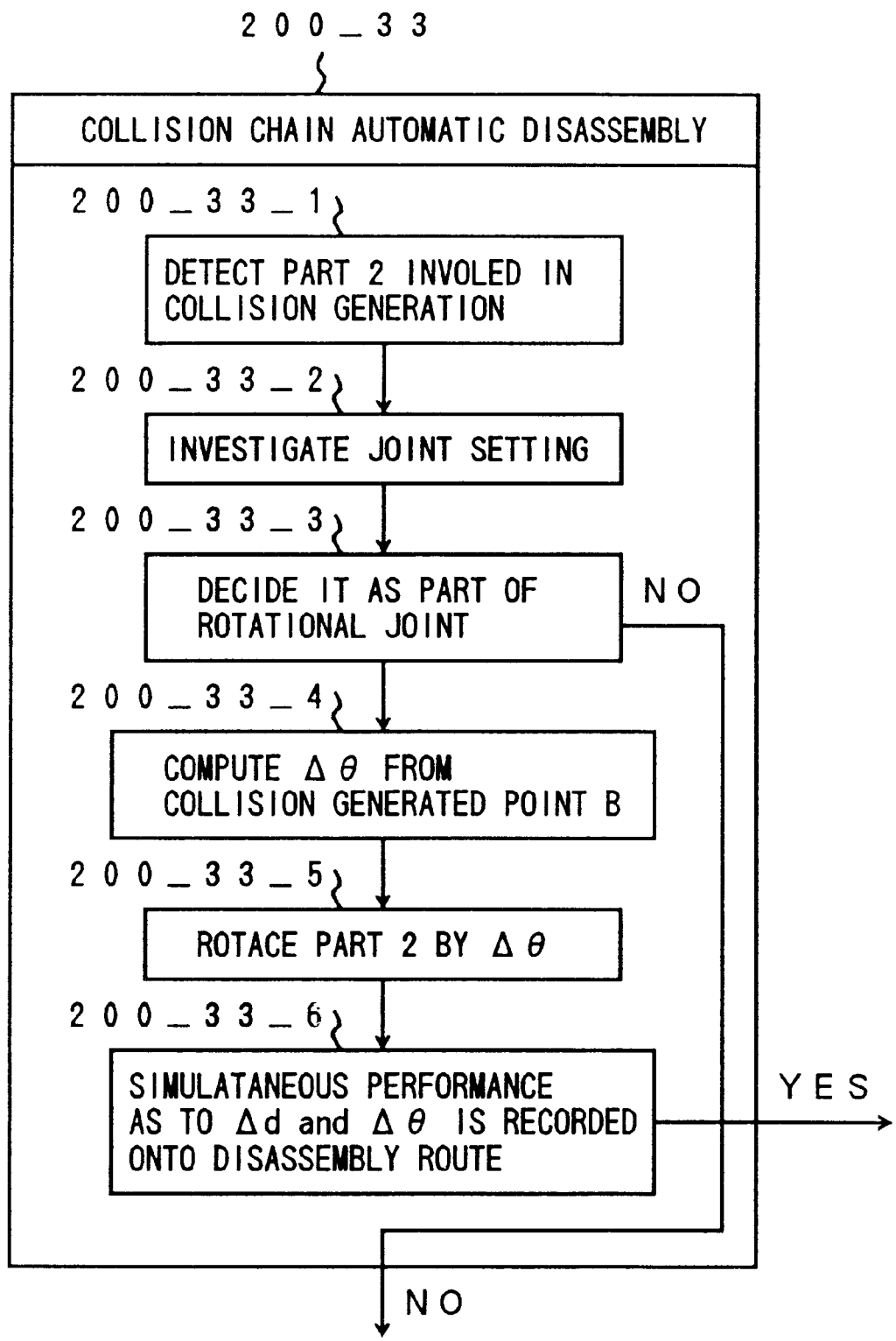
FIG. 64 is a flowchart of a collision chain automatic disassembly routine.

FIG. 64 is a flowchart of the collision chain automatic disassembly routine shown in FIG. 63.

Here, as shown in FIG. 61 and FIG. 62, the part in a disassembly is addressed as the part 1.

In the collision chain automatic disassembly routine shown in FIG. 64, first, in a step 200_33_1, when a collision generates during a search for a disassembly route of the part 1, it is investigated as to what part the part 1 collides with. Here, the part involved in a generation of a collision is addressed as a part 2. Next, in a step 200_33_2, information defining the part 2 is referred to to investigate whether a joint is set up to the part 2. In the present embodiment, of joints only a rotational joint is an object. In a step 200_33_3, in the event that a joint is set up to the part 2, it is investigated as to whether the joint is a rotational joint. In the event that no joint is set up to the part 2, or in the event that a joint other than the rotational joint is set up to the part 2 even though the joint is set up, the process passes through the automatic disassembly route producing routine 200_33.

When a rotational joint is set up to the part 2, the process goes to a step 200_33_4 in which an angle Δθ of rotation of the part 2 is detected in accordance with the above-mentioned algorithm, and the part 2 is rotated by the angle Δθ (a step 200_33_5). In step 200_33_6, it is recorded onto a disassembly route that the translation of the part 1 by the infinitesimal distance Δd and the rotation of the part 2 by the angle Δθ of rotation of the part 2 are simultaneously performed.

According to the scheme explained referring to FIGS. 61(a)–(c) to FIG. 64, strictly speaking, it is difficult to maintain the state that the parts 1 and 2 are in contact with each other, and it would bring about such a state that a part of the part 2 enters the part 1. In view of such a situation, there will be explained a scheme of always causing collision points of the two parts to coincide with one another.

FIGS. 65(a), 65(b), 65(c) and 65(d) are explanatory views useful for understanding an algorithm for translating and rotating two parts so that collision points of the two parts coincide with one another.

Figure 65A:
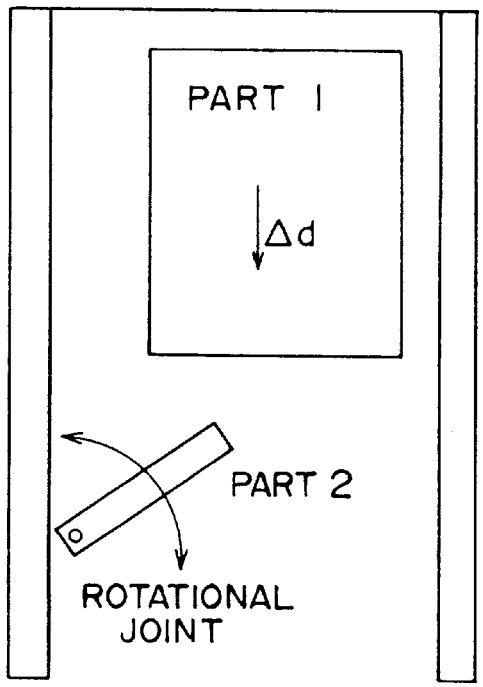
FIGS. 65(*a*), 65(*b*), 65(*c*) and 65(*d*) are explanatory views useful for understanding an algorithm for translating and rotating two parts so that collision points of the two parts coincide with one another.
Figure 65B:
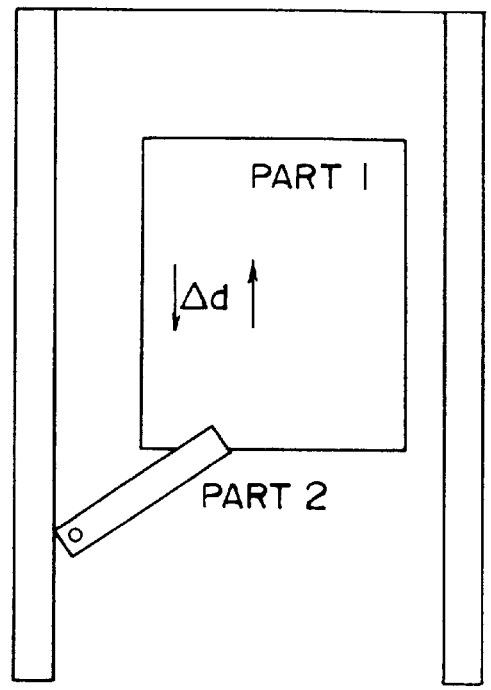
Figure 65C:
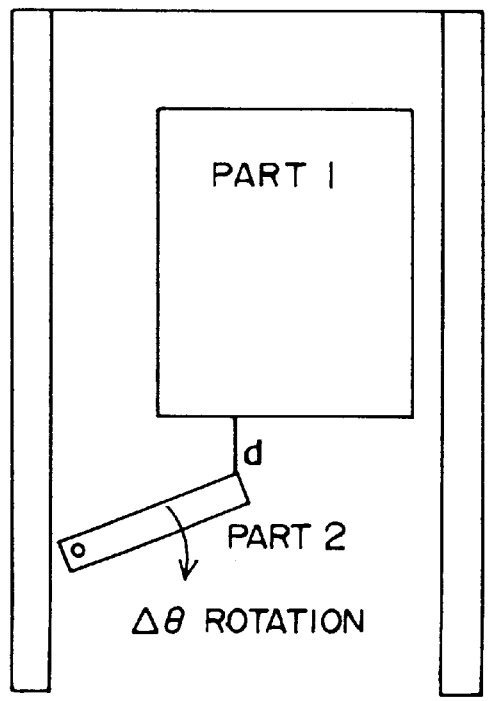
Figure 65D:
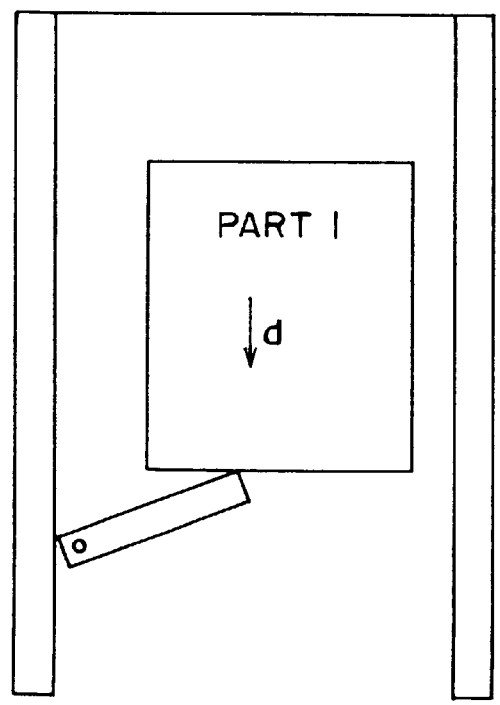

Starting from the state of FIG. 65(a), when a collision occurs as shown in FIG. 65(b), a part 1 is put back by one step in the opposite direction to the coming direction. Next, as shown in FIG. 65(c), the part 2 is rotated by a predetermined angle, for example, 10=and the closest distance d̲ between the part 2 after the rotation and the part 1 in the state that it put back by one step is detected, the part 1 is translated by the closest distance d̲ in the progressive direction. Thus, the part 1 and the part 2 are permitted to translate and rotate, respectively in the condition that they are always in contact with each other.

Figure 66:
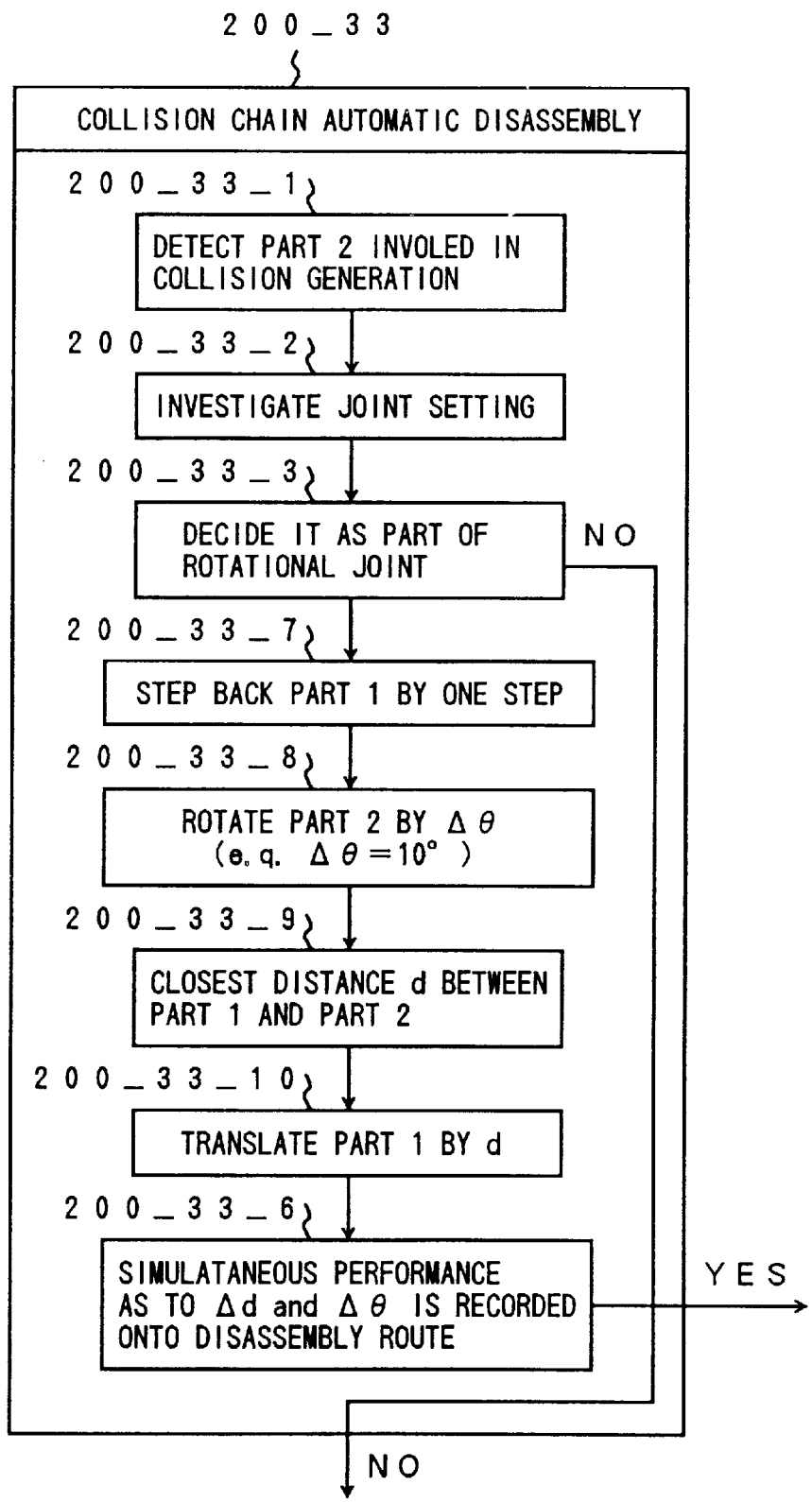
FIG. 66 is a flowchart of a collision chain automatic disassembly routine.

FIG. 66 is a flowchart of a collision chain automatic disassembly routine to implement the algorithm explained referring to FIGS. 65(a), 65(b), 65(c) and 65(d).

The whole of the automatic disassembly route producing routine 200 shown in FIG. 63 is applicable to the present routine. With respect to the step 200__33 for a collision chain automatic disassembly routine, the collision chain automatic disassembly routine shown in FIG. 64 may be replaced by the collision chain automatic disassembly routine shown in FIG. 66.

In the collision chain automatic disassembly routine shown in FIG. 66, first, in a similar fashion to that of the collision chain automatic disassembly routine shown in FIG. 64, a part involved in a generation of a collision is investigated (a step 200__33__1). Here, the part involved in a generation of a collision is addressed as a part 2. Next, in a step 200__33__2, it is investigated whether a joint is set up to the part 2. In a step 200__33__3, in the event that a joint is set up to the part 2, it is investigated as to whether the joint is a rotational joint. In the event that no joint is set up to the part 2, or in the event that a joint other than the rotational joint is set up to the part 2 even though the joint is set up, the process passes through the automatic disassembly route producing routine 200__33.

When a rotational joint is set up to the part 2, the process goes to a step 200__33__7 in which a part 1 in a search for a disassembly route is put back by one step (Δd) in the opposite direction to the coming direction. In step 200__33__8, the part 2 is rotated by a predetermined angle Δθ (for example, Δθ=10=). In step 200__33__9, the closest distance d̲ between the part 2 after the rotation and the part 1 in the state that it put back by one step is detected. In step 200__33__10, the part 1 is translated by the closest distance d̲ in the progressive direction. In step 200__33__6, it is recorded onto a disassembly route that the translation of the part 1 by the distance (d) and the rotation of the part 2 by the angle (Δθ) of rotation of the part 2 are simultaneously performed.

In this manner, the part 1 and the part 2, which are involved in the collision with each other, are simultaneously translated and rotated in the state that they are always in contact with each other.

According to the present embodiment, when a part in a search for a disassembly route collides with a part having a rotational joint, those two parts are simultaneously moved. This feature makes it possible to expand the limit of the application of the automatic disassembly route producing routine.

Next, there will be explained aspects of a twenty-first assembly route producing apparatus according to an embodiment of the present invention.

Figure 67B:
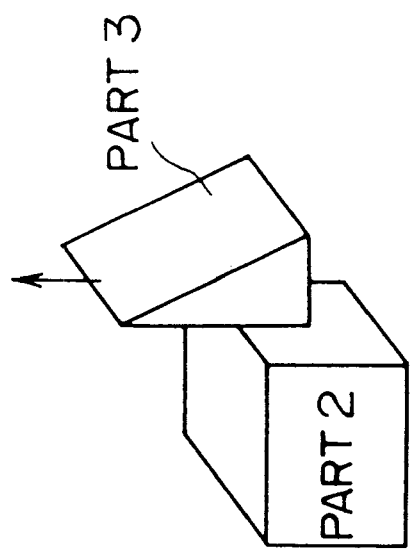
FIGS. 67(*a*) and 67(*b*) are explanatory views useful for understanding characteristic portions of a twenty-first assembly route producing apparatus according to an embodiment of the present invention.
Figure 67A:
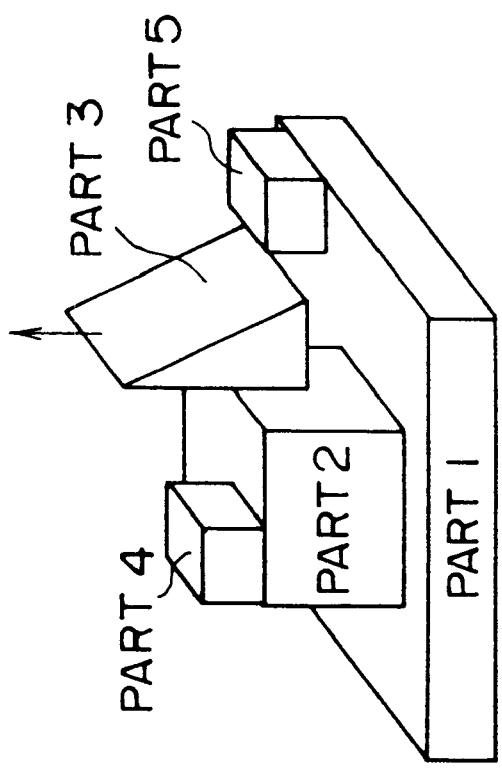

FIGS. 67(a) and 67(b) are explanatory views useful for understanding characteristic portions of a twenty-first assembly route producing apparatus according to an embodiment of the present invention.

In the event that a product consists of a large number of parts or complicated parts, a plotting speed of the graphics will be lowered. This problem will not be satisfactorily solved, even if a high speed operable CPU is used to adopt a graphics plotting-dedicated hardware (graphics accelerator board).

For these reasons, even in the event that a product consists of a number of parts as shown in FIG. 67(a), according to the present embodiment, a graphics plotting is conducted on only a part (part 3) in movement and a part (part 2) closest to the part 3. This feature makes it possible to enhance an operator's attention to the necessary parts, and also to improve the plotting speed since the amount of plotting is reduced.

Figure 68:
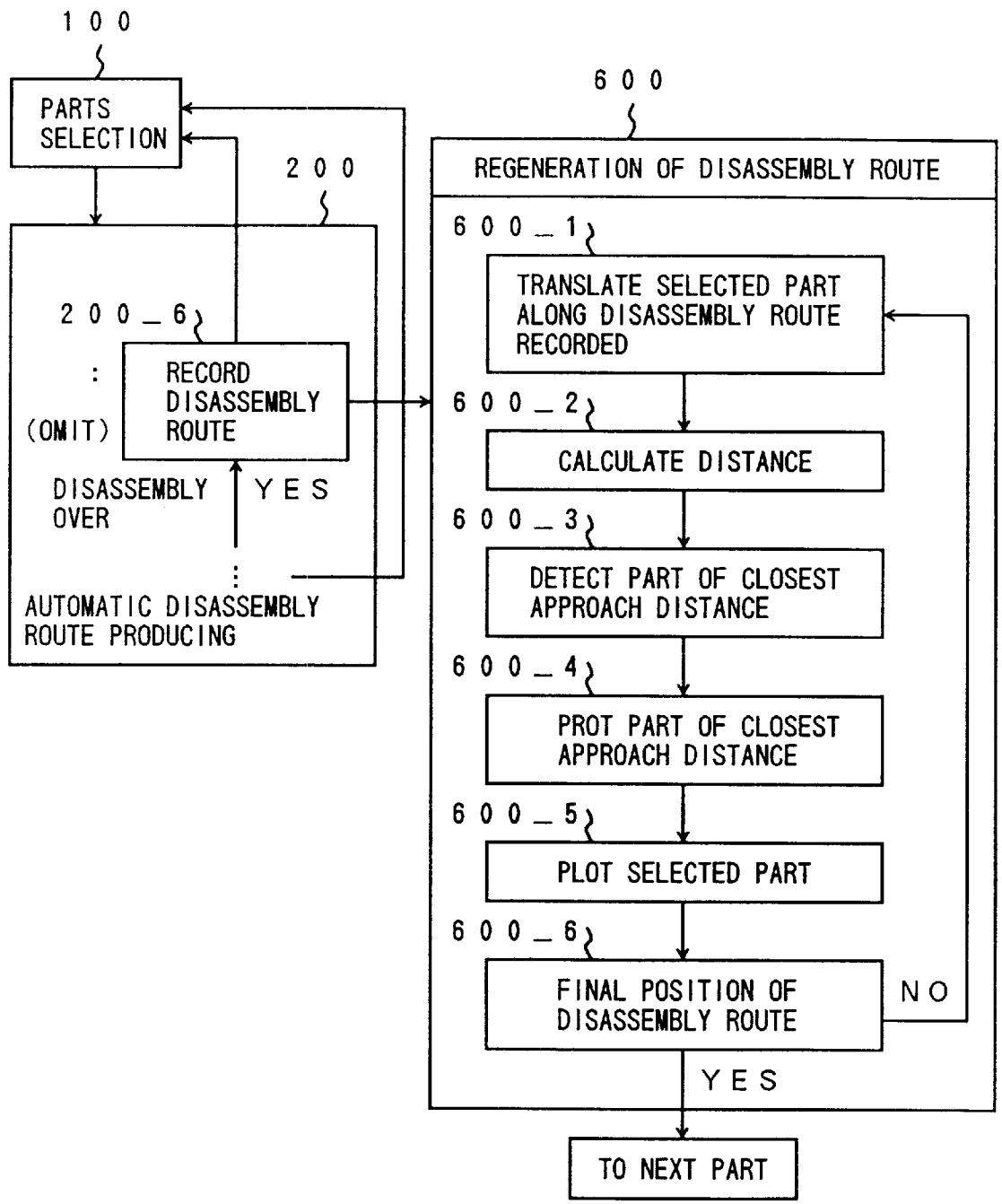
FIG. 68 is a flowchart showing a routine for implementing characteristic structures of a twenty-first assembly route producing apparatus according to an embodiment of the present invention.

FIG. 68 is a flowchart showing a routine for implementing characteristic structures of a twenty-first assembly route producing apparatus according to an embodiment of the present invention, explained referring to FIGS. 67(a) and 67(b).

The routine shown in FIG. 68 relates to a disassembly route regeneration routine for plotting graphics images, which is operable in cooperation with the part selection routine 100 and the automatic disassembly route producing routine 200.

In a disassembly route regeneration routine 600, the disassembly route of a part, which is recorded in the step 200__6 of the automatic disassembly route producing routine 200, is referred to, and images including a part in a disassembly are displayed on a plotting basis.

In a step 600__1, when a part selected for a disassembly route display (a part in a search for a disassembly route is also selected for a disassembly route display, when the disassembly route regeneration routine 600 is operated in cooperation with the automatic disassembly route producing routine 200) is translated along the recorded disassembly route, and a distance between the selected part and another part is detected (a step 600__2). In a step 600__3, a part, which is located at the closest approach distance, is detected. In a step 600__4, the part involved in the closest approach distance thus detected is plotted. In a step 600__5, the selected part is plotted. The above-mentioned processes are repeated until the selected part reaches the final position of the disassembly route (a step 600__6). When the selected part reaches the final position of the disassembly route, the regeneration of the disassembly route for the part now selected is terminated, and the process goes to a regeneration of the disassembly route for the subsequent part, if necessary.

Next, there will be explained aspects of a twenty-second assembly route producing apparatus according to an embodiment of the present invention.

Figure 69:
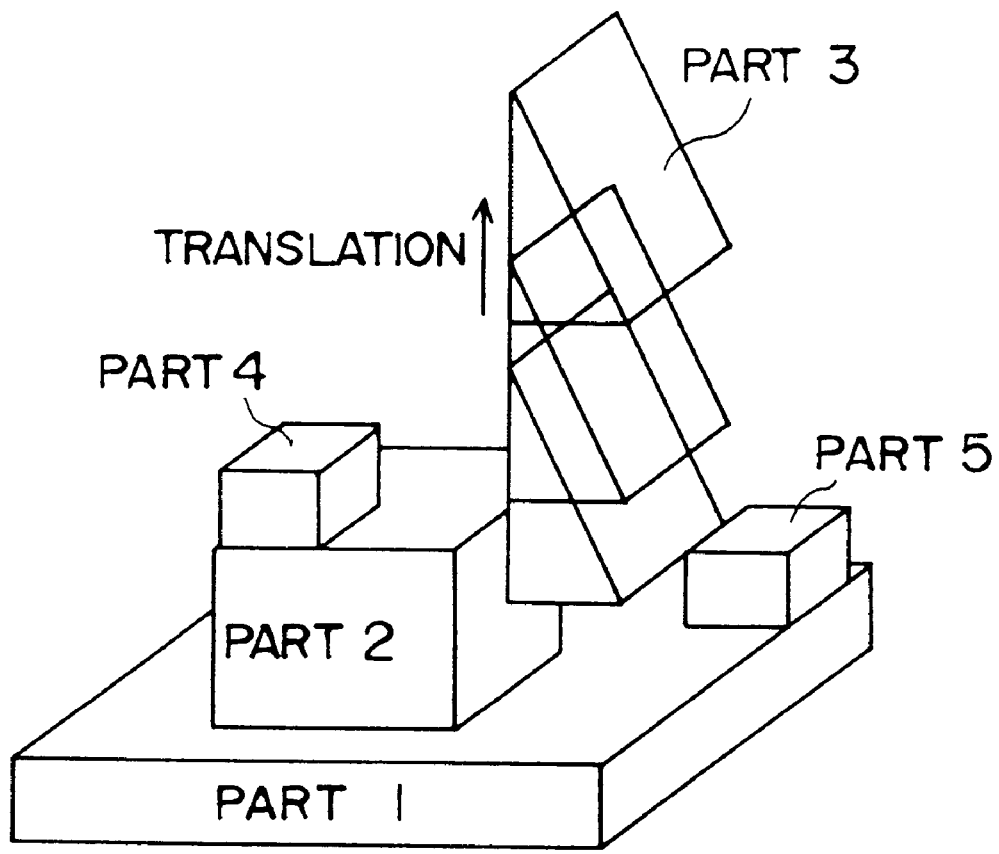
FIG. 69 is an explanatory view useful for understanding characteristic portions of a twenty-second assembly route producing apparatus according to an embodiment of the present invention.

FIG. 69 is an explanatory view useful for understanding characteristic portions of a twenty-second assembly route producing apparatus according to an embodiment of the present invention.

While a disassembly route for a part 3 is displayed, all parts but the part 3 are maintained in display, once they are subjected to plotting, until the part 3 reaches the final position of the disassembly route, and only the part 3 is re-plotted along the path through which the part 3 travels. In this case, a subject to be re-plotted is the traveling part only, and thus it is possible to expect a high speed plotting.

According to the example shown in FIG. 69, the part 3 as well as other parts but the part 3 are plotted on a graphics basis, and the part 3 are re-plotted retaining the display of the previously plotted part 3.

Figure 70:
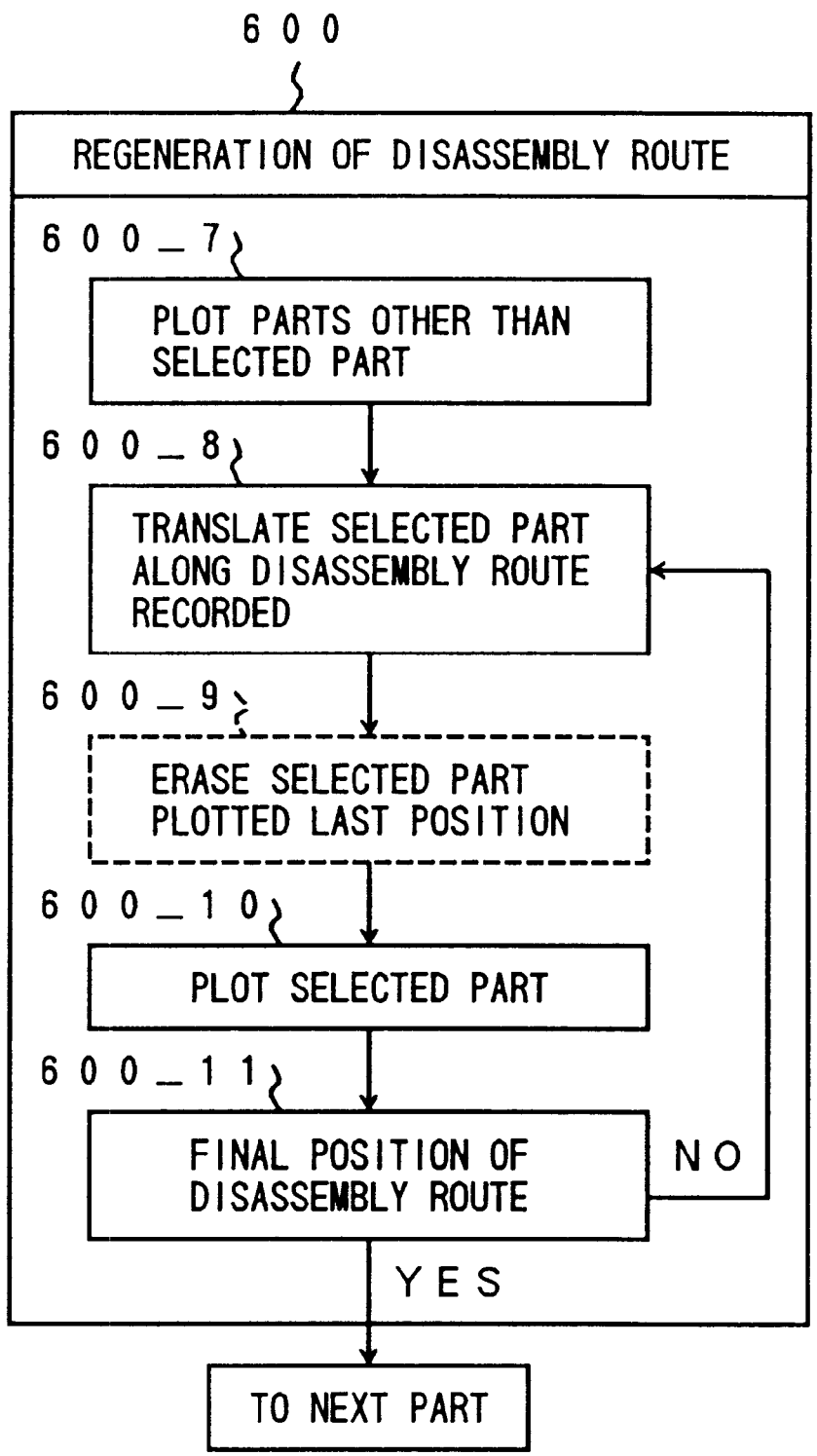
FIG. 70 is a flowchart showing a routine for implementing characteristic structures of a twenty-second assembly route producing apparatus according to an embodiment of the present invention.

FIG. 70 is a flowchart showing a routine for implementing characteristic structures of a twenty-second assembly route producing apparatus according to an embodiment of the present invention, explained referring to FIG. 69. According to the present embodiment, a disassembly route regeneration routine shown in FIG. 70 is substituted for the disassembly route regeneration routine shown in FIG. 68.

In the disassembly route regeneration routine 600 shown in FIG. 70, a part other than the selected part (part 3 in case of FIG. 69) is plotted (a step 600_7), and is translated along the disassembly route in which the selected part is recorded (a step 600_8). A step 600_9 is set up in accordance with modes thereof. In the event that the selected part is once plotted, if there is applied a mode in which the part is to be re-plotted without erasing the once plotted part, the step 600_9 is omitted. On the other hand, if there is applied a mode in which the part is to be re-plotted upon erasing the previous plotting on the selected part in translation, the step 600_9 is inserted. In a step 600_10, the selected part is plotted. The above-mentioned processes are repeated until the selected part reaches the final position of the disassembly route (a step 600_11). When the selected part reaches the final position of the disassembly route, the regeneration of the disassembly route for the part now selected is terminated, and the process goes to the regeneration of the disassembly route for the subsequent part, if necessary.

Figure 71A:
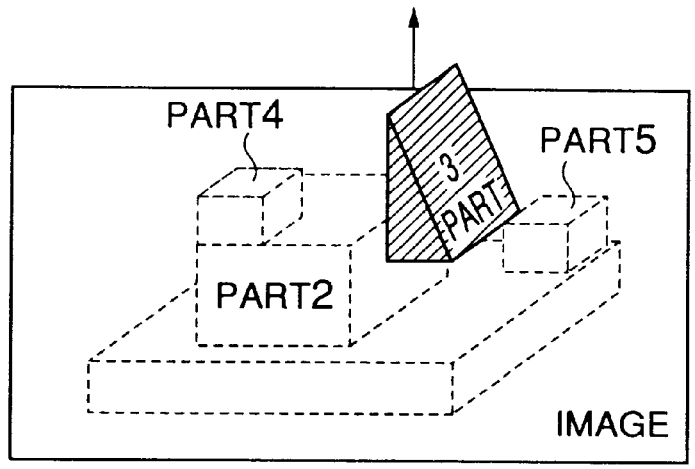
FIGS. 71(*a*) and 71(*b*) are explanatory views useful for understanding an alternative aspect as to characteristic portions of a twenty-second assembly route producing apparatus according to an embodiment of the present invention.
Figure 71B:
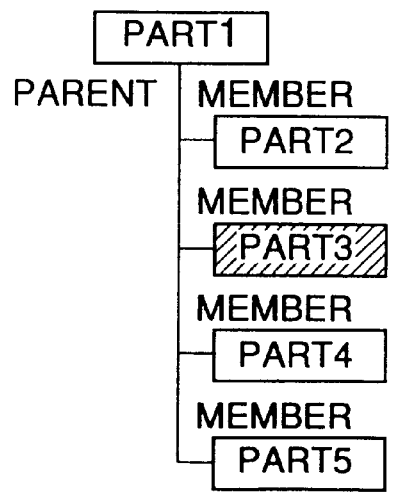

FIGS. 71(*a*) and 71(*b*) are explanatory views useful for understanding an alternative aspect as to characteristic portions of a twenty-second assembly route producing apparatus according to an embodiment of the present invention.

FIG. 71(*a*) shows figures of part 1 to part 5 including part 3 in translation on the display screen, and FIG. 71(*b*) shows a part tree of those parts.

When the mouse 103 shown in FIG. 2 is operated to select a part 3 for a disassembly route from among the parts of the part tree, first, other parts but part 3 are plotted in the form of an image having a pixel value for each pixel, and the image figure is appended onto a board. Only the selected part 3 is plotted on a graphics basis. In this manner, with respect to parts but the selected part, the image figures are kept on being displayed, while only the selected part is repeated in graphics plotting in accordance with the translation. This feature makes it possible to reduce the plotting time. When a part to be translated is to be altered, the part is selected over again on the part tree.

Figure 72:
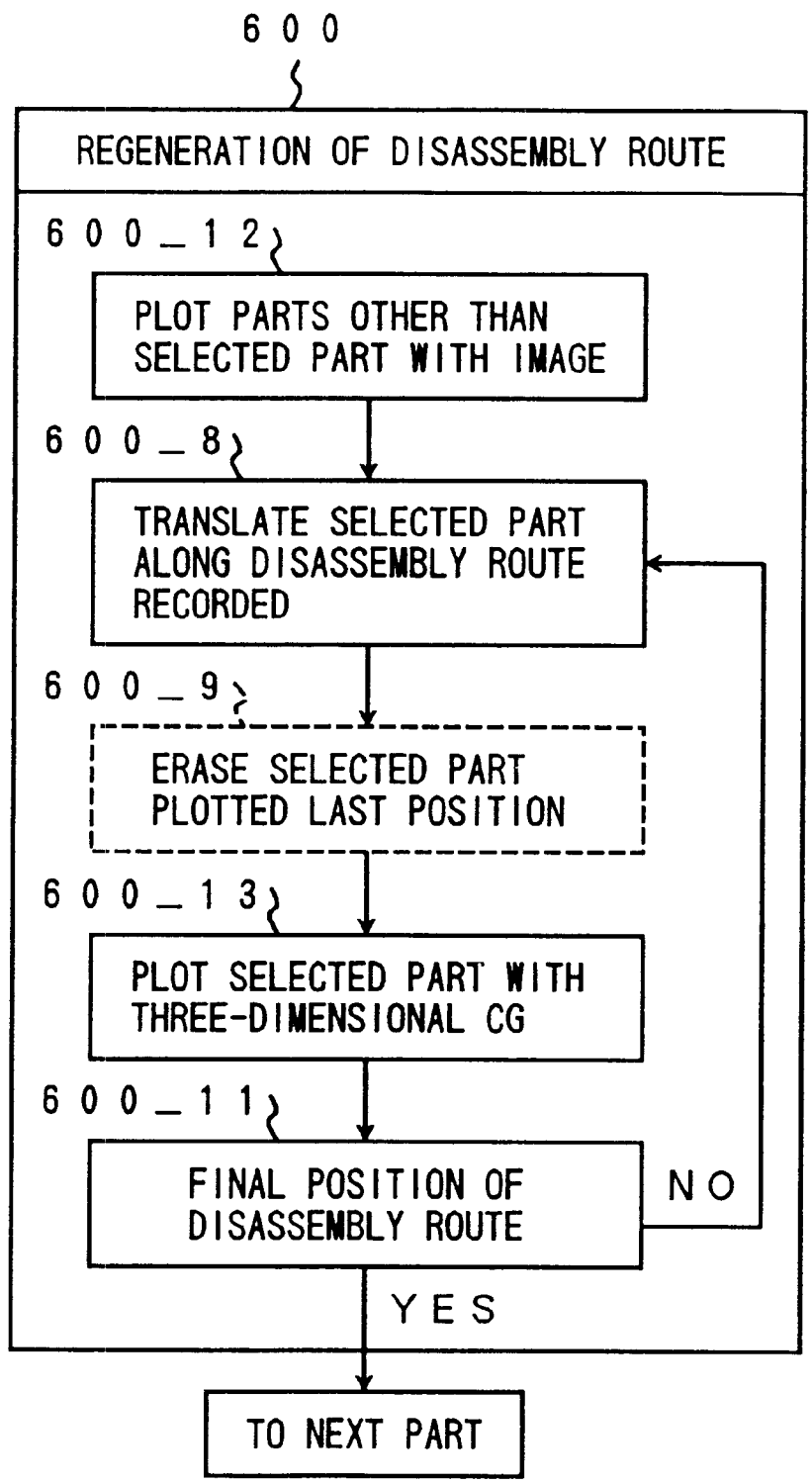
FIG. 72 is a flowchart showing a routine for implementing characteristic structures of a twenty-second assembly route producing apparatus according to an embodiment of the present invention.

FIG. 72 is a flowchart showing a routine for implementing characteristic structures of a twenty-second assembly route producing apparatus according to an embodiment of the present invention, explained referring to FIGS. 71(*a*) and 71(*b*).

A disassembly route regeneration routine shown in FIG. 72 is substituted for the disassembly route regeneration routines shown in FIGS. 68 and 70. The disassembly route regeneration routine shown in FIG. 72 is similar to the disassembly route regeneration routines shown in FIG. 70. Thus, in the FIG. 72, the same parts are denoted by the same reference numbers as those of FIG. 70, and a difference between it and the disassembly route regeneration routine shown in FIG. 70 will be described hereinafter.

In a step 600_12, parts other than the selected part (part 3 in case of the example shown in FIG. 71) are plotted with an image. In a step 600_13, the selected part is plotted or re-plotted with a three-dimensional computer graphics.

By the way, with respect to FIG. 71, while there has been provided such an explanation that the part tree is utilized to select a part on which the associated disassembly route is to be displayed, it is acceptable that a part is selected over again by optionally clicking parts on the screen, by means of practicing a contrivance as set forth below.

Figures 73A, 73B:
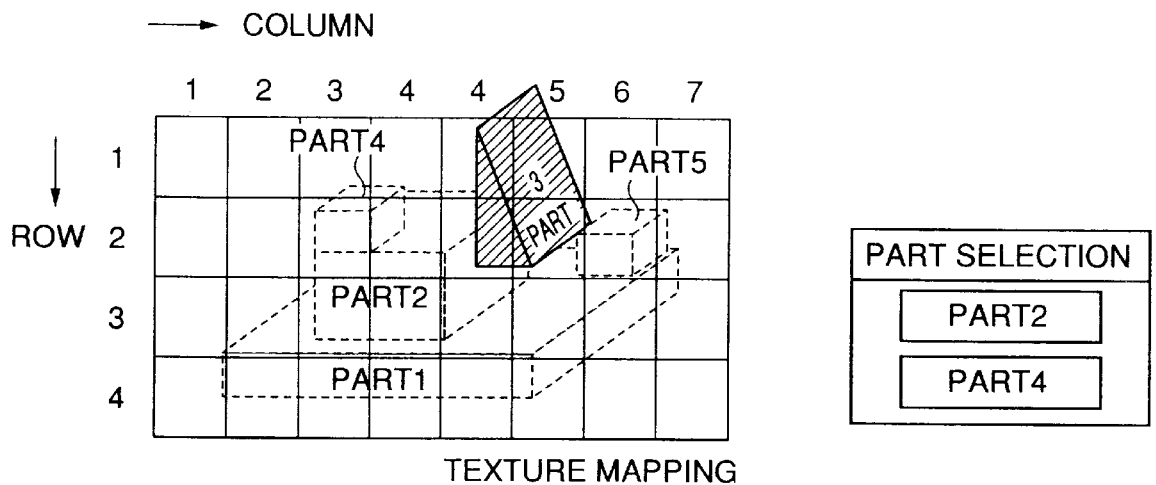
FIGS. 73(*a*) and 73(*b*) are explanatory views useful for understanding a contrivance of doing over again the selection of parts on a screen on which image pictures are plotted.

FIGS. 73(*a*) and 73(*b*) are explanatory views useful for understanding a contrivance of doing over again the selection of parts on a screen on which image pictures are plotted.

To permit other parts to be selected, as shown in FIG. 73(*a*), image pictures are appended to the numerous boards partitioned as a lattice in its entirety, but not appended to a piece of board. At the same time, mapping information indicative of a part to be selected when a board is subjected to the picking by the mouse, is maintained in the form of board information for each board. For example, let us notice the board defined by column 3 and row 4 shown in FIG. 73(*a*). A portion of a part 1 is appended to the noticed board. Information such that the part 1 is selected is appended to this board, so that when this board is subjected to the picking, the part 1 is selected. Likely, a part 4 is allotted to the board defined by column 3 and row 1. When the part 1 is selected so that the disassembly route for the part 1 is displayed while the disassembly route for the part 3 is displayed or after it is terminated, it is effective that for example, the board defined by column 3 and row 4 is clicked. Then, other parts but the part 1 are plotted with images, while only the part 1 is plotted with three-dimensional computer graphics. When other parts but the part 1 are plotted with images, the image pictures are appended to the numerous boards in its entirety, and information of the selected part is allotted to the respective board.

In the state show in FIG. 73(*a*), for example, allotted to the board of column 3 and row 2 are a plurality of parts, or the part 2 and the part 4. In such a case, when a plurality of parts are allotted to a single board and the board is clicked, it is effective that as shown in FIG. 73(*b*), a list of the plurality of parts allotted to the clicked board is displayed, and a desired part is selected from among the displayed plurality of parts. Alternatively, it is acceptable that fine boards are provided in such a way that a single part is always allocated to a single board.

Next, there will be explained aspects of a twenty-third assembly route producing apparatus according to an embodiment of the present invention.

Figure 74:
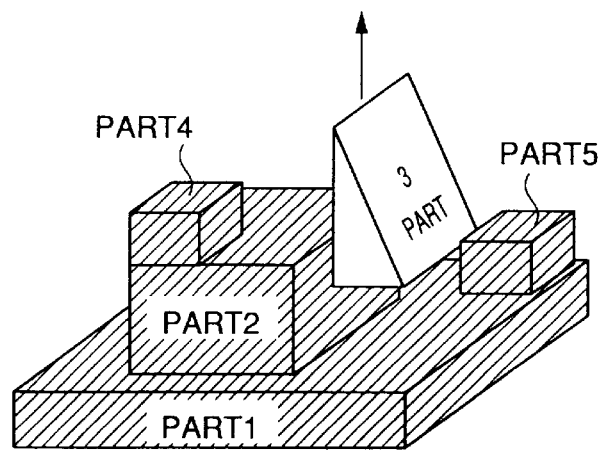
FIG. 74 is an explanatory view useful for understanding characteristic portions of a twenty-third assembly route producing apparatus according to an embodiment of the present invention.

FIG. 74 is an explanatory view useful for understanding characteristic portions of a twenty-third assembly route producing apparatus according to an embodiment of the present invention.

It is assumed that a part 3 is selected in a product consisting of a part 1 to a part 5. At that time, the part 3 is plotted with a good quality of API (three-dimensional computer graphics library), such as Open GL and the like, while the parts other than the part 3 are plotted by a high speed plotting type of API but being somewhat worse in a picture quality, for example, the Direct 3D or the like.

Since the part of interest is the part 3, only the part 3 is plotted on a good quality basis and other parts are plotted on a high speed basis at the sacrifice of degradation of somewhat picture quality. This feature makes it possible to implement a high speed plotting as a whole.

Figure 75:
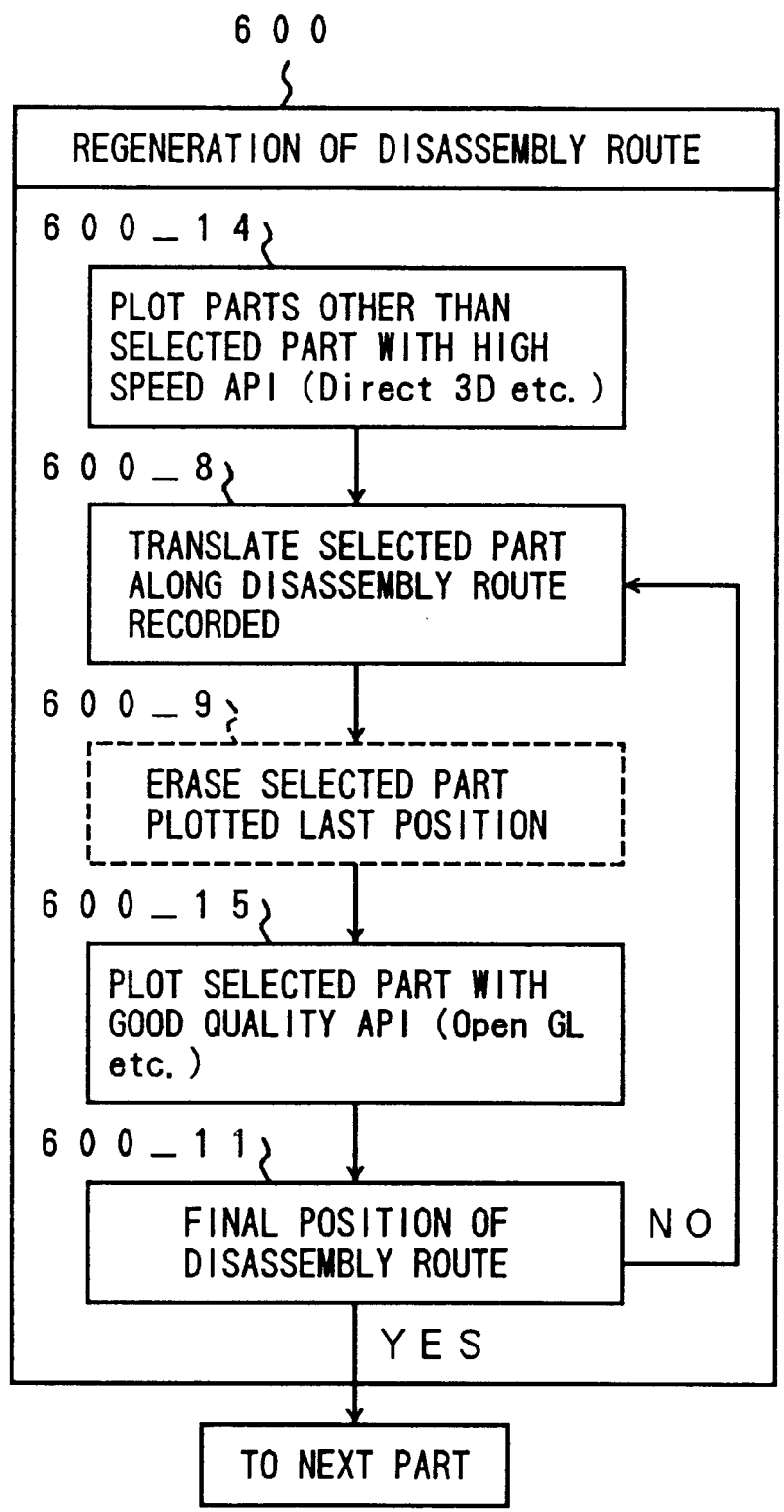
FIG. 75 is a flowchart showing a disassembly route regeneration routine for implementing characteristic structures of a twenty-third assembly route producing apparatus according to an embodiment of the present invention.

FIG. 75 is a flowchart showing a disassembly route regeneration routine for implementing characteristic structures of a twenty-third assembly route producing apparatus according to an embodiment of the present invention, explained referring to FIG. 74. A difference between it and the disassembly route regeneration routine shown in FIG. 70 will be described hereinafter.

In a step 600_14, parts other than the selected part (part 3 in case of the example shown in FIG. 71) are plotted with a high speed type of API (Direct 3D, etc.). In a step 600_15, the selected part is plotted or re-plotted with a good quality of API (Open GL, etc.).

Figure 76:
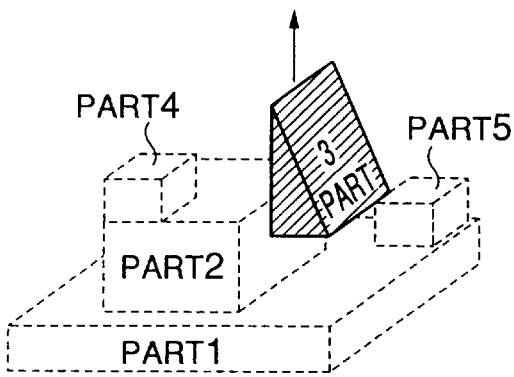
FIG. 76 is an explanatory view useful for understanding an alternative aspect as to characteristic portions of a twenty-third assembly route producing apparatus according to an embodiment of the present invention.

FIG. 76 is an explanatory view useful for understanding an alternative aspect as to characteristic portions of a twenty-third assembly route producing apparatus according to an embodiment of the present invention.

It is assumed that a part 3 is selected in a product consisting of a part 1 to a part 5. At that time, the parts other than the part 3 are plotted with a line drawing, only the part 3 is plotted with a shading.

Plotting the parts other than the part 3 of interest makes it possible to implement a high speed plotting.

Figure 77:
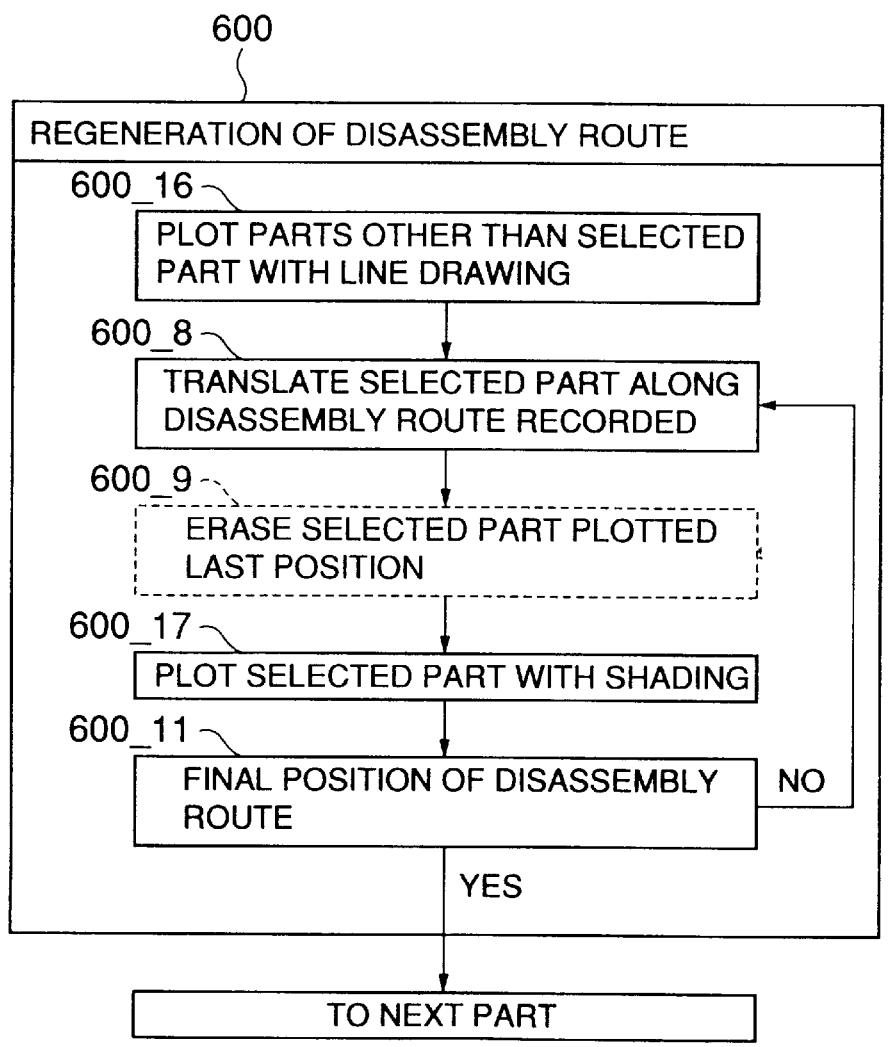
FIG. 77 is a flowchart showing a disassembly route principle routine for implementing characteristic structures of a twenty-third assembly route producing apparatus according to an embodiment of the present invention.

FIG. 77 is a flowchart showing a disassembly route principle routine for implementing characteristic structures of a twenty-third assembly route producing apparatus according to an embodiment of the present invention, explained referring to FIG. 76. A difference between it and the disassembly route regeneration routine shown in FIG. 75 will be described hereinafter.

In a step 600_16, parts other than the selected part are plotted with a line drawing. In a step 600_17, the selected part is plotted or re-plotted with a shading.

Next, there will be explained aspects of a twenty-fourth assembly route producing apparatus according to an embodiment of the present invention.

Figure 78:
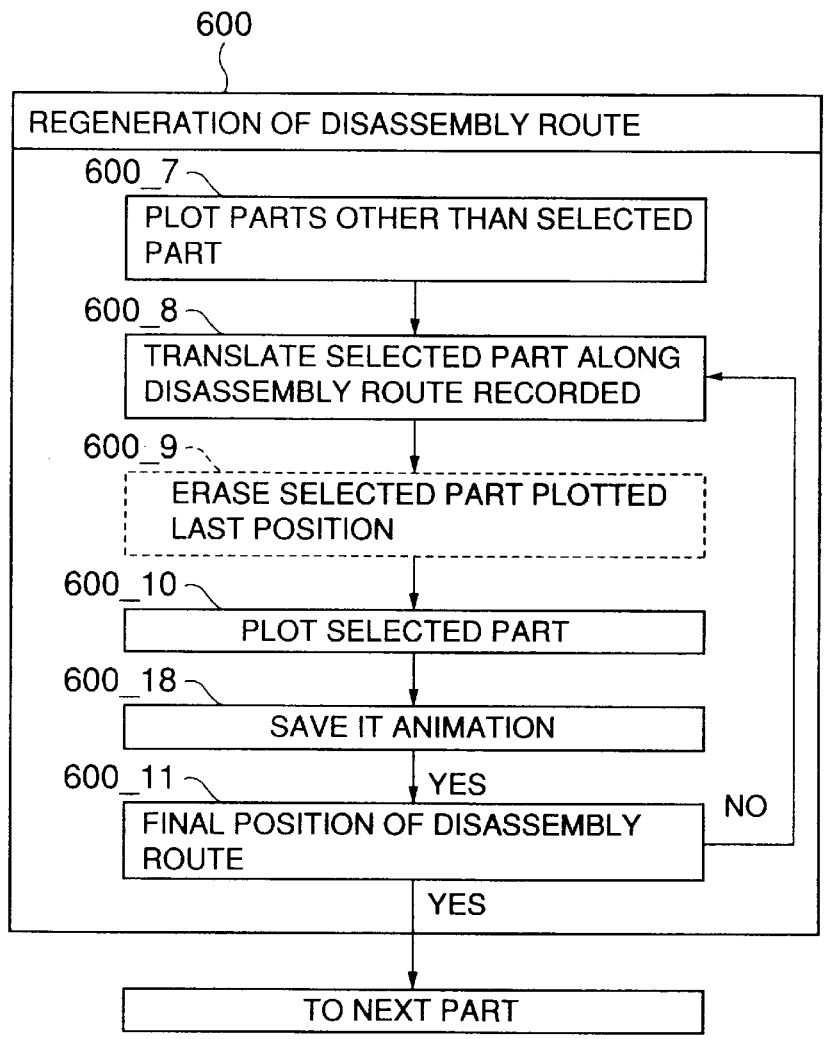
FIG. 78 is a flowchart showing a disassembly route regeneration routine for implementing characteristic structures of a twenty-fourth assembly route producing apparatus according to an embodiment of the present invention.

FIG. 78 is a flowchart showing a disassembly route regeneration routine for implementing characteristic structures of a twenty-fourth assembly route producing apparatus according to an embodiment of the present invention. A difference between it and the disassembly route regeneration routine shown in FIG. 70 will be described hereinafter.

The disassembly route regeneration routine shown in FIG. 78 includes, as compared with the disassembly route regeneration routine shown in FIG. 70, additionally a step 600_9 in which prior to re-plotting of the selected part the last plotted image of the selected part is erased, and a step 600_18 in which the image of the selected part is saved as an animation. The disassembly route regeneration routine shown in FIG. 78 is executed in cooperation with the execution of the automatic disassembly route producing routine 200. In the step 600_18, a product including the part re-plotted in the step 600_10 is typically illustrated in its entirety so as to expressed by a simple figure, and is saved in the form of images. The saved image figure is displayed in the form of an animation.

Figure 79:
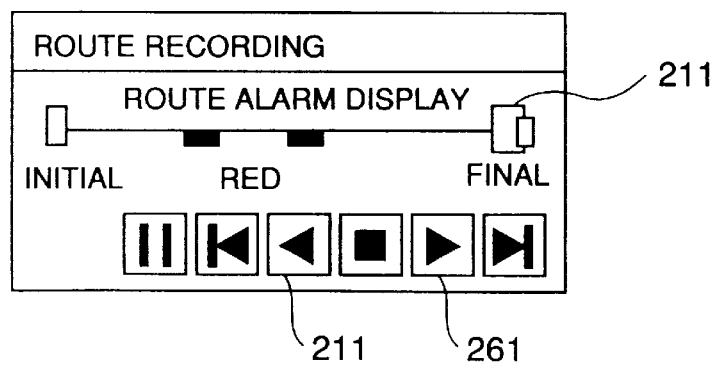
FIG. 79 is a view showing a screen of a route recording operation menu by way of example, for an animation display.

FIG. 79 is a view showing a screen of a route recording operation menu by way of example, for an animation display.

The screen of a route recording operation menu shown in FIG. 79 is the same as that shown in FIG. 12, and thus the redundant description will be omitted.

According to the description of the screen of a route recording operation menu shown in FIG. 12, when the reverse regeneration button 241 or the regeneration button 261 is depressed to translate the cursor, the graphics screen of the state associated with a position of the cursor 211 is displayed, whenever the cursor 211 reaches the position of the route alarm indication. The reason why this is to do so is that in view of the fact that it takes a lot of time for graphics plotting, it is avoided that the graphics screen is constantly displayed. On the other hand, according to the present embodiment shown in FIG. 79, the image figure produced in the disassembly route regeneration routine shown in FIG. 78 is regenerated in the form of an animation regardless of the fact that the cursor 211 is or not at the position of the route alarm indication.

In this case, since image figures for an animation are already produced and saved, it is possible to expect a high speed display. However, it would be difficult to grasp the state of parts being too close to each other but not colliding with each other. Consequently, it is preferable that there is provided such an arrangement that the cursor 211 is moved by a designation of an operator beforehand at a position involved in, for example, a route alarm indication so that graphics plotting is performed, alternatively an alteration of the disassembly route (cf. FIG. 39) is conducted through a manual operation.

As mentioned above, according to the present invention, it is possible to implement a disassembly route producing apparatus, an assembly route producing apparatus, and a supporting system for mechanical system design, which are excellent in operability or operational efficiency.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A disassembly route producing apparatus, comprising:

disassembly route search means for searching for a collision-free disassembly route when disassembling a product containing a plurality of parts, the disassembly occurring through a sequence of translations of each of the parts, in predetermined directions for predetermined distances;

collision arithmetic means for determining a closest approach distance between a selected one of the plurality of parts to be translated and the remaining parts; and said disassembly route search means moving the selected part through the sequence of translations up to a distance corresponding to the closest approach distance, and said collision arithmetic means determining after each translation whether a collision occurred between the selected part and any of the remaining parts, and when said disassembly route search means fails to find a disassembly route for the selected part, the size of the selected part is reduced by a predetermined amount, and a search for a disassembly route is performed again.

2. The disassembly route producing apparatus of claim 1, further comprising first display means for displaying a product in a dangerous state, or two parts of the product approaching one another up to the dangerous state, the existence of the dangerous state being determined by said collision arithmetic means determining whether the closest approach distance is less than or equal to a predetermined distance.

3. The disassembly route producing apparatus of claim 1, further comprising second display means for displaying the product as it is being disassembled, with each selected part that is translated a predetermined distance without colliding with any of the remaining parts being removed from said second display means.

4. The disassembly route producing apparatus of claim 1, further comprising:
   third display means for displaying just the selected part of the product that is being disassembled;
   figure selection means for selecting the part to be displayed on said third display means; and
   search direction designating means for selecting a coordinate system and a sequence of search directions corresponding to the selected coordinate system, the coordinate system being displayed on said third display means, said disassembly route search means moving the selected part in accordance with the sequence of search directions.

5. The disassembly route producing apparatus of claim 1, wherein configuration and assembly arrangement information for the plurality of parts are arranged as a part tree structure, and said disassembly route search means searches for a disassembly route beginning with each part that is a terminal end of the tree structure, working upwards, one part at a time, through the tree structure from each child part to each parent part.

6. The disassembly route producing apparatus of claim 1, wherein configuration and assembly arrangement information for the product are arranged as a part tree structure according to subassemblies of the plurality of parts of the product, each subassembly containing a combination of one or more parts, and said disassembly route search means searches for a disassembly route for each subassembly as a unit.

7. The disassembly route producing apparatus of claim 5, further comprising fourth display means for displaying the product during disassembly when a plurality of the terminal parts are selected and simultaneously disassembled.

8. The disassembly route producing apparatus of claim 5, further comprising part designating means for selecting a plurality of the terminal parts, said disassembly route search means simultaneously searching for a disassembly route for the selected parts.

9. The disassembly route producing apparatus of claim 5, further comprising fifth display means for displaying the part tree structure with graphics images of the parts and names of the parts.

10. The disassembly route producing apparatus of claim 5, further comprising first disassembly route designating means for manually designating a disassembly route, wherein when said disassembly route search means fails to find a disassembly route for the selected part, automatic searching by said disassembly route search means is interrupted and the disassembly route for the selected part is the manually designated route, and said disassembly route search means then resumes searching by automatically searching for a disassembly route for a subsequent part.

11. The disassembly route producing apparatus of claim 5, further comprising second disassembly route designating means for manually designating a disassembly route, wherein when said disassembly route search means fails to find a disassembly route for a certain part, the part is not translated and said disassembly route search means continues searching for disassembly routes for subsequent parts, and said second disassembly route designating means manually designates a disassembly route for each of the parts said disassembly route search means was unable to find a disassembly route for.

12. The disassembly route producing apparatus of claim 5, further comprising:
   third disassembly route designating means for manually designating a disassembly route; and
   re-approach prohibiting means for prohibiting, when the selected part is moved according to the designated disassembly route, the selected part from approaching the remaining parts by less than a predetermined distance.

13. The disassembly route producing apparatus of claim 1, wherein when said disassembly route search means fails to find a disassembly route for a certain part, the part is not translated, and said disassembly route search means continues searching for disassembly routes for subsequent parts, then said disassembly route search means regards one or more of the remaining parts not having a disassembly route as being a subassembly and conducts a search for a disassembly route for the subassembly as a unit.

14. The disassembly route producing apparatus of claim 13, wherein the remaining parts considered to be a subassembly are the parts mutually in contact with one another.

15. The disassembly route producing apparatus of claim 4, further comprising disassembly impossible direction detecting means for detecting, prior to disassembling the selected part, directions in which the selected part cannot be moved, and said disassembly route search means searching for a disassembly route for the selected part in directions other than those determined by said disassembly impossible direction detecting means.

16. The disassembly route producing apparatus of claim 4, wherein when said disassembly route search means fails to find a disassembly route for the selected part, the selected part is positioned at a point corresponding to the maximum distance the selected part was able to be moved, and said disassembly route search means again searches for a disassembly route for the selected part, except in directions corresponding to the direction in which the selected part was repositioned to and the direction that would move the part back to its original position.

17. The disassembly route producing apparatus of claim 1, wherein when the selected part collides with another part, said disassembly route search means determines a polygon on the selected part interfering with the other part, the polygon is reduced in size and translated inside the selected part, and said collision arithmetic means again determines whether a collision occurs between the reduced selected part and the other part.

18. The disassembly route producing apparatus of claim 1, wherein when said disassembly route search means cannot find disassembly routes for two or more of the plurality of parts, said disassembly route search means translates the two or more parts as a unit a distance that is within a translation possible limit, and then searches for disassembly routes for the two or more parts.

19. The disassembly route producing apparatus of claim 1, further comprising auxiliary appending means for appending an auxiliary object to the selected part before searching for a disassembly route for the selected part, and said disassembly route search means then searches for a disassembly route for the selected part and auxiliary object as a unit.

20. The disassembly route producing apparatus of claim 1, wherein if the selected part collides with another part that has a joint and is rotatable, said disassembly route search means translates the selected part a predetermined translation amount, causing the selected part to move the rotatable part.

21. The disassembly route producing apparatus of claim 1, further comprising sixth display means for displaying only the selected part and another part closest in distance to the selected part.

22. The disassembly route producing apparatus of claim 1, further comprising seventh display means for displaying the selected part as it is being disassembled, along with the remaining parts that have not been disassembled.

23. The disassembly route producing apparatus of claim 1, further comprising eighth display means for displaying the selected part, as it is being disassembled, in one graphics format, along with the remaining parts that have not been disassembled in another graphics format.

24. The disassembly route producing apparatus of claim 1, further comprising:

animation producing means for producing an animation of the selected part as it is being disassembled; and ninth display means for displaying the animation, along with the remaining parts that have not been disassembled.

25. The disassembly route producing apparatus of claim 1, further comprising assembly route producing means for producing a collision-free assembly route for the parts by reversing the disassembly route, said assembly route producing means moving each part selected to be assembled through the sequence of assembly translations, and said collision arithmetic means determining whether a collision occurred between each translated part and any of the parts already assembled.

26. A supporting system for mechanical system design, comprising:

disassembly route search means for searching for a collision-free disassembly route when disassembling a product containing a plurality of parts, the disassembly occurring through a sequence of translations of each of the parts, in predetermined directions for predetermined distances;

collision arithmetic means for determining a closest approach distance between a selected one of the plurality of parts to be translated and the remaining parts; and said disassembly route search means moving the selected part through the sequence of translations up to a distance corresponding to the closest approach distance, and said collision arithmetic means determining after each translation whether a collision occurred between the selected part and any of the remaining parts, and when said disassembly route search means fails to find a disassembly route for the selected part, the size of the selected part is reduced by a predetermined amount, and a search for a disassembly route is performed again.

27. A method for determining a disassembly route for a product containing a plurality of parts, comprising:

determining a closest approach distance between one of the parts selected to be disassembled from the product and the remaining parts;

moving the selected part through a sequence of translations in predetermined directions for predetermined distances, up to a distance corresponding to the closest approach distance, and determining, after each translation, whether a collision occurred between the selected part and any of the remaining parts; and reducing the size of the selected part by a predetermined amount, when said disassembly route search means fails to find a disassembly route for the selected part, and performing a search for a disassembly route again.

* * * * *